United States Patent [19]

Iizuka et al.

[11] 4,001,568
[45] Jan. 4, 1977

[54] MONETARY RECEIPT AND PAYMENT MANAGING APPARATUS

[75] Inventors: Nobuhiro Iizuka; Hideto Shigemori, both of Himeji, Japan

[73] Assignee: Glory Kogyo Kabushiki Kaisha, Japan

[22] Filed: Dec. 16, 1974

[21] Appl. No.: 533,469

[30] Foreign Application Priority Data

Dec. 29, 1973 Japan .............................. 49-3791

[52] U.S. Cl. .......................... 235/156; 235/61.7 B; 340/172.5
[51] Int. Cl.² .................. G06F 15/02; G06F 15/30
[58] Field of Search .................... 444/1; 340/172.5; 235/61.7 B, 156; 194/DIG. 9, 26, 4 R; 221/13, 9, 7; 199/4 R

[56] References Cited

UNITED STATES PATENTS

| | | | |
|---|---|---|---|
| 3,648,020 | 3/1972 | Tateisi et al. ................ | 235/61.7 B |
| 3,662,343 | 5/1972 | Goldstein et al. ............. | 235/61.7 B |
| 3,705,384 | 12/1972 | Wahlberg ..................... | 235/61.7 B |
| 3,748,452 | 7/1973 | Ruben ......................... | 235/156 X |
| 3,778,595 | 12/1973 | Hatanaka et al. ............. | 235/61.7 B |
| 3,784,790 | 1/1974 | Hatanaka et al. ............. | 235/61.7 B |
| 3,805,937 | 4/1974 | Hatanaka et al. ............. | 194/4 R |

*Primary Examiner*—Jerry Smith
*Attorney, Agent, or Firm*—Wenderoth, Lind & Ponack

[57] ABSTRACT

A monetary receipt and payment managing apparatus operates, when a teller transacts receipt and payment with respect to cash, checks, and bills to classify and operate on data applied according to the contents of the transaction, and to dispense cash necessary for the payment. The apparatus comprises buffer memories for storing the data classified and operated on for individual transaction and main memories for summing and storing the data thus operated on separately according to classification items for every transaction. The operation processing of data on one transaction is assigned to the buffer memories, while the summation and storage of subtotal data on transactions successively transacted are assigned to the main memories, whereby summation data especially important as stored data can be positively secured, and data necessary for automatically dispensing cash on the basis of the contents stored in the buffer memories can be readily and positively obtained.

4 Claims, 43 Drawing Figures

FIG. 11

|  |  | N1 | N2 | N3 | N4 | N5 | N6 | N7 |
|---|---|---|---|---|---|---|---|---|
| V | R.T. R.T. | $jg_2$ | $jg_3$ | $jg_4$ | $jg_5$ | $jg_1$ | $jg_{12}$ |  |
| V | P.T. P.T. | $jg_1$ |  |  |  | $jg_1$ | $jg_{12}$ |  |
|  | TOTAL | $jg_6$ | $jg_7$ | $jg_8$ | $jg_9$ | $jg_{10}$ | $jg_{11}$ |  |
| PAYMENT | 1st DISP. | $jg_2$ | $jg_3$ | $jg_4$ | $jg_5$ |  |  |  |
| PAYMENT | LCV | $jg_2$ |  |  |  |  |  |  |
|  | L B | $jg_6$ | $jg_7$ | $jg_8$ | $jg_9$ | $jg_{10}$ | $jg_{11}$ | $jg_{12}$ |

FIG. 20

| a | 5,980,000. | R. |
|---|---|---|
| b | 1,255,000. | R. |
| c | 947,700. | R. |
| d | 403,000. | R. |
| e | 2,211,500. | P. |
| f | 3,319,000. | P. |

FIG. 21

| a | 2,428,000. | R. |
|---|---|---|
| b | 455,000. | R. |
| c | 1,099,700. | R. |
| d | 105,000. | R. |
| e | 1,217,550. | P. |
| f | 1,519,660. | P. |
| 48. | 12. 09. | 123. 12 |

```
         PAYMENT SLIP

PAYMENT TOTAL    148,976.
NO DENOMINATION  148,976.
```

B ⌐81

```
CASH           148,976.
```

C ⌐82

```
CASH           148,976.
               148,976.
       48, 12, 04, 123.
```

D ⌐81

```
CASH           148,976.
               148,976.
       48, 12, 04, 123.
```

| RECEIPT SLIP | |
|---|---|
| R.T. | 68,000. |
| CASH | 10,000. |
| O.B. ch | 5,000. |
| O.B. ch | 3,000. |
| O.B. 1ch | 20,000. |
| O.B. 2ch | 30,000. |

C (82)

| CASH | 10,000. |
|---|---|
| O.B. | 8,000. |
| A.B. 1 | 20,000. |
| A.B. 2 | 30,000. |
| | 68,000. R. |
| 48, 12, 04, 123. | |

B (81)

| CASH | 10,000. |
|---|---|
| O.B. | 5,000. |
| O.B. | 3,000. |
| A.B. 1 | 20,000. |
| A.B. 2 | 30,000. |

D (81)

| CASH | 10,000. |
|---|---|
| O.B. | 8,000. |
| A.B. 1 | 20,000. |
| A.B. 2 | 30,000. |
| | 68,000. R. |
| 48, 12, 04, 123. | |

| PAYMENT SLIP | |
|---|---|
| P.T. | 100,000. |
| 10000-YEN | 50,000. |
| 5000-YEN | 25,000. |
| 1000-YEN | 20,000. |
| 500-YEN | 5,000. |

B 81

| CASH | A | 50,000. |
|---|---|---|
| | B | 25,000. |
| | C | 20,000. |
| | D | 5,000. |

C 82

CASH    100,000.
<u>48, 12, 04, 123.</u>

D 81

CASH    100,000.
<u>48, 12, 04, 123.</u>

| PAYMENT SLIP | |
|---|---|
| P.T. | 1,148,976. |
| 10000-YEN | 1,000,000. |
| NOT DENOMINATED | 148,976. |

B 81

CASH        148,976.
10000-YEN   1,000,000.

C 82

CASH    1,148,976. P.
<u>48, 12, 04, 123.</u>

D 81

CASH    1,148,976. P.
<u>48, 12, 04, 123.</u>

```
       EXCHANGE SLIP
   BROUGHT
     10000-YEN    20,000.
   EXCHANGED
     5000-YEN     10,000.
     1000-YEN     10,000.
```

B  81

```
   10000-YEN    20,000.
E.  5000-YEN    10,000.
E.  1000-YEN    10,000.
```

```
      FEE DEPOSIT SLIP
   BROUGHT
     MONEY       10,000.
   DEPOSIT        6,525.
   CHANGE         3,475.
```

C  82

```
   CASH          6,525.
                 6,525.

48, 12, 04,   123.
```

B  81

```
                10,000.
   CASH          6,525.
   CHANGE        3,475.
                     0.
```

D  81

```
   CASH          6,525.
                 6,525.

48, 12, 04,   123.
```

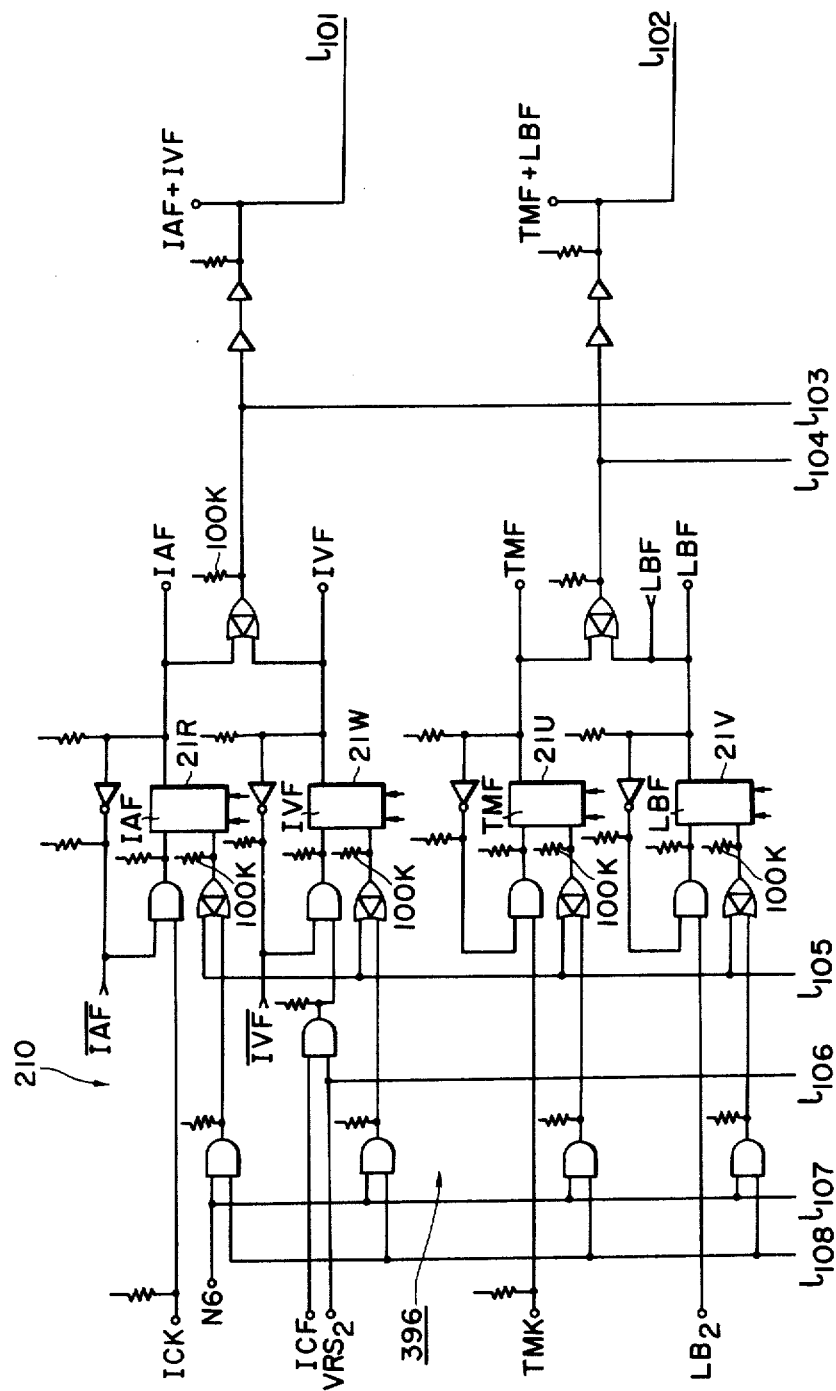

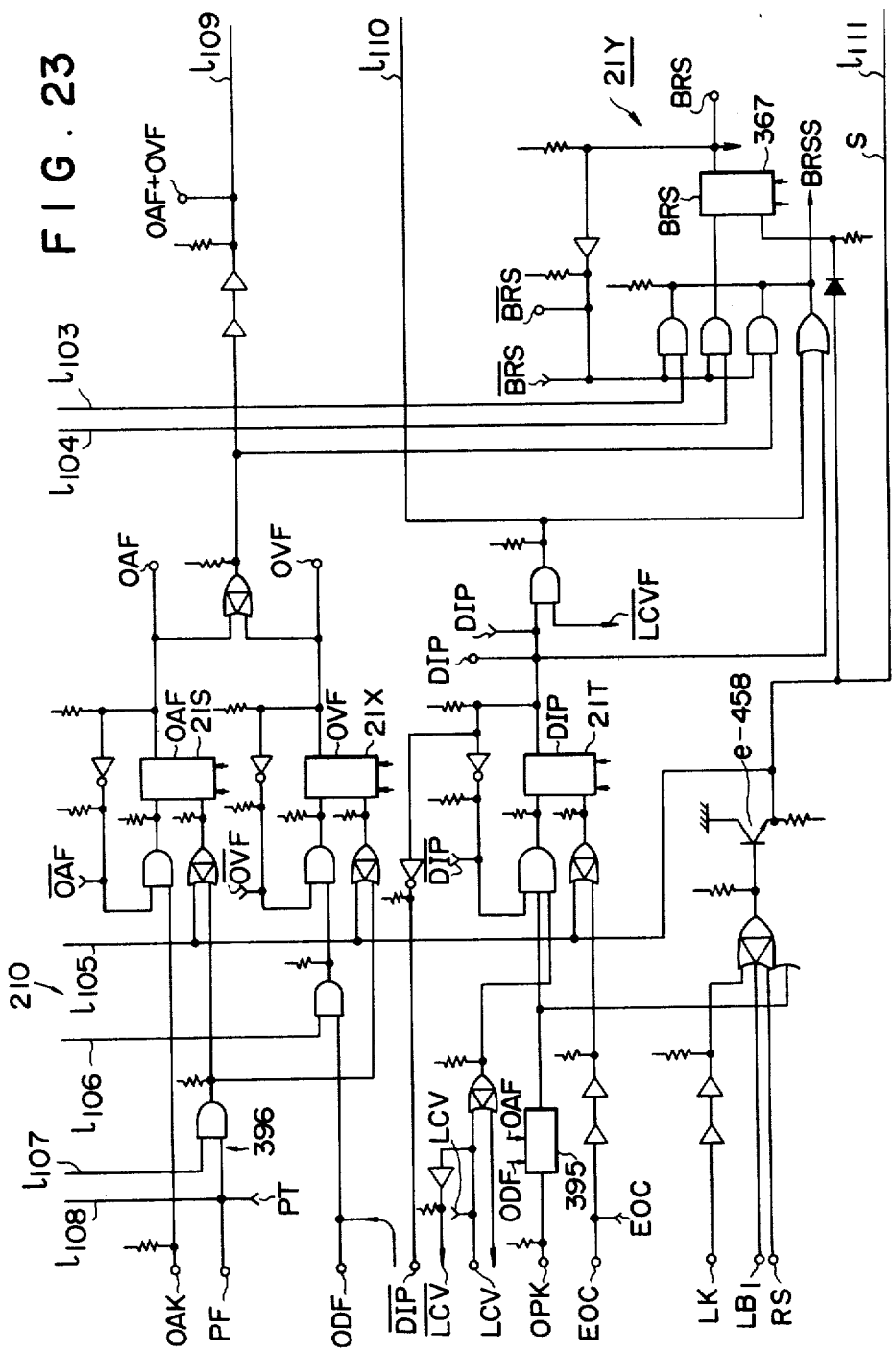

MONETARY RECEIPT AND PAYMENT MANAGING APPARATUS

BACKGROUND OF THE INVENTION

This invention relates to monetary receipt and payment managing apparatuses which are suitable especially for the transactions of receipt and payment of cash, checks and bills which are transacted by tellers in banking facilities such as banks and also for the receipt of money which is transacted by clerks in monetary charge receiving points in stores.

In general, there are a variety of transactions which are transacted by a teller in, for instance, banking facilities. More specifically in the banking facilities many kinds of legal tender are transferred simultaneously in one transaction, and furthermore various transactions such as receipt and payment of money, money exchanging, and change paying are frequently transacted.

Accordingly, a monetary receipt and payment managing apparatus which deals with these transactions should be able to positively classify and store a varity of data which are applied thereto on the basis of the contents of the various transactions. In this connection, it is desirable that the data thus stored can be taken out and used when necessary. In other words, it is desirable that the data stored in this kind of monetary receipt and payment managing apparatus can be readily utilized for the case where, upon completion of one transaction the correctness of the monetary total of the transaction is certified or for the case where the result of a plurality of transaction transacted successively, that is, for instance the, result of casting the accounts in one day is audited.

Furthermore, it is desirable that in the case when cash is paid in a transactions, money can be automatically dispensed without lowering the classification function of the apparatus described above, from the point of view of improvement of service in the transaction or labor saving.

SUMMARY OF THE INVENTION

Accordingly, it is an object of this invention to provide a monetary receipt and payment managing apparatus which satisfies the above-described various demands.

More specifically, an object of the invention is to provide a monetary receipt and payment managing apparatus which has a function of classifying and totalizing input data corresponding to receipt and payment of legal tender, and a function of automatically dispensing cash money, thereby to give better service at the window.

Another object of the invention is to provide a monetary receipt and payment managing apparatus in which the number of buffer memories and accordingly the number of peripheral circuits of a memory device are reduced.

A further object of the invention is to provide a monetary receipt and payment managing apparatus which is simple in construction and is accordingly economical.

A still further object of the invention is to provide a monetary receipt and payment managing apparatus in which no interruption of command signals and accordingly re-application of the same is caused for a time period during which a money dispensing machine dispenses money.

A particular object of the invention is to provide a monetary receipt and payment managing apparatus in which data on results of transactions transacted can be positively printed on a journal.

A more particlar object of the invention is to provide a monetary receipt and payment managing apparatus in which data stored in memories is not erased by power troubles.

A specific object of the present invention is to provide a monetary receipt and payment managing apparatus in which in the case of compound transactions for paying money to a customer by the use of a money dispensing machine and handing money directly to him, the data on the transactions can be processed by a common data processing step.

The manner in which the foregoing objects and other objects are achieved by this invention will become more apparent from the following detailed description and the appended claims when read in conjunction with accompanying drawings in which like parts are designated by like numerals or characters.

BRIEF DESCRIPTION OF THE DRAWINGS

In the accompanying drawings:

FIG. 11 is a table provided for a description of the operation of the address register shown in FIG. 10.

FIGS. 12, 14 and 15 through 21 are diagrams illustrating various forms printed by a printer;

FIGS. 22 through 27 are block diagrams illustrating in more detail the address register shown in FIG. 10;

Figure 1:
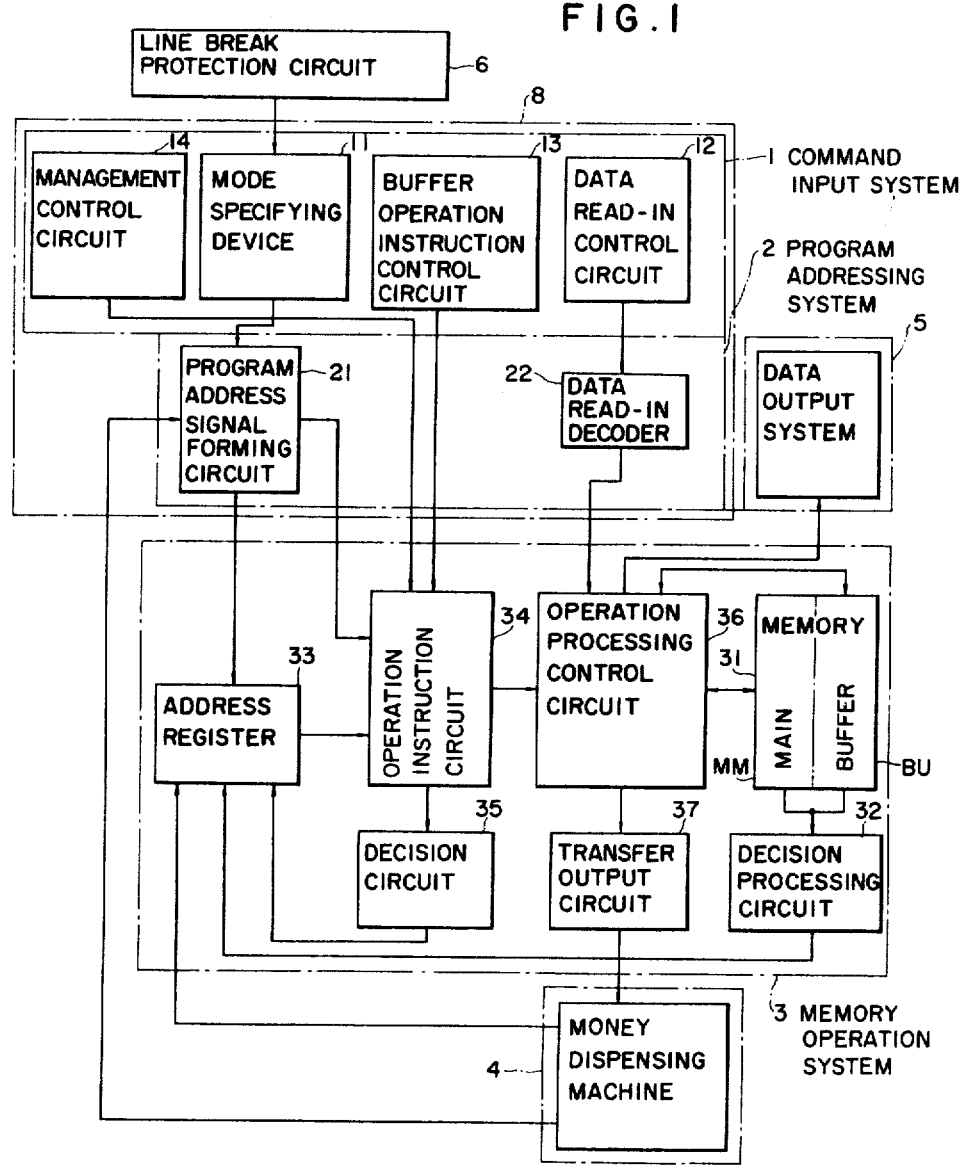
FIG. 1 is a block diagram showing a preferred example of a monetary receipt and payment managing apparatus.

For convenience in drawing, a variety of terms which appear frequently in the accompanying drawings are abbreviated as indicated in a table below when applicable.

| Term | Abbreviation |
| --- | --- |
| cash receipt | C.R. |
| our bank | O.B. |
| another bank | A.B. |
| money handling | M.H. |
| receipt total | R.T. |
| payment total | P.T. |
| payment | P. |
| dispensation | D. |
| Total | To. |
| exchange | E. |
| change | C. |
| collation | Co. |
| check | Ch. |
| receipt | R. |

DETAILED DESCRIPTION OF THE INVENTION

One preferred example of this invention will be described with reference to the case where it is employed as an apparatus which can classify and totalize the receipt and payment of legal tender such as cash, checks and bills, and can automatically dispense money (the apparatus being referred to as a monetary receipt and payment managing apparatus hereinafter).

In this example, transactions which are transacted most frequently are classified into the following four (4) classification items, that is, transactions of monetary receipt (deposit), payment (withdrawal), exchange, and change transactions.

A. Receipt transaction

According to the kinds of legal tender in a transaction, the receipt transactions are further classified into four sub-classifications, that is, a. Cash receipt in which cash money is received.

b. Receipt of checks on our bank in which checks and bills on our bank are received.

c. Receipt of checks on another bank 1 in which checks and bills received can be exchanged immediately by banks other than our bank or by a clearing house in which check-issuing banks join.

d. Receipt of checks on another bank 2 in which checks and bills cannot be exchanged immediately by the clearing house.

B. Payment transaction

The payment transactions are further classified into two (2) subclassification items; that is, a. Cash handing payment in which only cash money is handed to a customer by a bank clerk, and b. Automatic money payment in which money is paid to a customer by an automatic money dispensing machine.

The automatic money payment (b) described above includes two automatic money dispensation modes; that is, b-1. A first automatic money dispensation in which money is dispensed separately according to monetary denominations, and b-2. A second automatic money dispensation (hereinafter referred to as an LCV dispensation when applicable) in which a desired money amount is dispensed with a minimum number of pieces.

C. Monetary exchange transactions

In monetary exchange transactions, money brought by a customer is received, and the exchanged money is automatically dispensed to the customers according to denominations specified by the customer, that is, pieces of money with the denominations specified are automatically dispensed. After it has been detected that the total monetary value of the pieces of money dispensed is equal to that of the money brought, the exchanged money is paid to the customer.

D. Monetary change transactions

For instance in an agent business for collecting public fees, money brought by a customer is received, and the balance between the amount of money thus received and the amount of money to be collected is paid to the customer by the LCV dispensation.

The apparatus positively carries out the four kinds of business transactions (A), (B), (C) and (D) classified as above, and furthermore readily carries out various checking operations in monetary management such as certification printing, record printing and collation confirming operations separately according to the classification items described above.

The apparatus, as is shown in FIG. 1, comprises a command input system 1 which is operated by an operator to introduce data and instructions necessary for the transaction of various transactions such as receipt and payment transactions to a memory operation processing system 3 which stores the data applied by the command input system 1 and operates on the data according to programs provided corresponding to the various transactions, a program addressing system 2 which is adapted to transfer the data from the system 1 to the system 3 and to address a program to be executed for the system 3, an automatic money dispensing machine 4 for automatically dispensing money with denominations and numbers of pieces in response to an operation result of the memory operation processing system 3, and a data output system 5 which operates to display and/or print an operation result of the memory operation processing system 3. The command input system 1 and the program addressing system 2 form a data input system 8 in the apparatus.

1. Command input system 1

The command input system 1 carries out the introduction of classification data and registration data which are assigned separately to the transactions, and comprises the following elements.

1-1. Operation mode specifying device 11

Figure 2:
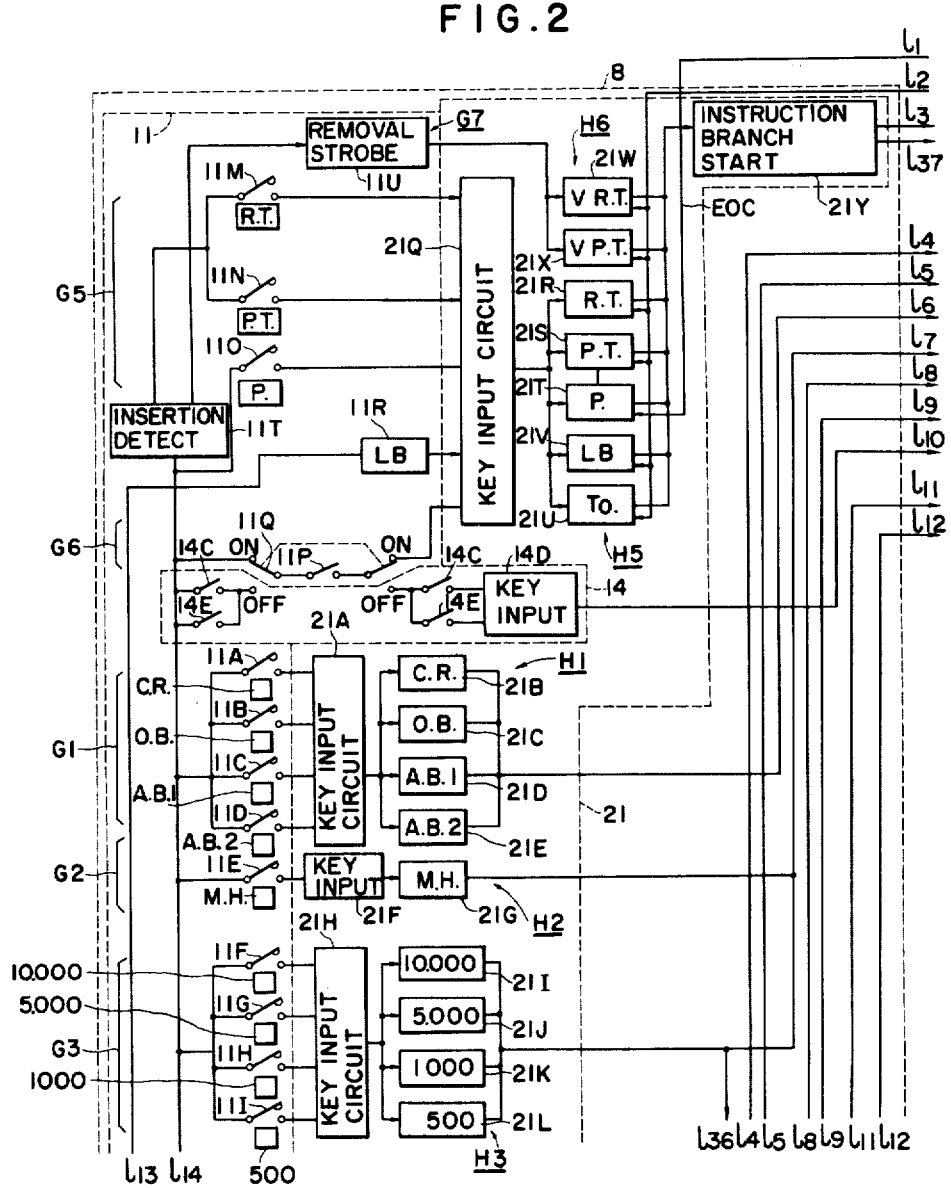
FIGS. 2 through 7 are also block diagrams illustrating various components of the apparatus shown in FIG. 1.
Figure 3:
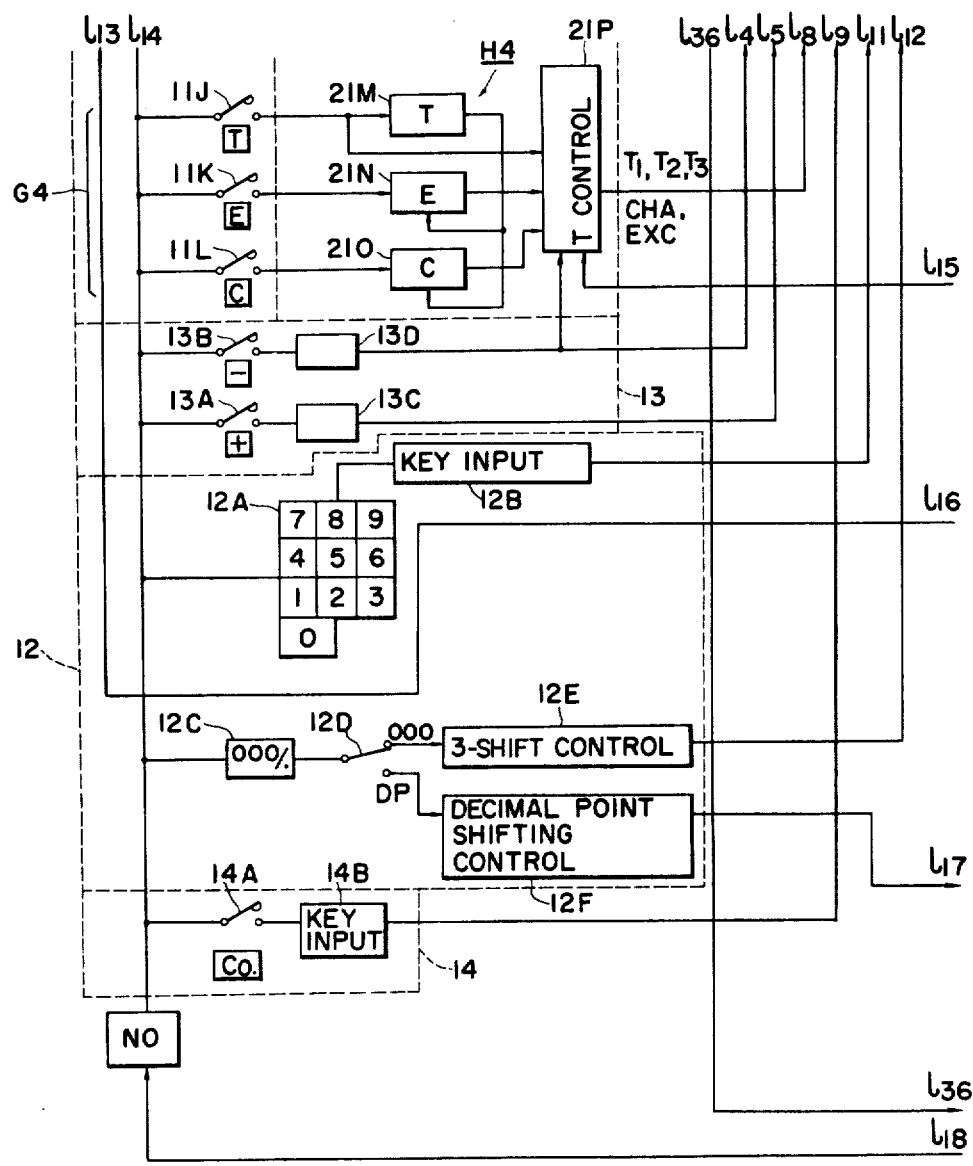

An operation mode specifying device 11, as in shown in FIGS. 2 and 3, is provided with a plurality of key-switches $G_1$ through $G_4$ corresponding respectively to the transaction classifications.

The group of key-switches $G_1$ are operated in the transaction of the receipt transaction, for classifying the receipt transaction (hereinafter referred to as a group of receipt business classifying key switches $G_1$ when applicable), and comprises a "cash" switch 11A, an "our bank" switch 11B, an "another bank 1" switch 11C and an "another bank 2" switch 11D which correspond, respectively, to the kinds of legal tender brought by customers, that is, the subclassification items (a), (b), (c) and (d) in paragraph (A) above.

The group of key switches $G_2$ is provided for classifying the payment transactions (hereinafter referred to as a group of payment business classifying key-switches $G_2$), and are operated when cash is handed by a bank clerk to customers, and includes a "handing" switch 11E.

The group of key-switches $G_3$ is operated for classifying the payment of money when money is to be dispensed by the first automatic money dispensation (hereinafter referred to as group of payment money classifying key-switches $G_3$), and comprises a "10000-yen" switch 11F, a "5000-yen" switch 11G, a "1000-yen" switch 11H and a "500-yen" switch 11I which correspond to 10000-yen, 5000-yen, 1000-yen and 500-yen notes, respectively, in this example.

The group of key-switches $G_4$ is provided for classifying supplementary transactions (hereinafter referred to as a group of supplementary transaction classifying switches $G_4$ when applicable). These key-switches $G_4$ are operated when the exchange and change transactions are transacted, and comprises an exchange switch 11K and a change switch 11L which correspond to the exchange and change transactions, respectively. These key-switches G4 further comprise a non-addition mode selection key-switch 11J (hereinafter referred to as a T switch 11J) which is provided for selecting a zero proof operation mode of the memory operation processing system 3 in the transaction of the exchange and change transactions. In this example of the apparatus, the memory operation processing system 3 is so designed that it will carry out an addition operation if the "T" switch 11 is not operated.

The groups of key switches described above are operated for every transaction so that the transactions are classified according to the sub-classification items, that is, the key-switch groups are operated separately according to the sub-classification items. As a result, an operation processing by the use of a buffer memory (hereinafter referred to as a buffer operation), such as writing, operating and rewriting of data in the buffer memory which is built in the memory operation system 3 can be carried out by the operations of the above-described key-switches, as will become apparent later.

The command input system further comprises groups of keyswitches $G_5$ and $G_6$, and circuit $R_{11}$ and $G_7$ in order to carry out an operation processing by the use of a main memory (hereinafter referred to as a main operation) which will be described later.

The group of key-switches $G_5$ are provided for main memory instructions. These switches $G_5$ are operated for every transaction to produce the results of the transaction transacted. More specifically, the group of key-switches $G_5$ comprises classification item switches, that is, a receipt total switch 11M which provides a subtotal in one transaction in which monetary receipt is conducted, and a payment total switch 11N which provides a subtotal in one transaction in which payment is conducted. The group of key-switches $G_5$ further comprises a payment (which term in this case is intended to designated the fact that money dispensed by the money dispensing machine is paid to a customer) key-switch 11O which is provided for starting the operation of the automatic money dispensing machine 4.

The group of key-switches $G_6$ are provided for main memory operation instructions so as to produce a monetary total of transactions transacted to one day. The group of key-switches $G_6$ comprises a "total/✱ " switch 11P (in which the symbol " ✱ " means non-addition operation) and an "audit" switch 11Q which is a change-over switch connected in parallel to the switch 11P. In the case of producing a total money amount, the total/✱ switch 11P is closed after the "audit" switch has been switched over to its contact ON, whereby the application of a total operation instruction is effected.

Reference character 11R designates a line break for instance, an interruption of the power supply operation instruction circuit. This circuit 11R is designed so as to receive a line break operation instruction (hereinafter referred to as an LB operation instruction) which produces a predetermined memory data of the main memory with the aid of a line break signal obtained by a line break protection circuit (which will be described later) when the electric source is turned off.

Reference symbol $G_7$ designates a certification printing operation instruction circuit in which the application of a main operation instruction with respect to the printing of data on a certification printing slip is effected. In this example, if an output is produced by a certification printing slip insertion detector 11T which operates to detect the fact that the certification printing slip is inserted in a certification printing chute section (not shown) described later, a strobe signal generating circuit 11U generates a strobe signal (hereinafter referred to as a certification printing slip removal strobe generating circuit 11U when applicable) when the slip is removed from the chute section, this strobe signal is employed as an operation instruction which after the date has been printed on the certification printing slip, causes the same data to be printed again.

Furthermore, the receipt total and payment total switches 11M and 11N are so designed that if the certification printing slip is inserted, the application of "receipt total" on "payment total" operation instruction is effectd with the aid of the output of the detector 11T.

1-2. Data read-in control circuit 12

A data read-in control circuit 12 for applying numerical data is provided with a ten-key device 12A comprising ten key-switches which correspond respectively to numerals 1 through 0 as is shown in FIG. 3. The outputs of the ten-key device 12A are transmitted through a key input circuit 12B. The ten-key device 12A is employed to achieve the registration of money amounts in the transaction of the receipt, payment, exchange and change transactions, and the registration is accomplished by selectively depressing the switches of the ten-key device 12A corresponding to the numerals which indicate a desired money amount. In this case, the depression of the key-switches should be started with a key-switch corresponding to the most significant digit of the money amount.

Similarly as in the case described above, the registration with respect to a date/serial number and an account number can be accomplished.

In connection with the ten-key device, a 000/. switch 12C is provided. The output of this switch 12C is applied through a decimal point shifting switch 12D to a three-shift control circuit 12E or a decimal point shifting control circuit 12F. When the armature of the switch 12D is on its contact 000, a registration data 000 is obtained. On the other hand, when the armature of the switch 12D is on the contact DP, an instruction output is obtained which operates to cause the decimal point of data registered by the ten-key device to be shifted by, for instance, two higher places in the printing of the data.

1-3. Buffer operation instruction control circuit 13

A buffer operation instruction control circuit 13 is provided to instruct the start of a buffer operation as to money amount data registered by the ten-key device. The circuit 13 comprises a + switch 13A which is an instruction key-switch for the execution of operation in an addition mode, and a − switch 13B which is also an instruction key-switch for a subtraction operation. The outputs of these switches 13A and 13B are transmitted as buffer operation start instructions through key input circuits 13C and 13D, respectively.

1-4. Management instruction control circuit 14

A management instruction control circuit 14 is provided to effect the application of instructions concerning operations which is necessary for monetary management, and comprises the following input elements.

A collation switch 14A is operated to check as to whether or not there is any mistake in registration operations and the like upon completion of one transaction. The output of the switch 14A, as is shown in FIG. 3, is transmitted as a collation instruction signal through a key input circuit 14B.

The control circuit 14 further comprises a date switch, or a keyswitch 14C, which operates to set a date and a serial number indicating a transaction number when the transaction is started for a day. In this example, the switch 14C, as is shown in FIG. 2, is provided in series with the contact OFF of the audit switch 11Q so that the audit switch 11Q and the total/# switch 11P are used as input means. When the total/# switch 11P is closed with the audit switch 11Q turned off, a set instruction signal for a date/serial-number is transmitted through a key input circuit 14D.

In order to apply an account number of a customer, there is provided an N switch 14E which is a keyswitch. Similarly as in the case of the date switch 14C, the switch 14E is connected in parallel with the date switch 14C so that the audit switch 11Q and the total/# switch 11P are employed as input means also. The keyswitch 14C is adapted to transmit a set instruction signal of an account number through a common key input circuit 14D. The date switch 14C and the N switch carry out mechanically opposite operations. More specifically, the N switch 14E is in the on state while the date switch 14C is in the off state for a normal time period during which the date/serial number date are not applied.

2. Program addressing system 2

This program addressing system 2 has a first function to transmit registration data in the data read-in control circuit 12 to the memory operation processing system 3 and a second function to transmit a program address signal for specifying a program corresponding to an operation mode which is specified by the operation mode specifying device 11 from among a number of programs which are fixedly stored in the system 3. The system 2 comprises the follow-elements.

2-1. Program address signal forming circuit 21

This program address signal forming circuit 21 receives the output of the operation mode specifying device 11 and produces a program address signal corresponding to the output thus received, thus to fulfill the second function described before. This circuit 21, as is shown in FIGS. 2 and 3, includes a plurality of memory groups.

One of the memory groups is a group of receipt classification item memories $H_1$ corresponding to the group of receipt transaction classifying key-switches $G_1$. That is, the memory group $H_1$ comprises cash receipt, our bank, another bank 1 and another bank 2 memories 21B, 21C, 21D and 21E which are set through a key input circuit 21A with the aid of the outputs of the cash, our bank, another bank 1 and another bank 2 switches 11A, 11B, 11C and 11D. Classification item signals selected are produced from the memories thus set, respectively.

Another one of the memory groups is a group of payment transaction classification item memories $H_2$ corresponding to the group of payment transaction classifying key-switches $G_2$. This memory group is provided with a handing memory 21G, which is set through a key input circuit 21F with the aid of the output of the handing switch 11E.

Another one of the memory groups is a group of payment transaction classification item memories $H_3$ corresponding to the group of payment transaction classifying key-switches $G_3$. This group $H_3$ comprises 10,000-yen note, 5,000-yen note, 1,000-yen note, and 500-yen note memories 21I, 21J, 21K and 21K, which are set through a key input circuit 21H with the aid of the outputs of the 10,000, 5,000, 1,000 and 500 switches 11F, 11G, 11H and 11I, respectively.

Another one of the memory groups is a group of supplement transaction classification item memories $H_4$ corresponding to the group of key-switches $G_4$ described before. This group $H_4$ comprises T, exchange and change memories 21M, 21N and 21O (FIG. 3) which are set by the outputs of the T, exchange and change switches 11J, 11K and 11L. The exchange and change memories 21N and 21O are set by the output of the T memory when the latter is set. Furthermore, a zero proof operation instruction is produced from a T control circuit 21P with the aid of the output of the T switch 11J, and the outputs of the memories 21N and 21O are produced as classification item signals in the same manner as described above.

Figure 34:
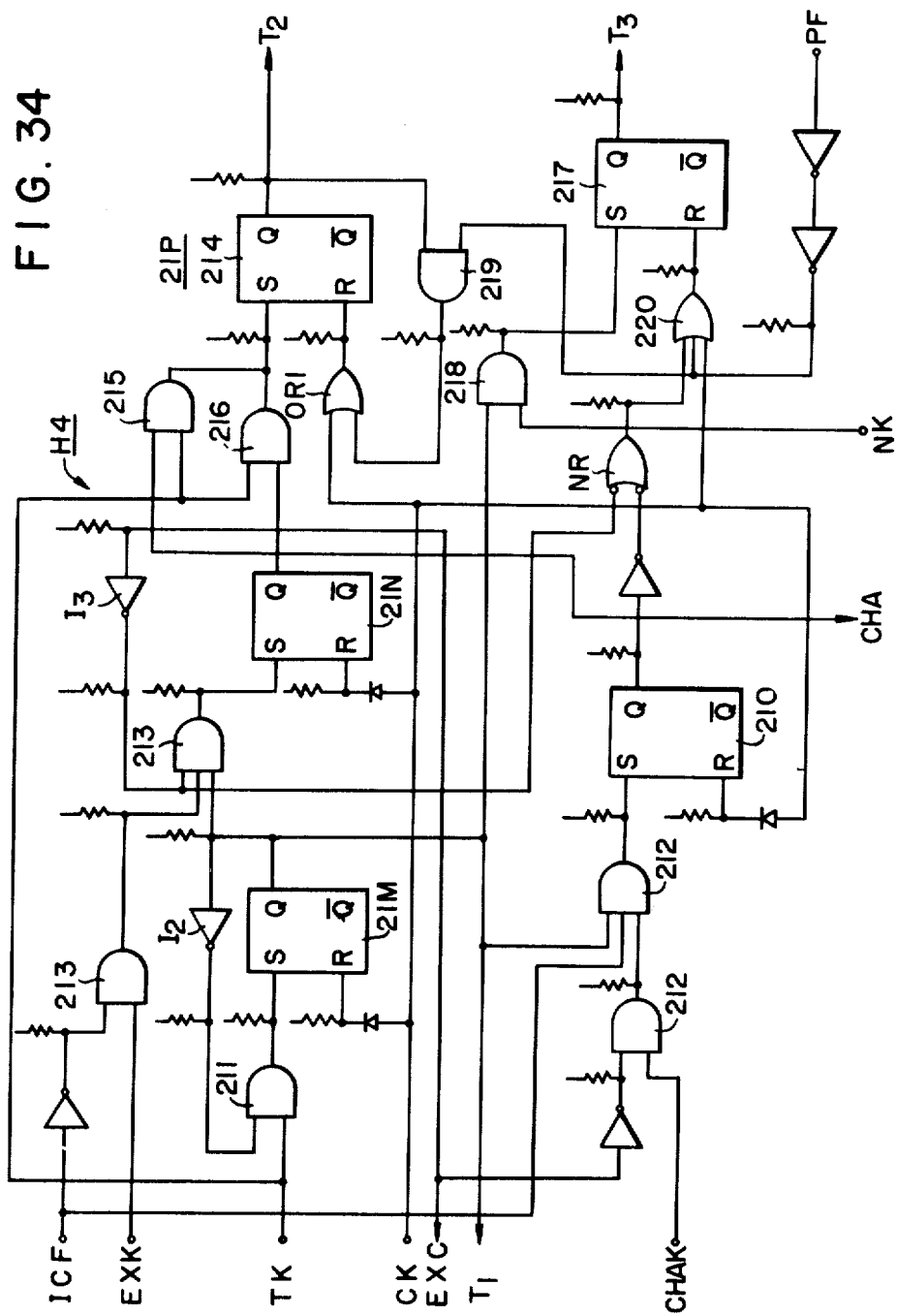
FIG. 34 is a block diagram illustrating in detail the construction of a "T" control circuit shown in FIG. 3.

The T control circuit 21P is a peripheral circuit of the group of memories $H_4$ and is adapted to transmit operation instructions and control signals $T_1$, $T_2$ and $T_3$ which are necessary for the transaction of the supplementary transactions, that is, the exchange and change transactions, as is shown in FIG. 34.

In this example, the T, exchange and change memories 21M, 21N and 21O are flip-flop circuits. The T memory 21M is immediately set by the output TK of the T switch 11J through an input logical product gate circuit 211, and the set output of the T memory 21M is transmitted as a zero proof operation instruction $T_1$.

The change memory 21O is set by the output CHAK of the change switch 11L through an input logical product gate circuit 212 under the condition of $(CHAK) \cdot \overline{(EXC)} \cdot (ICF) \, T_1$, and the set output of the exchange memory 21O is transmitted as an exchange classification item signal CHA.

The exchange memory 21N is set by the output EXK of the exchange switch 11K through an input logical product gate circuit 213 under the condition of $(EXK) \cdot (ICF) \cdot T_1$, and the set output of the memory 21 is transmitted as an "exchange" classification item signal EXC.

In the above description, the reference character ICF designates a receipt item specifying signal which is delivered from a receipt item specifying signal forming circuit 111 (FIG. 31), and this signal is generated when operation instructions concerning the receipt items (that is, the outputs CAF - AB$_2$F of the cash receipt – another bank 2 memories 21B – 21E) are obtained during the buffer operation.

The T control circuit 21P has a signal forming circuit 214, which is a flip-flop circuit, for generating the operation instruction T$_2$. This circuit 214 is set through an input logical product gate circuit 215, which is provided for the exchange transaction, when the T switch 11J is depressed again under the condition of (CHA)·TK. Furthermore, the circuit 214 is set through an input logical product gate circuit 216, which is provided for the exchange transaction, when the T switch 11J is depressed again under the condition of (EXC)·TK. The set outputs T$_2$ of the circuit 214 are transmitted, as an addition operation instruction of the "collation" buffer memory B$_1$ and a printing execution instruction of the data output system 5, to an instruction selection decoder 34F and a branch and step control circuit 34E in an operation instruction circuit 34 (FIG. 4) described later. This operation instruction T$_2$ is employed as a reset signal for the cash receipt memory 21B.

Figure 4:
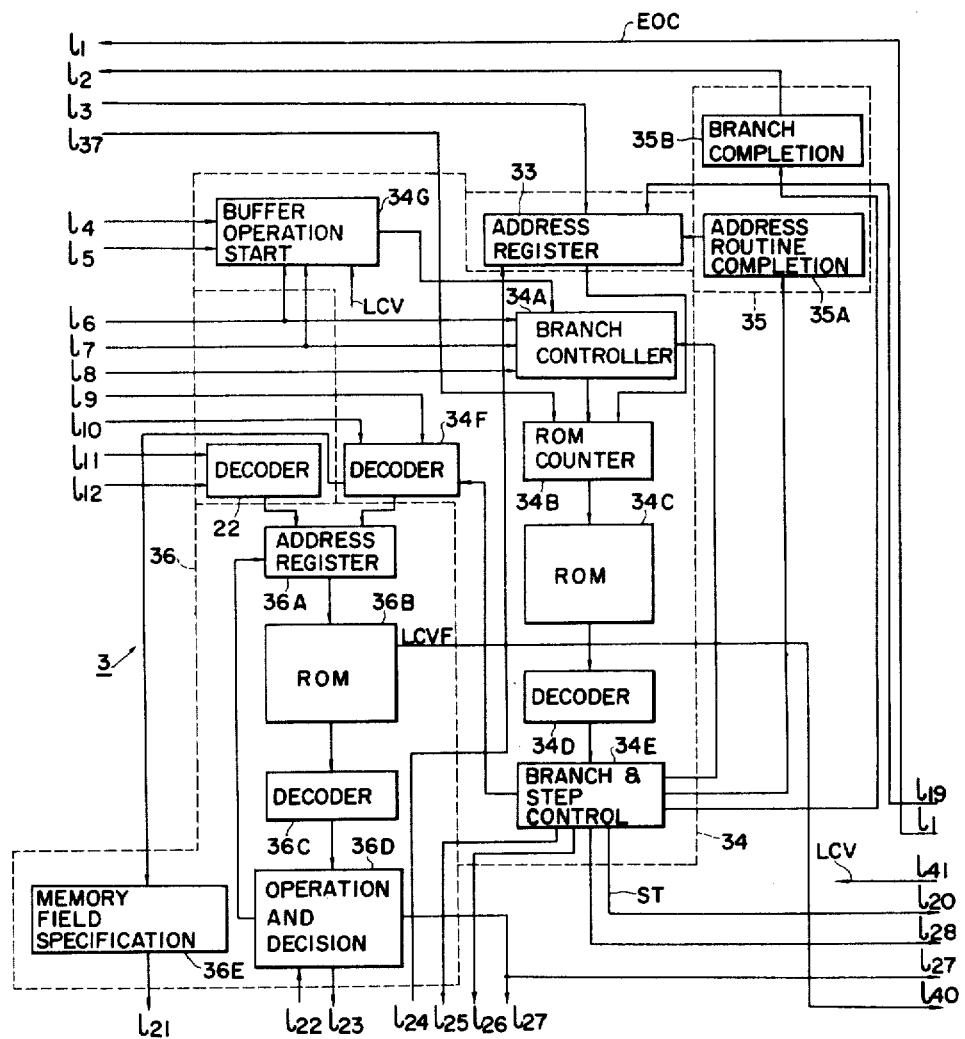

The T control circuit 21P is provided with a signal forming circuit 217, which is a flip-flop circuit, for generating the control signal T$_3$. This circuit 217 is set through an input logical product gate circuit 218 when the — switch 13B is depressed under the condition of (NK)·T$_1$, where NK is the key-out signal of the switch 13B. The set output T$_3$ of the circuit 217 is applied, as a buffer operation start condition, to a buffer operation start circuit 34G (FIG. 4) described later, and is also applied, as an operation instruction which is adapted to read-in registration data with a negative sign, to an instruction selection decoder 34F. The signal T$_3$ is furthermore applied, as a printing execution signal, to the branch and step control circuit 34E (FIG. 4).

The signal (T$_2$) forming circuit 214 is reset through a resetting logical product circuit 219 by a paper feeding signal PF which is generated whenever one line of printing is accomplished by a printer 52. The signal (T$_3$) forming circuit 217 is also reset by the paper feeding signal PF through a resetting logical product circuit 220 and is also reset by the output CHA of the change memory 21O or the output EXC of the exchange memory 21N.

The T control circuit 21P (in FIG. 34) operates as follows, on the basis of the fact that the key outputs TK, EXK and CHAK of the T, exchange and change switches 11J, 11K and 11L and the key-out output NK of the — switch 13B are successively applied thereto.

When the output TK of the T switch 11J is applied to the T control circuit 21P under the condition that the latter is in the reset state, the T memory 21M is set, and thereafter the output T$_1$ of the T memory 21M is maintained until the latter is reset by a clear key output CK.

Thereafter, upon arrival of the output NK of the — switch 13B, the signal (T$_3$) forming circuit 217 is set by the output NK through an input gate circuit 218, to produce the output T$_3$.

Thereafter, upon arrival of the output CHAK of the change switch 11L (or the output EXK of the exchange switch 11K), the change memory 21O (or the exchange memory 21N) is set under the condition that the receipt item signal ICF (or ICF) has arrived through an input gate circuit 212 (or 213), and the change classification item signal CHA (or the exchange classification item signal EXC) is transmitted.

When under these conditions the output TK of the T switch 11J is applied again, the signal (T$_2$) forming circuit 214 is set through an input gate circuit 215 (or 216), thereby producing the signal T$_2$.

The signal forming circuits 214 and 217 thus set are reset by the paper feeding signal PF which arrives first after the circuits 214 and 217 have been set.

Thus, in the T control circuit 21P, the output T$_1$ is produced for a period during which the change (or exchange) transaction is transacted. During this period, first, the output T$_3$ is produced, and then the resetting operation is conducted by the paper feeding signal PF. Thereafter the change classification item signal CHA (or exchange classification item signal EXC) is produced, and then the output T$_2$ is produced. Thereafter the resetting operation is conducted by the paper feeding signal PF.

The program address signal forming circuit 21 further comprises a group of main memory operation instruction memories H$_5$ which correspond to the groups of key-switches G$_5$ and G$_6$ and the line break operation instruction circuit 11R. This group of memories H$_5$ comprises: a receipt total memory 21R; a payment total memory 21S and a payment (which is, in this case, intended to designate that fact that money dispensed by the money dispensing machine is paid to a customer) memory 21T which are set through a key input circuit 21Q by the outputs of the receipt total; payment total and payment switches 11M, 11N and 11O, respectively; a total memory 21U which is set through the circuit 21Q by the output of the total/✶ switch 11P, which output is obtained through the contact ON of the audit switch 11Q; and an LB memory which is set through the circuit 21Q by the output of the line break operation instruction circuit 11R. The payment memory 21T is set under the condition that the payment total memory 21S produces a set output.

The program address signal forming circuit 21 further includes a group of main operation instruction memories H$_6$ which are provided for carrying out a confirmative printing on a journal after a certification has been printed on the certification printing slip. These memories H$_6$ are provided in connection with a certification printing operation instruction circuit G$_7$ and comprise a V (verification) receipt total memory 21W and a V payment total memory 21X which are provided for the printing operations of monetary receipt and payment, respectively.

The set outputs of these groups of memories H$_5$ and H$_6$ are applied to an instruction branch start circuit 21Y, which operates to apply a main operation start signal and a main branch selecting condition to the memory operation processing system 3. The main branch selecting condition is to select a proper main branch according to the contents of the set output applied to the instruction branch start circuit 21Y.

2-2. Data read-in decoder 22.

This data read-in decoder 22, as is shown in FIG. 4, operates to convert into predetermined formats registration data obtained through the key input circuit 12B by the ten-key device 12A (FIG. 3) and also registration data obtained by the three-shift control circuit 12E, respectively, and to apply the conversion outputs thus obtained, as registration data and a decimal point signal, to the memory operation processing system 3, thereby to effect the first function described before.

3. Memory operation processing system 3

The memory operation processing system 3 operates to effect the storage and operation of data applied by the data read-in decoder 22 with the aid of the output of the program addressing system 21 and the outputs of the buffer operation instruction control circuit 13 and management instruction control circuit 14 in the command input system, and to transmit drive instructions and data to the money dispensing machine 4 and the data output system 5.

Figure 5:
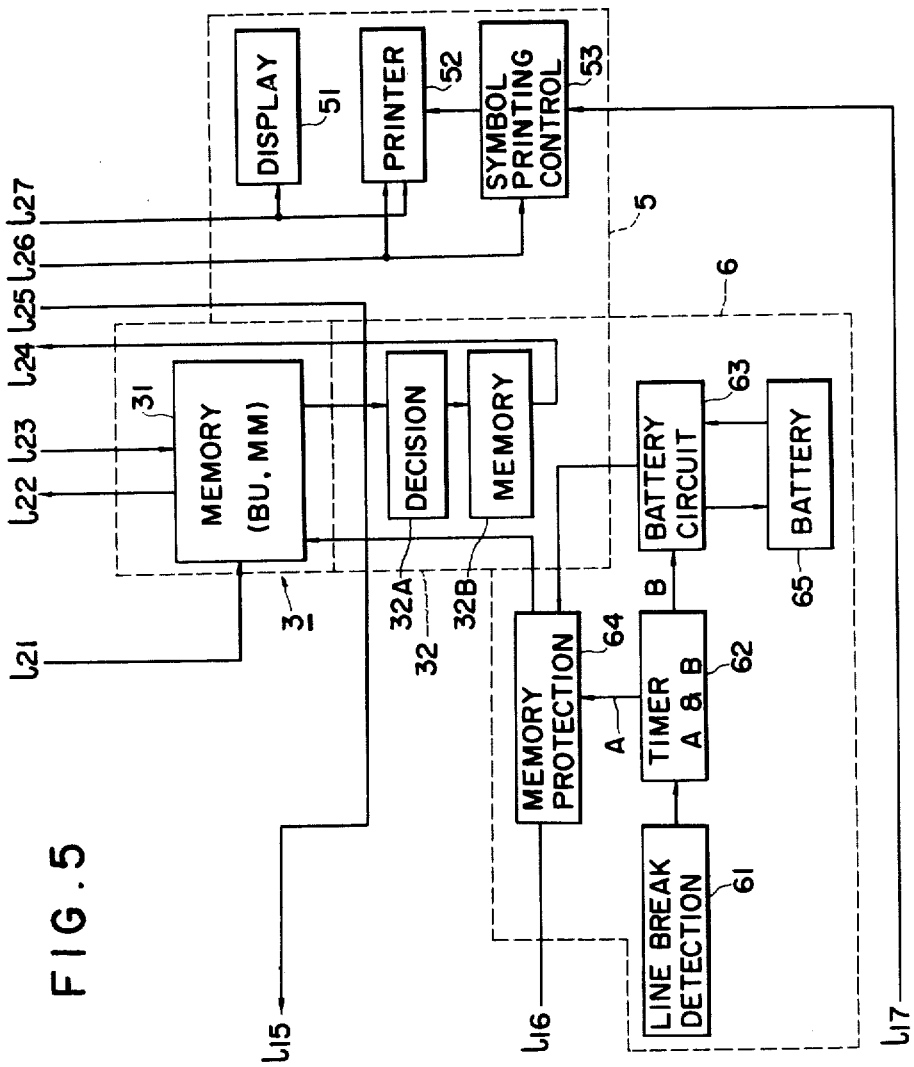

The memory operation processing system 3 comprises the following elements as is shown in FIGS. 4 and 5.

3-1. Memory device 31

A memory device 31 comprises: a buffer memory section BU which operates to store data applied in one transaction and to obtain a subtotal of the money amount for every classification item; and a main memory section MM which operates to store the results of additions of the data applied to the buffer memory section BU thereby to obtain a total money amount for every transaction classification at the time when the accounts are cast up. These memory sections BU and MM are constituted by, for instance, volatile memories.

Figure 9:
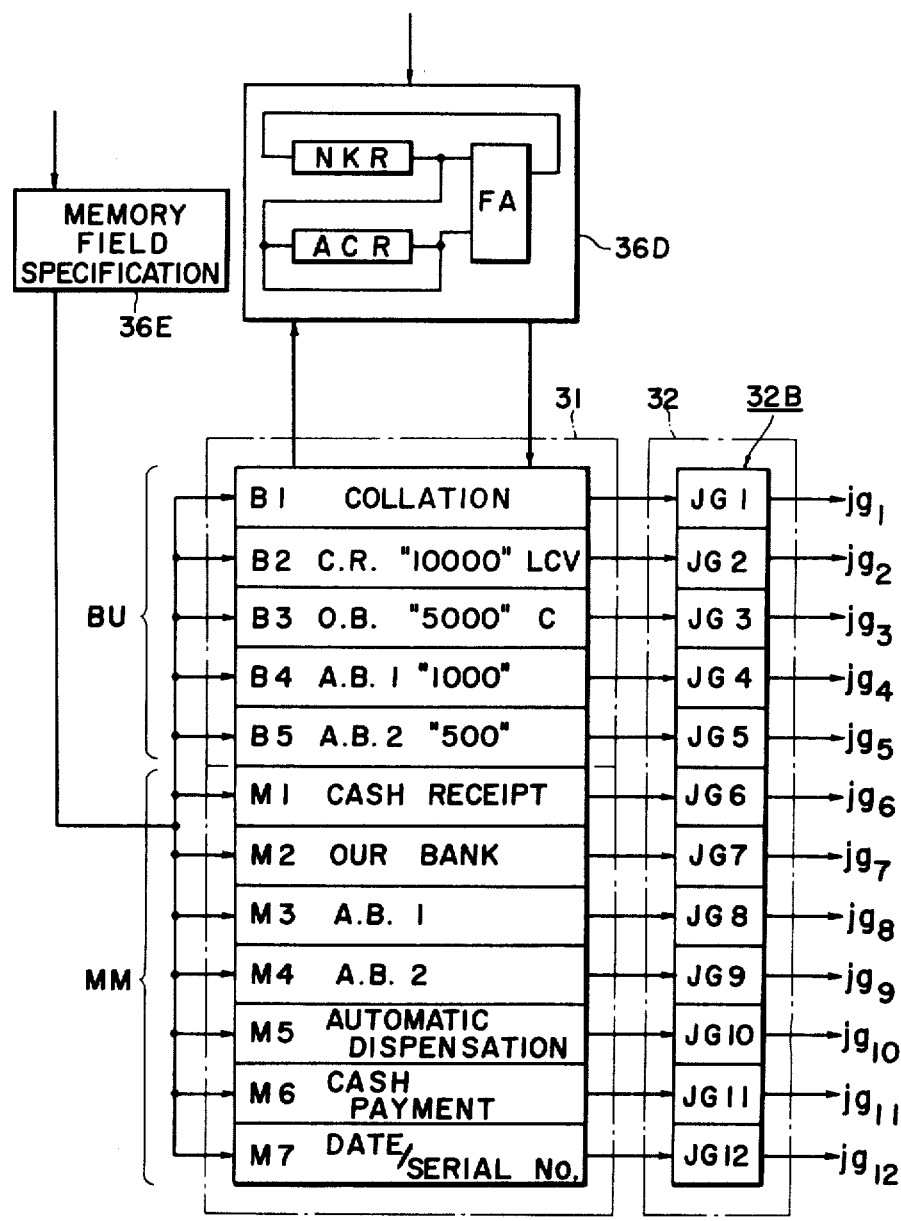
FIG. 9 is a block diagram provided for a description of a memory device shown in FIG. 5.

The buffer memory section BU, as is shown in FIG. 9, is provided with a collation buffer memory $B_1$ which is common for all of the classification items, and four buffer memories $B_2$ through $B_5$ which are adapted to store data separately according to the classification items (that is, the monetary denominations). Both data on the receipt of cash and data on the payment (LCV) by the first automatic money dispensation are applied to the buffer memory $B_2$. Similarly as in the case of the buffer memory $B_2$, data on the receipt of checks on our bank, data on the payment of 5,000-yen notes and data on the transaction of change money are applied to the buffer memory $B_3$. Furthermore, data on the receipt of checks on another bank 1 and data on the payment of 5,000-yen notes are applied. Data on the receipt of checks on another bank 2 and data on the payment of 500-yen notes are applied to the buffer memory $B_5$. In addition, data on the subtotal of one transaction is applied, for instance in a series mode, to the buffer memory $B_1$ for every classification. For instance, a 1024-bit shift register can be employed as the buffer memories described above.

The data on the receipt of cash, the data on the payment by the first automatic money dispensation, the data on the payment by the second automatic money dispensation and the data on the transaction of change money are provided in duplicate to these buffer memories $B_2 - B_5$ provided for the respective classification items because these data are not processed at the same time.

The contents in the buffer memories are renewed upon application of the next data.

The main memory section MM comprises main memories $M_1$ through $M_6$ which operate to store the results of additions of data provided separately according to the classification items, respectively, and a date/serial number main memory which operates to store data on dates and serial numbers.

The data on the receipt of cash is applied to the cash receipt main memory $M_1$. The data on the receipt of checks on our bank is applied to the our bank main memory $M_2$. The data on the receipt of checks on another bank 1 is applied to the another bank 1 main memory $M_3$. Similarly, data on the receipt of checks on another bank 2 is applied to the another bank 2 main memory $M_4$. Data on the automatic money dispensation is applied to the automatic dispensation main memory $M_5$. Data on the total of cash payments which are dispensed by the money dispensing machine and handed to customers by bank clerks is applied to the cash payment main memory $M_6$.

In each of the main memories, when a transaction has been transacted, the contents stored therein are renewed only by the result of addition of a subtotal monetary data (stored in the collation buffer memory $B_1$) for this transaction and the data which has been stored therein before the transaction. Otherwise, the contents of the main memories are never renewed.

The data in the main memory section MM and buffer memory section BU is as indicated below:

| Instruction word | Registration data | Sign for decimal point |
| --- | --- | --- |

The instruction words include the classification item to which the registration data belong, an address to be stored in the memory device, and operation step selecting conditions.

3-2. Decision processing circuit 32

A decision processing circuit 32 operates to read and store the contents of the instruction word in the data stored in the memories of the memory device 31 and comprises a decision circuit 32A and a condition memory 32B.

The decision circuit 32A operates to decide whether or not instruction words are included in the contents stored in the memories. In the case where data are stored in the memories, the decision circuit 32A operates to transmit decision outputs separately with respect to the memories.

The condition memories 32B, as is shown in FIG. 9, comprise twelve flip-flop circuits $JG_1$ through $JG_{12}$ which are adapted to store the decision outputs of the decision circuit 32A (not shown in FIG. 9). When the data has been stored in the buffer memories $B_1$ through $B_5$, the condition memory 32B operates to transmit condition outputs $jg_1$ through $jg_5$ indicating the presence of data in the memories from the circuits $JG_1$ through $JG_5$, respectively. Similarly, when the data has been stored in the main memories $M_1$ through $M_7$, the condition memory $32_B$ operates to transmit condition outputs $jg_6$ through $jg_{12}$ indicating the presence of data in the memories from the circuit $JG_6$ through $JG_{12}$, respectively.

3-3. Main operation branch selection address register 33

A main operation branch selection address register 33 (FIG. 10) operates to sequentially specify an operation program (that is, a main branch) corresponding to the contents of an instruction which has been specified by the program address signal forming circuit 21, by employing the condition outputs $jg_1$ through $jg_2$ of the decision processing circuit 32 as branch selection conditions and also employing as selection conditions the main branch selection signals of the program address signal forming circuit 21 (FIG. 2) and the position detection signal $S_{14}$, $S_{53}$, $S_{13}$ and $S_{52}$ which are provided separately according to the monetary denominations by the money dispensing machine 4.

Figure 10:
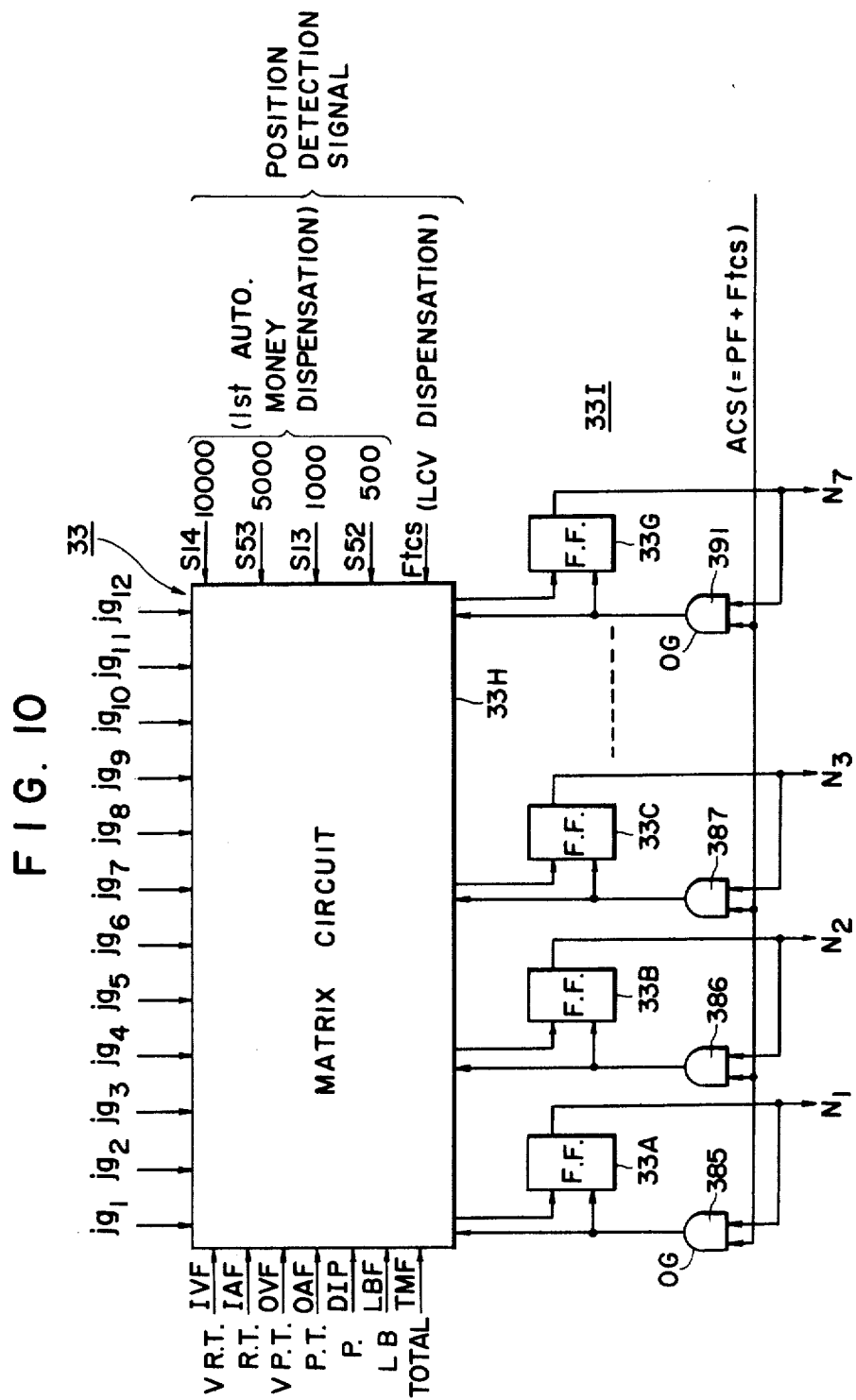
FIG. 10 is a block diagram illustrating in detail the construction of an address register provided for the selection of main operation branches which is shown in FIG. 4.

The address register 33, as is shown in FIG. 10, is provided with a matrix circuit 33H having an address output circuit 33I which comprises output holding circuits 33A through 33G provided respectively for address selection output lines $N_1$ through $N_7$.

When main operation instructions whose contents represent respectively the receipt total, payment total, payment, LB, total, V receipt total and V payment total are applied to the circuit 33H from the instruction branch start circuit 21Y, as is indicated in FIG. 11 the selection output lines $N_1$ through $N_7$ are selected according to the outputs of the decision processing circuit 32 (that is, the contents stored in the memory device 31) in order to successively specify the operation program (that is, the main branches) to be executed by the main operation instructions.

One example of the address register 33 is shown in FIGS. 22 through 27. In this example, the matrix circuit 33H comprises an address selection circuit 311, a priority order setting circuit 312 and an address output circuit 33I.

The address selection circuit 311 operates to select a main operation main branch which is necessary for processing data according to the contents of transactions, by selectively specifying the address signal output lines $N_1$ through $N_7$. In this selection, the condition outputs of the decision processing circuit 32, the main branch selection condition signals of the program address signal forming circuit 21, and the predetermined position detection signals provided separately according to the denominations from the money dispensing machine 4 are employed as selection conditions.

The address selection circuit 311 comprises: condition circuits 323, 327, 331 and 334 (which are, for instance, logical product circuits) which are operated in the main operations concerning the receipt total and V recept total; and a condition circuit 324 which is operated in the main operations concerning the payment total and V payment total. The circuit 311 further comprises; condition circuits 322, 326, 330 and 333 which are operated in the main operation concerning the payment in the first automatic money dispensation; condition circuits 325, 329, 332 and 335 which are operated in the main operations concerning the total and LB; a condition circuit 321 which is operated in the main operation concerning the payment by the LCV dispensation; and condition circuits 323 and 328 which are operated in the main operation concerning the change. The conditiion circuits described above are similar in construction to one another.

In order to select the output line $N_1$, the condition circuits 321 through 325 produce output signals $h_1$ through $h_5$, as address selection output, which are indicated by the fllowing logical expressions.

$$h_1 = q_1 (LCVF)(DIP) = (\overline{CHA})(jg_2)(LCVF)(DIP) \quad (1)$$

$$h_2 = q_1 (S_{14})(DIP)(\overline{LCVF}) = (\overline{CHA})(jg_2)(S_{14})(DIP)(\overline{LCVF}) \quad (2)$$

$$h_3 = (q_1 + q_2)\{(IAF)+(IVF)\} = \{(\overline{CHA})(jg) + (CHA)(jg_2)(\overline{DIP})\} = \{(IAF)+(IVF)\} \quad (3)$$

$$h_4 = (OAF) + (OVF) \quad (4)$$

$$h_5 = (jg_6)\{(TMF)+(LBF)\} \quad (5)$$

In order to selectively specify the output lines $N_2$, the condition circuits 326 through 329 produces output signals $h_6$ through $h_9$, as address selection signals, which are indicated by the following logical expressions.

$$h_6 = q_3 (S_{14})(DIP)(\overline{LCVF}) = (\overline{CHA})(jg_3)(S_{53})(DIP)(\overline{LCVF}) \quad (6)$$

$$h_7 = q_3\{(IAF)+(IVF)\} = (\overline{CHA})(jg_3)\{(IAF)+(IVF)\} \quad (7)$$

$$h_8 = q_4 (LCVF) = (CHA)(DIP)(jg_3)(LCVF) \quad (8)$$

$$h_9 = (jg_7)\{(TMF)+(LBF)\} \quad (9)$$

In order to selectively specify the output line $N_3$, the condition circuits 330 through 332 transmit output signals $h_{10}$ through $h_{12}$, as address selection signals, which are indicated by the following expressions.

$$h_{10} = (jg_4)(DIP)(\overline{LCVF})(S_{13}) \quad (10)$$

$$h_{11} = (jg_4)\{(IAF)+(IVF)\} \quad (11)$$

$$h_{12} = (jg_8)\{(TMF)+(LBF)\} \quad (12)$$

In order to selectively specify the output line $N_4$, the condition circuits 333, 334 and 335 operate to transmit output signals $h_{13}$, $h_{14}$ and $h_{15}$, as address selection signals, which are indicated by the following logical expressions.

$$h_{13} = (jg_5)(S_{53})(DIP)(LCVF) \quad (13)$$

$$h_{14} = (jg_5)\{(IAF)+(IVF)\} \quad (14)$$

$$h_{15} = {'jg_9}\{(IMF)+(LBF)\} \quad (15)$$

In connection with the logical expressions described above, LCVF represents the output of an LCV flag circuit 37D, and IAF, IVF, TMF, LBF, OAF, OVF and DIP represent the set outputs of the receipt total, V-receipt total, total, LB, payment total, V-payment total and dispensation memories 21R, 21W, 21U, 21V, 21S, 21X and 21T, respectively. Furthermore, jg$_2$, jg$_3$, jg$_4$, jg$_5$, jg$_6$, jg$_7$, jg$_8$ and jg$_9$ represent the condition outputs which are obtained from the decision processing circuit 32 on the basis of the fact that the data has been stored in the buffer memories $B_2$, $B_3$, $B_4$, $B_5$, $B_6$, $B_7$, $B_8$ and $B_9$, respectively, while CHA represents a control signal which is produced by the T control circuit 21P when the change memory 120 has been set. In addition, $S_{14}$, $S_{53}$ and $S_{13}$ represent predetermined-position detection signals which are produced by a money dispensation control section 43 separately according to the denominations when a money dispensation mechanism reaches the money dispensing positions of the 10,000-yen, 5,000-yen, 1,000-yen and 500-yen note containers in the money dispensing machine 4 which will be described later.

Moreover, $q_1$, $q_2$, $q_3$ and $q_4$ represent the outputs of gate circuits 341 through 344 which are provided for obtaining the condition inputs of the output lines $N_1$ and $N_2$, respectively, and are indicated by the following logical expressions.

$$q_1 = (\overline{CHA})(jg_2) \quad (16)$$

$$q_2 = (CHA)(jg_2)(\overline{DIP}) \quad (17)$$

$$q_3 = (CHA)(jg_3) \quad (18)$$

$$q_4 = (CHA)(DIP)(jp_3) \quad (19)$$

The selection outputs $N_1$ through $N_4$ produced by the address selection circuit 311 are applied to the priority order setting circuit 312.

With respect to the output lines $N_1$ through $N_4$, the priority order setting circuit 312 comprises input gate circuits 351 through 354 and output gate circuits 355 through 358 which are logical product circuits, input gate control circuits (flip-flop circuits) 359 through 362 provided for the input gate circuits 351 through 354, and output gate control circuits (inverter circuits) 363 through 365 provided for the output gate circuits 356 through 357.

The input gate control circuits 359 through 362 are set by a set signal S which is generated whenever one transaction has been transacted, and the set outputs $BR_1$ through $BR_4$ of the circuits 359 through 362 operate to maintan the input gate circuit 351 through 354 open, whereby the selection outputs $N_1$ through $N_4$ of the address selection circuit 312 are applied through the gate circuits 351 through 354 to the output gate circuits 355 through 358, respectively.

As a result, the following outputs $G_1$ through $G_4$ are obtained at the outputs terminals of the input gate circuits 351 through 354.

$$G_1 = \{(h_1) + (h_2) + (h_3) + (h_4) + (h_5)\} (BR_1) \quad (20)$$

$$G_2 = \{(h_6) + (h_7) + (h_8) + (h_9)\} (BR_2) \quad (21)$$

$$G_3 = \{(h_{10}) + (h_{11}) + (h_{12})\}(BR_3) \quad (22)$$

$$G_4 = \{(h_{13}) + (h_{14}) + (h_{15})\} (BR_4) \quad (23)$$

The start instruction BRSS of the above-described instruction branch start circuit 21Y, the address routine completion signal ACS of a main operation branch execution completion decision circuit 35, which will be described later, are applied, as first gate condition signals, to the output gate circuits 355 through 358 through an input circuit 366.

The instruction branch start circuit 21Y, as is shown in FIG. 23, receives the outputs IAF, IVF, TMF, LBF, DAF, CVF and DIP of the receipt total, V receipt total, total, LB, payment total, V payment total and payment memories 21R, 21W, 21U, 21V, 21S, 21X and 21T and the output (DIP) ($\overline{LCVF}$), to produce the branch start signal DRSS as a logical sum of these outputs. This start signal BRSS is stored in a memory cicuit 367 which is, for instance, a flip-flop circuit, and the output BRS of the memory circuit 367 is transmitted.

In addition, the outputs of the output gate control circuits 363, 364 and 365 are applied, as second gate condition signals, to the output gate circuits 356, 357 and 358 (with the exception of the output gate circuit 355). Although the operation of the control circuit 363 is based on the output $G_1$ of the $N_1$ input gate circuit 351, the control circuit 363 operates to open the output gate circuit 356 when the application of the output $G_1$ is suspended. Similarly, although the operation of the control circuit 364 is based on the outputs $G_1$ and $G_2$ of the $N_1$ input gate circuit 351 and $N_2$ input gate circuit 352, the control circuit 364 operate to open the output gate circuit 357 when the application of these outputs $G_1$ and $G_2$ is suspended. In addition, although the operation of the control circuit 365 is based on the outputs $G_1$, $G_2$ and $G_3$ of the $N_1$ input gate circuit 351, $N_2$ input gate circuit 352 and $N_3$ input gate circuit 353, the control circuit 365 operates to open when the application of these outputs $G_1$, $G_2$ and $G_3$ is suspended.

The priority order setting circuit 312 further comprises an $N_5$ output gate circuit 370, an $N_6$ output gate circuit 371, an output gate control circuit 372 which is common to the gate circuits 370 and 371, gate circuits 373 and 374 provided respectively for the gate circuits 370 and 371, and an input gate control circuit 375 which is common to the gate circuit 373 and 374.

The input gate control circuit 375 has the same construction as the control circuits 359 through 362 described above, and is set at the same time as the latter. The set output $BR_5$ is applied to the $N_5$ input gate circuit 373, and is applied through an inverter 376 to the $N_6$ input gate circuit 374.

The $N_5$ input gate circuit 373 is provided with first and second logical product circuits 377 and 378. The first logical product circuit 377 is adapted to transmit a logical output indicated by the following logical expression (24) to the $N_5$ output gate circuit 370.

$$G_5 = \{(TMF) + (LBF)\} (BR_5) (jg_{10}) \quad (24)$$

The second logical product circuit 378 is adapted to transmit a logical output indicated by the following logical expression (25) to the $N_5$ output gate circuit 370.

$$G_6 = \{(IAF) + (IVF) + (OAF) + (OVF)\}(BR_5)(jg_{10}) \quad (25)$$

The operation of the $N_5$ output gate circuit 370 is based on the outputs $G_1$ through $G_4$ of the gate circuits 351 through 354. The gate circuit 370 is opened by first and second gate condition signals, the former being the output of the control circuit 372 which is transmitted upon application of the outputs $G_1$ through $G_4$, the latter being the address routine completion signal ACS.

The $N_6$ input gate circuit 374 comprises first and second logical product circuits 379 and 380 also. The first logical product circuit 379 operates to transmit a logical output indicated by the following logical expression (26) to the $N_6$ output gate circuit 371.

$$G_7 = \{(TMF) + (LBF)\} (\overline{BR_5}) (jg_{10}) (jg_{11}) \quad (26)$$

The second logical product circuit 380 operates to transmit a logical output indicated by the following logical expression (27) to the $N_6$ output gate circuit 371.

$$G_8 = \{(IAF) + (IVF) + (OAF) + (OVF)\} (jg_{12})(\overline{BR_5}) \quad (27)$$

Similarly as in the case of the $N_5$ output gate circuit 370, the operation of the $N_6$ output gate circuit 371 is based on the outputs $G_1$ through $G_4$ of the input gate circuits 351 through 354. This output gate circuit 371 is opened by first and second condition signals, the former being the output of the control circuit 372 which is transmitted upon application of the outputs $G_1$ through $G_4$, the latter being the address routine completion signal ACS.

Figure 7:
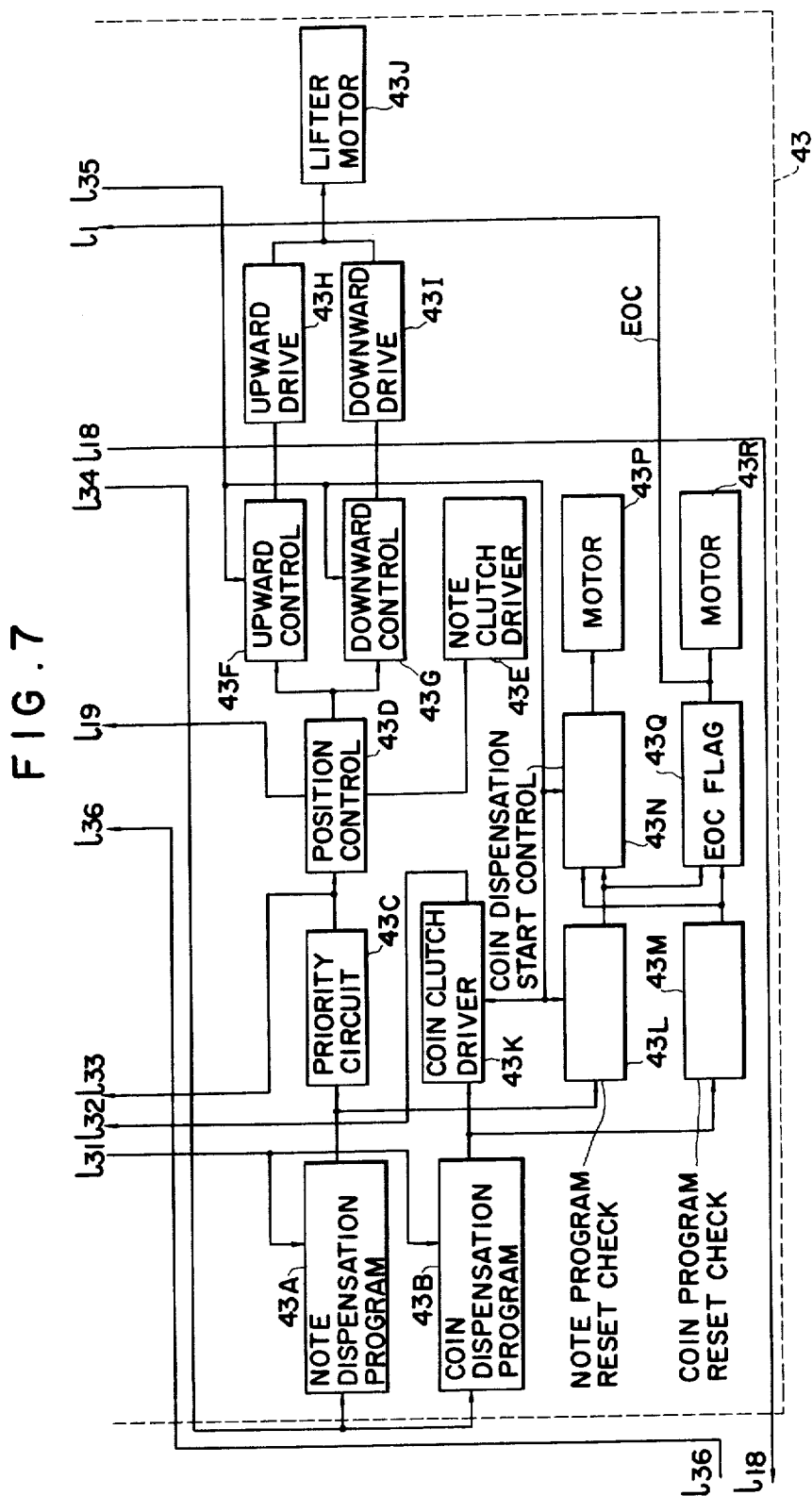
Figure 8:
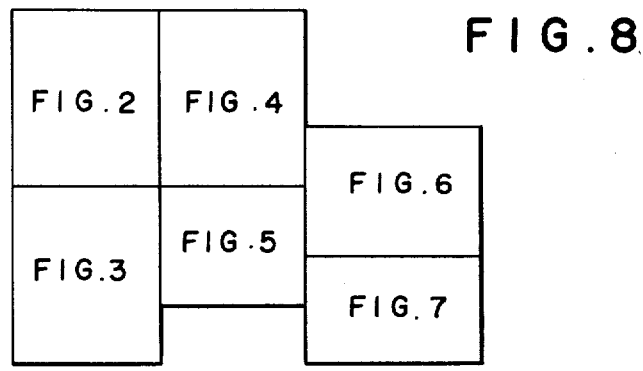
FIG. 8 is a diagram indicating the relationships in arrangement between FIGS. 2, 3, 4, 5, 6 and 7.
Figure 28:
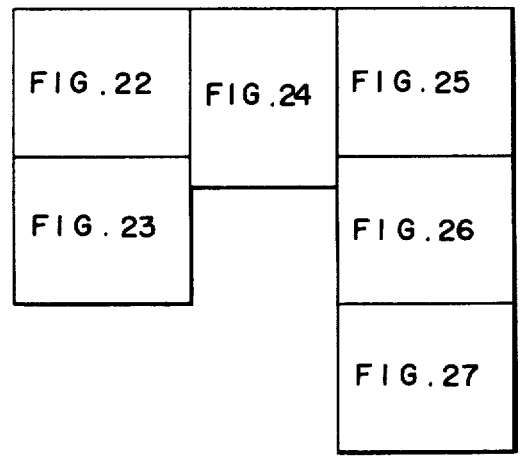
FIG. 28 is a diagram indicating the relationship in arrangement between FIGS. 22, 23, 24, 25, 26 and 27.
Figure 33:
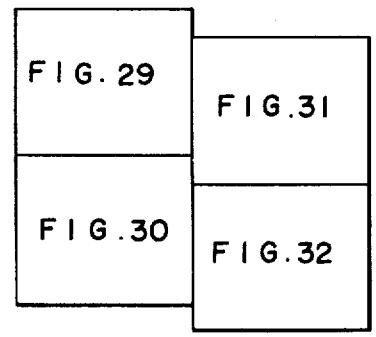
FIG. 33 is a diagram indicating the relationship in arangement between FIGS. 29, 30, 31 and 32.

The priority order setting circuit 312 is provided with an $N_7$ output gate circuit 381 as is shown in FIG. 7. This gate circuit 381 is opened by first, second and third gate condition signals, the first gate condition signal being the line break detection signal LBS which is transmitted when a line break protection circuit 6 described later has detected the interruption of the power line, the second gate condition signal being the set out LBF of the LB memory 21V described above, the third gate condition signal being the address routine completion signal ACS similarly as in the case of the other gate circuits.

As is shown in FIGS. 22 and 23, when the LB memory 21V has been reset by a reset circuit 396 under the condition of a logical sum of the paper feeding signal PF and the set output $N_6$ of the output holding circuit 33G, and, furthermore, the state of the output holding circuit 33G has been changed from a set state to a reset state by the address routing completion signal ACS, the $N_7$ output gate circuit 381 operates to transmit and output $G_9$ indicated by the following logical expression.

$$G_9 = (ACS)\,(\overline{LBF})\,(LBS) \tag{28}$$

Thus, the priority order setting circuit 312 transmits outputs F(N-1) through F($N_7$) indicated by the following logical expressions (29) through (35) for the output lines $N_1$ through $N_7$.

$$F(N_1) = G_1\{(BRSS)+(ACS)\} = \{(h_1)+(h_2)+(h_3)+(h_4)+(h_5)\}(BR_1)\{(BRSS)+(ACS)\} \tag{29}$$

$$F(N_2) = \overline{G}_1\,G_2\{(BRSS)+(ACS)\} = (\overline{BR}_1)\,G_2\{(BRSS)+(ACS)\} = (\overline{BR}_1)(h_6+h_7+h_8+h_9)(BR_2)\{(BRSS)+(ACS)\} \tag{30}$$

$$F(N_3) = \overline{G}_1\,\overline{G}_2\,G_3\{(BRSS)+(ACS)\} = (\overline{BR}_1)(\overline{BR}_2)\,G_3\{(BRSS)+(ACS)\} = (\overline{BR}_1)(\overline{BR}_2)(h_{10}+h_{11}+h_{12})(BR_3)\{(BRSS)+(ACS)\} \tag{31}$$

$$F(N_4) = \overline{G}_1\,\overline{G}_2\,\overline{G}_3\,G_4\{(BRSS)+(ACS)\} = (\overline{BR}_1)(\overline{BR}_2)(\overline{BR}_3)\,G_4\{(BRSS)+(ACS)\} = (\overline{BR}_1)(\overline{BR}_2)(\overline{BR}_3)(h_{13}+h_{14}+h_{15})(BR_4)\{(BRSS)+(ACS)\} \tag{32}$$

$$F(N_5) = \overline{G}_1\,\overline{G}_2\,\overline{G}_3\,\overline{G}_4\,(G_5+G_6)\{(BRSS)+(ACS)\} = (\overline{BR}_1)(\overline{BR}_2)(\overline{BR}_3)(\overline{BR}_4)\,(G_5+G_6)\{(BRSS)+(ACS)\} \tag{33}$$

$$F(N_6) = G_1\,G_2\,G_3\,G_4\,(G_7+G_8+G_9)\{(BRSS)+(ACS)\} \tag{34}$$

$$F(N_7) = G_9 = (ACS)(\overline{LBF})(LBS) \tag{35}$$

The output holding circuits 33A through 33G of the address output circuit 331 are, for instance, flip-flop circuits to the set terminals of which the outputs F($N_1$) through F($N_7$) of the priority order setting circuit 312 are applied. The set terminals of these output holding circuits 33G are connected to the output lines $N_1$ through $N_7$, respectively. The circuits 33A through 33F are provided with reset condition circuits 385 through 390, respectively, each of which is a logical circuit with two inputs, that is, the set output of the respective output holding circuit and the address routine completion signal ACS. The reset output of the reset condition circuits 385 through 390 are applied to the output holding circuits 33A through 33F to reset the latter, respectively, and are further applied to the priority order setting circuit 312 thereby to reset the input gate control circuits 359 through 362, respectively.

The main operation branch selection address register 33 shown in FIGS. 22 through 27 operates to sequentially select the output lines $N_1$ through $N_7$ with the aid of the condition outputs of the decision processing circuit 32.

Upon application of the receipt total main operation instruction IAF or V receipt total main operation instruction IVF, the priority order setting circuit 312 produces outputs based on the above-described logical expressions through the specified condition circuits and/or input gate circuits as is indicated in Table 1 below, thereby to select an output line which is necessary for the main operation.

Table 1

| Output line | Circuit | Logical expression | Output |
|---|---|---|---|
| $N_1$ | 323 | (3) | $h_3 = \{(IAF)+(IVF)\}$ |

Table 1-continued

| Output line | Circuit | Logical expression | Output |
|---|---|---|---|
| $N_2$ | 327 | (7) | $h_7 = \{(IAF)+(IVF)\}(jg_2)(CHA)$ |
| $N_3$ | 331 | (11) | $h_{11} = \{(IAF)+(IVF)\}(jg_3)(CHA)(jg_4)$ |
| $N_4$ | 334 | (14) | $h_{14} = \{(IAF)+(IVF)\}(jg_5)$ |
| $N_5$ | 378 | (25) | $G_6 = (BR_5)(jg_1)\{(IAF)+(IVF)\}$ |
| $N_6$ | 380 | (27) | $G_7 = (BR_5)(jg_{12})\{(IAF)+(IVF)\}$ |

Similarly as in the case described above, upon arrival of the payment total main operation instruction OAF or V payment total main operation instruction OVF, the circuit 312 operates to select the output lines necessary for the operation as is indicated in Table 2 below.

Table 2

| Output line | Circuit | Logical expression | Output |
|---|---|---|---|
| $N_1$ | 324 | (4) | $h_4 = (OAF)+(OVF)$ |
| $N_5$ | 378 | (25) | $G_6 = (BR_5)(jg_1)\{(OAF)+(OVF)\}$ |
| $N_6$ | 380 | (27) | $G_8 = (BR_5)(jg_{12})\{(OAF)+(OVF)\}$ |

Furthermore, upon arrival of the payment main operation instruction (without LCVF) and the exchange dispensation main operation instruction DIP (without CHA), the circuit 312 operates to select the output lines necessary for the operation as is indicated in Table 3 below.

Table 3

| Output line | Circuit | Logical expression | Output |
|---|---|---|---|
| $N_1$ | 322 | (2) | $h_2 = (DIP)\,(\overline{LCVF})\,(S_{14})(\overline{CHA})\,(jg_2)$ |
| $N_2$ | 326 | (6) | $h_6 = (DIP)\,(\overline{LCVF})\,(S_{33})(\overline{CHA})\,(jg_3)$ |
| $N_3$ | 330 | (10) | $h_{10} = (DIP)\,(\overline{LCVF})\,(S_{12})(jg_4)$ |
| $N_4$ | 333 | (13) | $h_{13} = (DIP)\,(\overline{LCVF})\,(S_{53})(jg_5)$ |

Moreover, upon arrival of the main operation instruction DIP (with LCVF in this case) based on the LCV dispensation, the circuit 312 selects the output line necessary for the operation as is indicated in Table 4 below.

Table 4

| Output line | Circuit | Logical Expression | Output |
|---|---|---|---|
| $N_1$ | 321 | (1) | $h_1 = (LCVF)\,(DIP)\,(CHA)(jg_2)$ |

Similarly, upon arrival of the change main operation instruction CHA, the circuit 312 selects the output line which is necessary for the operation, as is indicated in Table 5 below.

Table 5

| Output line | Circuit | Logical expression | Output |
|---|---|---|---|
| $N_1$ | 323 | (3) | $h_3 = \overline{(DIP)} \{(jg_3) + (IVF)\} (CHA)$ |

However, when the main operation instruction DIP is introduced in the change dispensation mode, the circuit 312 selects an output line which is necessary for the operation, as is indicated in Table 6 below.

Table 6

| Output line | Circuit | Logical expression | Output |
|---|---|---|---|
| $N_2$ | 328 | (8) | $h_8 = (CHA)(jg_3)(DIP)(LCVF)$ |

Similarly as in the case described above, upon arrival of the total main operation instruction TMF, the circuit 312 selects the output lines which are necessary for the operation, as is indicated in Table 7 below.

Table 7

| Output line | Circuit | Logical expression | Output |
|---|---|---|---|
| $N_1$ | 325 | (5) | $h_5 = (TMF)(jg_4)$ |
| $N_2$ | 329 | (9) | $h_9 = (TMF)(jg_7)$ |
| $N_3$ | 332 | (12) | $H_{12} = (TMF)(jg_8)$ |
| $N_4$ | 335 | (15) | $h_{15} = (TMF)(jg_9)$ |
| $N_5$ | 377 | (24) | $G_5 = (TMF)(BR_5)(jg_{10})$ |
| $N_6$ | 379 | 26 | $G_7 = (TMF)(BR_6)(jg_{11})$ |

In the same way, upon arrival of the LB main operation LBF, the priority order setting circuit 312 selects the output lines which are necessary for the operation, as is indicated in Table 8 below.

Table 8

| Output line | Circuit | Logical expression | Output |
|---|---|---|---|
| $N_1$ | 325 | (5) | $h_5 = (LBF)(jg_4)$ |
| $N_2$ | 329 | (9) | $h_9 = (LBF)(jg_7)$ |
| $N_3$ | 332 | (12) | $h_{12} = (LBF)(jg_8)$ |
| $N_4$ | 335 | (15) | $h_{15} = (LBF)(jg_9)$ |
| $N_5$ | 377 | (24) | $G_5 = (LBF)(BR_5)(jg_{10})$ |
| $N_6$ | 379 | (26) | $G_7 = (LBF)(BR_6)(jg_{11})$ |
| $N_7$ | 381 | (28) | $G_9 = (ACS)(LBF)(LBS)$ |

The selection outputs $N_1$ through $N_7$ thus obtained are sequentially transmitted in the priority order stated.

One example of this sequential transmission will be described with reference to the case where the receipt total main operation instruction is applied under the condition that data has been applied to the buffer memories $B_2$ through $B_5$.

Since the application of the condition outputs $jg_2$ through $jg_5$ have been effected in this case, the outputs $h_3$ through $h_{14}$ indicated in Table 1 are produced from the input gate circuits 351 through 354, and the output $G_6$ is produced from the input gate circuit 378, as a result of which the output lines $N_1$ through $N_4$ are selected. Furthermore, all of the input gate control circuits 359 – 375 have been set upon completion of the previous transaction. However the $N_2$, $N_3$, $N_4$, $N_5$ and $N_6$ output gate circuits 356 – 371 are in the open state with the aid of the respective gate control circuits 363, 364, 365 and 372.

Under these conditions, upon arrival of the branch start instruction BRSS from the instruction branch start circuit 21Y, the $N_1$ output gate circuit 355 is opened, whereby the output holding circuit 355 is set. As a result, an address output is transmitted to the output line $N_1$, while no address output is transmitted to the other output lines $N_2$ through $N_7$.

The address output thus transmitted to the output line $N_1$ is applied to an ROM counter 34B of an operation instruction circuit 34 which will be described later, whereby the main program for "cash receipt" is addressed.

Upon execution of this main operation program, the address routine completion signal ACS based on the paper feeding signal PF arrives, as a result of which the output holding circuit 355 is reset through the reset circuit 385, and this reset signal operates to reset the $N_1$ input gate control circuit. Accordingly, the $N_1$ input gate circuit 351 is closed, that is the production of the output $G_1$ is suspended, whereby the $N_2$ output gate circuit 356 is opened by the gate control circuit 363.

When the $N_2$ output gate circuit 356 has been opened, an address output is transmitted to the output line $N_2$ similarly as in the case described above, the main operation program for "receipt of a check on our bank" is addressed with respect to the operation instruction circuit 34.

Thus, whenever the address routine completion signal ACS is obtained, the output holding circuits of the output circuit 33I are reset while the input gate control circuits of the priority order setting circuit 312 are sequentially reset. The address outputs are sequentially delivered to the output lines $N_3$, $N_4$ and $N_5$ by sequentially setting the output holding circuit. As a result, the main operation programs of the receipt of a check on another bank 1, receipt of a check on another bank 2, and the subtotal of receipt in one transaction are sequentially addressed with respect to the operation instruction circuit 34.

When the address routine completion circuit signal ACS is applied to the $N_5$ output gate circuit 370 in order to set the $N_5$ output holding circuit 33E in the output circuit 33I, this signal ACS is simultaneously applied also to the $N_6$ output gate circuit 371. At this time instant, however, since the input gate control circuit 375 has not been reset, the output $G_8$ indicated in TAble 1 cannot be obtained because the condition $BR_5$ is not satisfied. Accordingly, the $N_6$ output holding circuit 33F is not set.

On the other hand, when the $N_5$ output holding circuit 33E and the gate control circuit 375 are both reset, the condition $BR_5$ for the output $G_8$ is satisfied, and therefore the output $G_8$ is produced. As a result, the $N_6$ output holding circuit 33F is set so that an address output is transmitted to the output line $N_6$. This address output operates to address the main operation program of the date/serial number with respect to the operation instruction circuit 34.

The operation of the address register 33 in the case when the receipt total main operation instruction IAF is obtained has been described. In the cases also when the other main operation instructions are obtained, the address register 33 operates to sequentially transmit address outputs to the output lines under the output conditions indicated in Tables 2 through 8, similarly as in the operation described above. However, when the LB main operation instruction LBF is obtained, the address register operates to transmit address outputs to the output lines $N_6$ and $N_7$ in the order stated, as is indicated in Table 8.

As is indicated in Tables 3, 4 and 6, when the payment main operation instruction is obtained, a predetermined-position detection signal Ftcs from the money dispensing machine 4 is employed as the address routine completion signal ACS, whereby as the dispensations of 10,000-yen, 5,000-yen, 1,000-yen and 500-yen notes have been successively completed, a step-by-step operation with respect to the $N_2$, $N_3$, $N_4$ and $N_5$ output holding circuits 33B, 33C, 33D and 33E is carried out.

3-4. Operation instruction circuit 34

An operation instruction circuit 34 operates to subdivide an operation branch (that is, a main branch) which has been specified by the address register 33 in the main operation mode, thereby to produce an execution step control signal and an operation execution instruction which specifies a program (that is, a sub-branch) for the execution of a numerical operation.

In this specification, the term main branch is intended to designate an operation program which should be specified for the operation instruction circuit 34 in a period during which the apparatus is in the main operation mode or the buffer operation mode, and the term sub-branch is intended to designate a program for executing a numerical operation specified in the main branch.

The operation instruction circuit 34, as is shown in FIG. 4, comprises a branch controller 34A, an ROM counter 34B, and ROM 34C, a micro-operation decoder 34D, a branch and step control circuit 34E, an instruction selection decoder 34F, and a buffer operation start circuit 34G.

The branch controller 34A operates to set a main branch in the ROM counter 34B selectively on the basis of program addressing signals which are obtained by the group of memories $H_1$, $H_2$, $H_3$ and $H_4$ described before (FIGS. 2 and 3). This set operation is achieved by the buffer operation start circuit 34G. More specifically, upon receipt of an addition or subtraction start instruction from the buffer operation instruction control circuit 13 (FIG. 3), the start circuit 34G operates to cause the addressing operation of a main branch with respect to the receipt classification instruction, manual payment classification instruction or payment money classification, which addressing operation is effected from the branch controller 34A to the ROM counter 34B, on the basis of the outputs from the group of memories $H_1$, $H_2$ or $H_3$.

The detailed constructions of the branch controller 34A and the buffer operation start circuit 34G are shown in FIGS. 29 through 32.

The buffer operation start circuit 34G (FIG. 31) comprises a receipt item specification signal forming circuit 111 and a payment item specification signal forming circuit 112. The start circuit 34G further comprises operation start signal forming circuits 113, 114 and 115 which are AND circuits to obtain operation start signals in the receipt item operation mode, payment item operation mode and LCV payment operation mode, respectively.

The signal forming circuits 111 and 112 are set by input signals $g_2$ and $g_3$ indicated by the following logical expressions (36) and (37), respectively.

$$g_2 = \frac{\{(CAF) + (OBF) + (AB_1F) + (AB_2F)\}(\overline{ODF})}{(\overline{BRS})} \quad (36)$$

$$g_3 = \frac{\{(14F) + (53F) + (13F) + (52F) + (LCVF)\}}{(\overline{T_1} + EXC)(\overline{ICF})} \quad (37)$$

In the above Eqs. (36) and (37), CAF, OBF, $AB_1F$, and $AB_2F$ are the set outputs of the cash receipt, our bank, another bank 1 and another bank 2 memories 21B, 21C, 21D and 21E, respectively; 14F, 53F, 13F and 52F are the set outputs of the 10,000-yen note, 5,000-yen note, 1,000-yen note and 500-yen note memories 21I, 21J, 21K and 21L, respectively; and LCVF is the output of an LCV flag circuit 37D which will be described later. Furthermore, ICF and ODF are the set outputs of the signal forming circuits 111 and 112, respectively; BRS is the operation start signal of the instruction branch start circuit 21Y (FIG. 23); $T_1$ is the control signal which is delivered from the T control circuit 21P (FIG. 3) when the T key 11J is operated; and EXC is the control signal which is produced by the T control circuit 21P in the exchange business.

When the apparatus is not in the main operation mode (or when $\overline{BRS}$ is obtained), the signal forming circuit 111 produces a receipt item output ICF under the condition that one of the receipt classification items is specified (that is, CAF, OBF, $AB_1F$ or AB F is obtained).

On the other hand, when the T key 11J has not been operated or the exchange mode has been specified, the signal forming circuit 112 produces a payment item output ODF under the condition that one of the payment items and LCV mode is specified (that is, 14F, 53F, 13F, 52F or LCVF is obtained).

These outputs ICF and ODF are applied to the branch controller 34A, and are applied to a 1/15 address signal forming circuit 116 through an OR circuit 117. The signal forming circuit 116 is a two-input AND circuit which receives the signal BRS as its one input.

Thus, in the case when the apparatus is not in the main operation mode, the branch controller 34A produces an $X_5$ address signal $\overline{BRS}$ (ICF + ODF) when the receipt item output ICF and payment item output ODF are applied thereto.

On the other hand, the operation start signal forming circuit 113 for the receipt item operation mode produces, as a buffer start signal, an output signal $f_1$ indicated by the following logical expression (38).

$$f_1 = (ADD)\{(ICF) + (ODF)\}(\overline{WE})(ICF) \quad (38)$$

The operation start signal forming circuit 114 for the payment item operation mode produces, as a buffer start signal, an output signal $f_2$ indicated by the following logical expression (39).

$$f_2 = (ADD)\{(ICF) + (ODF)\}(ODF)(\overline{LCV}) \quad (39)$$

Furthermore, the operation start signal forming circuit 115 for the LCV payment operation mode produces, as a buffer start signal, an output signal $f_3$ indicated by the following logical expression (40).

$$f_3 = (\overline{WE})(LCVF) \quad (40)$$

In the logical expressions (38), (39) and (40), ADD is the output which is produced by the key input circuit 13C (FIG. 3) when the + key 13A is operated, and WE is the input inhibit signal which when a numerical data has been applied, is produced so that data is no longer applied.

When the output signals, or buffer start signals, $f_1, f_2$ and $f_3$ are produced by the operation start signal forming circuits 113, 114 and 115, respectively, these signals are applied to the branch controller 34A.

The branch controller 34A is provided with a $Y_0$ address signal forming circuit 120 which is a flip-flop circuit. This circuit 120 is set by the buffer start signal, hereby to produce its set output ROMF as a $Y_0$ address signal. The circuit 120 is reset by a branch completion signal ACS produced by the branch and step control circuit 34E which will be described later.

The branch controller 34A further comprises a $Y_2$ address signal forming circuit 121 which is a two-input NAND circuit for instance. To one of the inputs of this circuit 121, the output CAF of the "cash receipt" memory 21B in the group of receipt classification item memories $H_1$ and the output 14F of the 10,000-yen note memory 21 in the group of payment money classification item memories $H_3$ are applied through an OR circuit 121A.

The branch controller 34A further comprises $Y_3$, $Y_4$ and $Y_5$ address signal forming circuits 122, 123, and 124 which are similar to the $Y_2$ address signal forming circuit 121. These circuits 122, 123 and 124 receive through OR circuits 122A, 123A and 124A the output OBF of the our bank memory 21C and the output 53F of the 5,000-yen note memory 21J, the output $AB_1F$ of the another bank 1 memory 21D and the output 13F of the 1,000-yen note memory 21K, and the output $AB_2F$ of the another bank 2 memory 21E and the output 52F of the 500-yen note memory 21L, respectively.

OR circuits 125 and 126 are provided in the input paths of the $Y_2$ and $Y_3$ address signal forming circuits 121 and 122, respectively. Through these OR circuits 125 and 126, the LCV signal LCVF (indicating that the LCV payment operation mode has been specified) and the monetary change signal CHA (indicating that the change operation mode has been specified) are applied, respectively.

On the other hand, a condition signal $\overline{T_3}.\overline{BRS}$ (indicating that neither of the main operation mode and zero proof operation mode has been specified, that is, the buffer operation mode has been specified) which is obtained on the basis of both the "T" control signal $T_3$ (indicating that the zero proof operation mode has been specified) from the "T" control circuit 21P and the main operation branch start signal BRS (indicating that the main operation mode has been specified) from the instruction branch start circuit 21Y, is applied, as a zero condition input, to the $Y_2$, $Y_3$, $Y_4$ and $Y_5$ address signal forming circuits 121 through 124.

Thus, when the receipt classification item memories 21B - 21E or the payment classification item memories 21I - 21L are set in the buffer operation mode, or when the LCV payment operation mode is specified, the branch controller 34A operates to produce the $Y_2$, $Y_3$, $Y_4$ and $Y_5$ address signals from the respective circuits 121 through 124.

The above-described condition signal $\overline{T_3} . \overline{BRS}$ is directly produced as a $Y_1$ address signal.

The $Y_0$ through $Y_5$ address signals thus produced are applied to $Y_0$, $Y_1$, $Y_2$, $Y_3$, $Y_4$ and $Y_5$ address input circuits 140 through 145 of the ROM counter 34B, respectively.

The ROM counter 34B operates to read out of a Read-only memory (ROM) 34C an operation program (that is, a main branch) which is addressed by an address operation which is carried out by the branch controller 34A in the buffer operation mode or by an address operation which is carried out by the address register 33 in the main operation mode.

Figure 13:
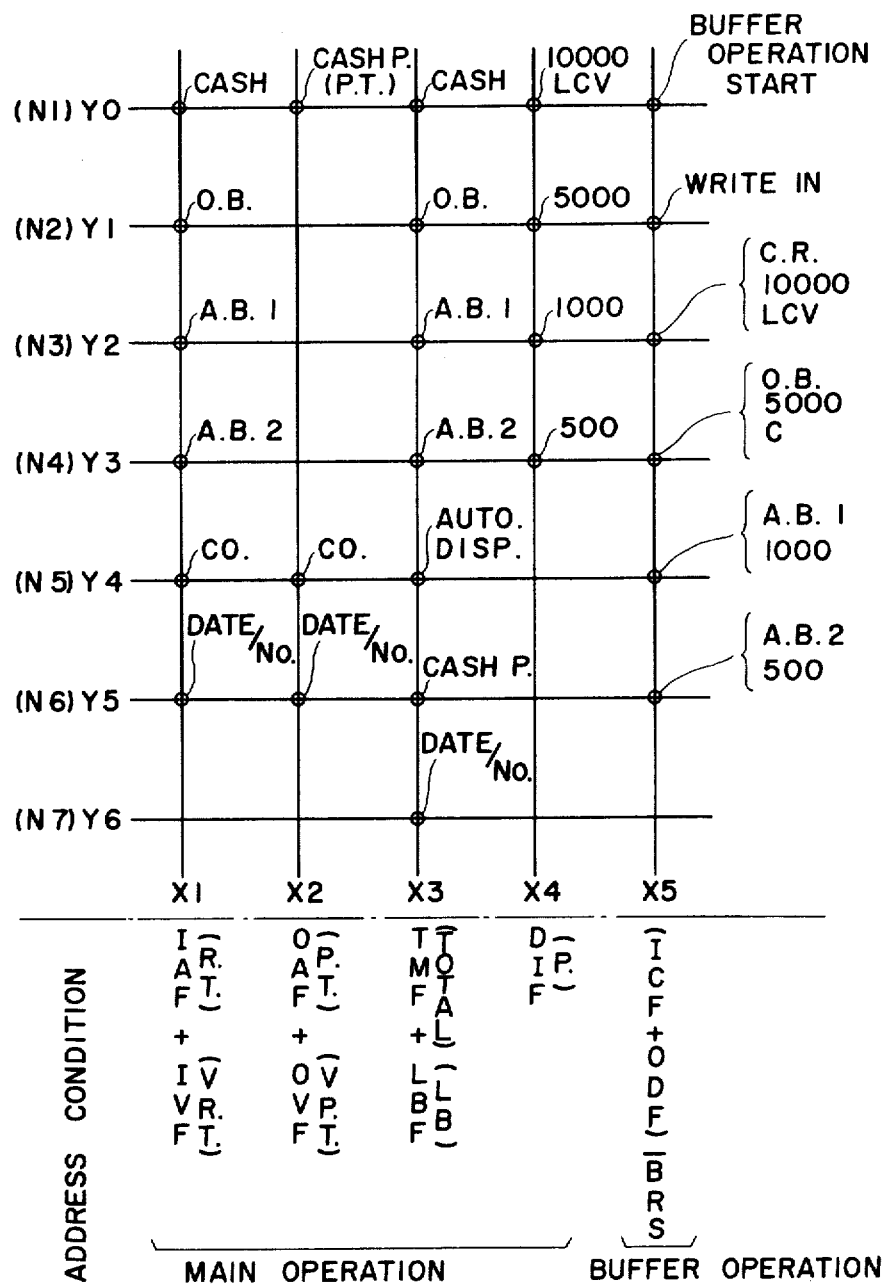
FIG. 13 is a diagram provided for a description of the address operation of a ROM counter shown in FIG. 4.

The ROM counter 34B selects a main branch for execution of the main operation mode or buffer operation mode specified, on the basis of the address conditions indicated in FIG. 13. More specifically, the ROM counter 34B is provided with Y address input lines $Y_0$ through $Y_5$ and X address input lines $X_0$ through $X_5$. The Y address input lines are addressed from the address register 33 in the main operation mode (the Y address input lines being selected by the input circuits 140 through 150 described above), while the X address input lines are addressed, in the same way as in the case of the Y address input line, according to the operation mode specified.

The main branches stored in the ROM 34C are assigned to the addresses which are provided at the intersection points of the X and Y address input lines. Accordingly, in the case when the addresses are successively selected, the main branches fixedly stored in the ROM 34C are also successively read out in the order of the address selection, that is, a main branch corresponding to an address selected is read out of the main branches stored in the ROM 34C.

In FIG. 13, the X address input lines $X_1$ through $X_4$ are addressed when the apparatus is in the main operation mode, while the X address input line $X_5$ is addressed when the apparatus is in the buffer operation mode.

That is, the input line $X_1$ is addressed by both the address signal IAF (which is the output of the receipt total memory 21R) which is applied in the case of the receipt total mode and the address signal IVF (which is the output of the V receipt total memory 21W) which is applied in the case of the V receipt total mode, while the input lines $Y_0$, $Y_1$, $Y_2$, $Y_3$, $Y_4$ and $Y_5$ are successively addressed. Therefore, the main branches corresponding to the addresses at the intersection points of the input lines $Y_0$ through $Y_5$ and the input line $X_1$, that is, the cash, our bank, another bank 1, another bank 2, collation (read-out) and date operation programs are successively read out of the ROM 34C.

The input line $X_2$ is addressed by the address signal OAF (which is the output of the payment total memory 21S) and the address signal OVF (which is the output of the V payment total memory 21X) which are applied in the cases of the payment total and V payment total modes, respectively, while the input lines $Y_0$, $Y_4$ and $Y_5$ are successively addressed. Therefore, the main branches corresponding to the addresses at the intersection points of these input lines $Y_0$, $Y_4$, $Y_5$ and $X_2$, that is, the cash payment (payment total), collation (read-out) and date operation programs are successively read out of the ROM 34C.

The input line $X_3$ is addressed by the address signal TMF (which is the output of the memory 21U) and the address signal LBF (which is the output of the memory 21V) which are applied in the total and LB modes, respectively, while the input lines $Y_0$, $Y_1$, $Y_2$, $Y_3$, $Y_4$ and $Y_5$ are successively addressed. Therefore, the main branches corresponding to the addresses at the intersection points of these input lines $X_3$ and $Y_0$ through $Y_5$, that is, the cash, our bank, another bank 1, another bank 2, automatic dispensation and cash payment (date) operation programs are successively read out of the ROM 34C. In the case where the address $(X_3, Y_5)$ is addressed, if the operation mode is the total operation mode, only the cash payment operation program will be read out, and if it is the LB operation mode, the cash payment and date operation programs will be successively read out.

The input line $X_4$ is addressed by the address signal DIP (which is the output of the memory 21T) which is applied in the payment mode, while the input lines $Y_o$, $Y_1$, $Y_2$ and $Y_3$ are successively addressed. As a result, the main branches corresponding to the addresses at the intersection points of these input lines $X_4$, and $Y_o$ through $Y_3$, that is, the 10,000, 5,000, 1,000 and 500 operation programs are successively read out of the ROM 34C.

In the buffer operation mode, the input line $X_5$ is addressed by the address signal (ICF + ODF) $\overline{BRS}$ (which is the output of the branch controller 34A in FIG. 31) which is applied upon receipt of the receipt item data and payment item data (including the data of the LCV mode), while the input lines $Y_o$, $Y_1$, $Y_2$, $Y_3$, $Y_4$ and $Y_5$ are successively addressed. As a result, the main branches that are the buffer operation start, numerical data write-in, cash, our bank, another bank 1 and another bank 2 operation programs are read out of the ROM 34C in a first case when the receipt item data is applied, while the main branches which are the buffer operation start, numerical data write-in 10,000, 5,000, 1,000 and 500 operation programs are read out of the ROM 34C in a second case when the payment item data is applied.

Especially in the LCV mode in the buffer operation, the input lines $Y_o$, $Y_1$ and $Y_2$ are addressed, as a result of which the buffer operation start, numerical data write-in and LCV operation programs are read, as main branches, out of the ROM 34C.

The operation programs corresponding to the addresses are fixedly stored, as main branches, in the ROM 34C, as was described above. Each of the operation programs includes a step signal which is adapted to control peripheral equipment which is driven for the execution of the operation program, and a sub-branch selection instruction adapted to selectively specify an operation program (that is, a sub-branch) provided for the numerical operation of data which is stored in the main memory section MM or the buffer memory section BM according to the operation mode specified. These execution signals and instructions are transmitted out of the ROM 34C in a predetermined order when the main branches are addressed by the address register 33 as was described above.

The execution signal of the main branch read out of the ROM 34C is decoded by the micro-operation decoder 34D and is applied to the branch and step control circuit 34E. This circuit 34E operates to distribute the step signal to the periphery equipment which is provided for the execution of an operation program of a main branch, and to apply a sub-branch selection instruction to the instruction selection decoder 34E.

This instruction selection decoder 34F operates to convert a start condition as to a numerical operation which is to be executed according to a given sub-branch selection instruction, into a predetermined format which is set in an address register 36A which will be described later.

The collation and date/serial number instruction signals are applied, as an operation execution instruction, from a management instruction control circuit 14 to the instruction selection decoder 34F. When the instruction set in the ROM counter 34B is especially the buffer operation instruction, a branch completion signal is applied from the control circuit 34E to the branch controller 34A whenever a buffer operation for each of the classification items is completed, as a result of which the branch selection operation of the circuit 34A is carried out step by step.

(3-5) Main operation branch execution completion decision circuit 35

This decision circuit 35, especially in the case where the instruction set in the ROM counter 34B is the buffer operation instruction as was described above, operates to cause the step-by-step selection operation of the address register 33 and the reset operations of the main operation instruction memory groups $H_5$ and $H_6$ described before.

The decision circuit 35 comprises an address routine completion decision circuit 35A and a branch completion decision circuit 35B.

The circuit 35A operates to apply to the output holding circuits 33A through 33G (FIG. 9) a logical sum signal ACS (= PF + Ftcs) of the paper feeding signal PF produced by the printer 52 and a predetermined-position detection signal Ftcs transmitted by the money dispensing machine 4. The paper feeding signal PF is produced by the printer 52 when a step signal to the periphery equipment is produced by the branch and step control circuit 34E in the operation instruction circuit 34 so that the printer 52 completes its printing operation of, for instance, one line. The predetermined-position detection signal Ftcs is sent from the money dispensing machine 4 when the money dispensation mechanism reaches the money dispensation position, or predetermined-position, of each of the money containers provided separately according to the monetary denominations. The logical sum signal ACS (= PF + Ftcs) is employed as an address routine completion signal indicating the completion of an address operation with respect to one main branch specified.

Thus, the output holding circuit of one output line which has been in a set state is reset, and the main branch relating to the next output line is addressed. In the end, the address routine completion decision circuit 35 thus forms an instruction selection cycle of a key operation with the address register 34A, ROM counter 34B, ROM 34C, micro-operation 34D and branch and step control circuit 34E. Through the instruction selection cycle thus formed, the address operations of the output lines $N_1$ through $N_6$ of the address register 33 are carried out step-by-step.

The branch completion decision circuit 35B, upon completion of all of the operations of a main operation, operates to reset the main operation instruction memory groups $H_5$ and $H_6$ with the aid of the branch completion signal transmitted from the branch and step control circuit 34E in the operation instruction circuit 34, so that the memory groups $H_5$ and $H_6$ will be ready for receiving the succeeding instruction input.

(3-6) Operation processing control circuit 36

This circuit 36 operates the write registration data applied in one transaction into the buffer memory section BU. Furthermore, according to the classification data and operation instructions, the circuit 36 operates to read out the numerical data stored in the buffer memory section BU and the main memory section MM, to subject the data thus read out to addition or subtraction, and to write the resultant data of the addition or subtraction into the memory sections BU and MM. In addition, the circuit 36 operates to transmit the data stored in the buffer memory section BU and the main memory section MM to the data output system 5 and-/or the money dispensing machine 4.

The operation processing control circuit 36, as is shown in FIG. 4, comprises an address register 36A for operation execution, a ROM 36B, a micro-operation decoder 36C and an operation and decision circuit 36D.

The address register 36A is set by receiving registration data and a decimal point signal from the data read-in decoder 22 of the program addressing system 2 and also an operation start condition signal from the instruction selection decoder 34F of the operation instruction circuit 34 and simultaneously reads a corresponding sub-branch out of the ROM 36B which is employed as an instruction word described before. This instruction word, the registration data, and a decimal point sign are combined into one data signal which is applied to the micro-operation decoder 36C.

The combined data signal is decoded by the decoder 36C and is transmitted to the operation and decision circuit 36D.

The operation and decision circuit 36D, as is shown in FIG. 9, is provided with an operation circuit which comprises a register NKR which receives a data signal from the micro-operation decoder 36A and dynamically stores data signal through a full adder FA, and a register ACR which reads out of the memory device 31 and dynamically stores the data. The registration data of the register ACR is added to that of the register NKR by the full adder FA, and the resultant data is stored in the register ACR and thereafter written in the memory device 31.

The data stored in the buffer memories $B_2$ through $B_5$ provided separately according to the classification items in the memory device 31 are read out to be added to the registration data by the operation circuit 36D, the resultant data being written in the collation buffer memory $B_1$, or the data stored in the collation buffer memory $B_1$ and also in the main memories $M_1$ through $M_6$ are read out to be added to one another, the resultant data being written into the memories $M_1$ through $M_6$, or the data stored in the buffer memory $B_1$ or the main memories $M_1$ through $M_6$ are introduced into the operation circuit 36D, the data thus introduced being applied to the data output system 5.

In the case when the data are read out of or written into the memory device 31, the transmission of the data is carried out by a memory field specifying circuit 36E on the basis of an operation start condition output of the instruction selection decoder 34F.

In addition to the operation function described above, the operation decision circuit 36D has a function described below. That is, if after the completion of an operation of one step, the execution of the next operation is necessary, the set condition of the address register 36A is advanced by one state (or the state of the address register 36A is set to be another state) by the output condition of a decision circuit incorporated in the operation decision circuit 36D, whereby the operation of the succeeding step is executed.

The step-by-step function described above is effected in the execution of the date/serial number branch (when a date set instruction signal is applied by the date switch 14C). In this operation, first an operation for adding 1 to the least significant digit of a registration data in the data/serial number main memory $M_7$ is carried out, and upon completion of this operation the next operation step is set in the address register 36A by the output signal of the decision circuit.

An operation processing cycle for the operations between the buffer memories or between the buffer memories and the main memories, and also for the read-out and write-in of the buffer memories and the main memories is formed by a loop circuit made up of the address register 36A, ROM 36B, micro-operation decoder 36C, and operation decision circuit 36D.

3-7. Transfer output circuit 37

This transfer output circuit 37 operates to transfer registration money amount data and a dispensation mode signal to the money dispensing machine 4 when money is paid by the automatic money dispensation, and comprises a transfer status control circuit 37A.

This circuit 37A operates to apply a transfer control signal of one word time (hereinafter referred to as a transfer flag signal or a TRF signal when applicable) to a transfer control circuit 37B so that when data introduced into the operation circuit of the operation decision circuit 36D is transferred through the transfer control circuit 37B to the money dispensing machine 4, the data is statically stored, as a money amount represented by a binary coded decimal number, in a memory distributor 37C. After the data has been transferred to the memory distributor 37C, the transfer status control circuit 37A produces a load signal load for transferring the contents of the memory distributor 37, as a parallel data, to the money dispensing machine 4.

Furthermore, the transfer status control circuit 37A operates to produce transfer clock pulses within a time period for transferring one word so that when the circuit 37A transfers registration data to the money dispensing machine 4 through the transfer control circuit 37B, an error check and a memory check are carried out in the money dispensing machine 4.

Thus, the transfer output circuit 37 operates to transfer a static parallel money amount data of a binary coded decimal number through the memory distributor 37C from the operation decision circuit 36D and also a dynamic series money amount data directly from the transfer control circuit 37B to the money dispensing machine 4.

The transfer output circuit 37 further comprises an LCV flag forming circuit 37D which, when the application of registration data is effected by the ten-key device before the application of classification item data is carried out by the classification item switch other than the switches of the ten-key device, produces an LCV signal LCVF as a second automatic money dispensation mode signal on the basis of the registration data which is applied from the ROM 36B to the operation and decision circuit 36D.

Figure 30:
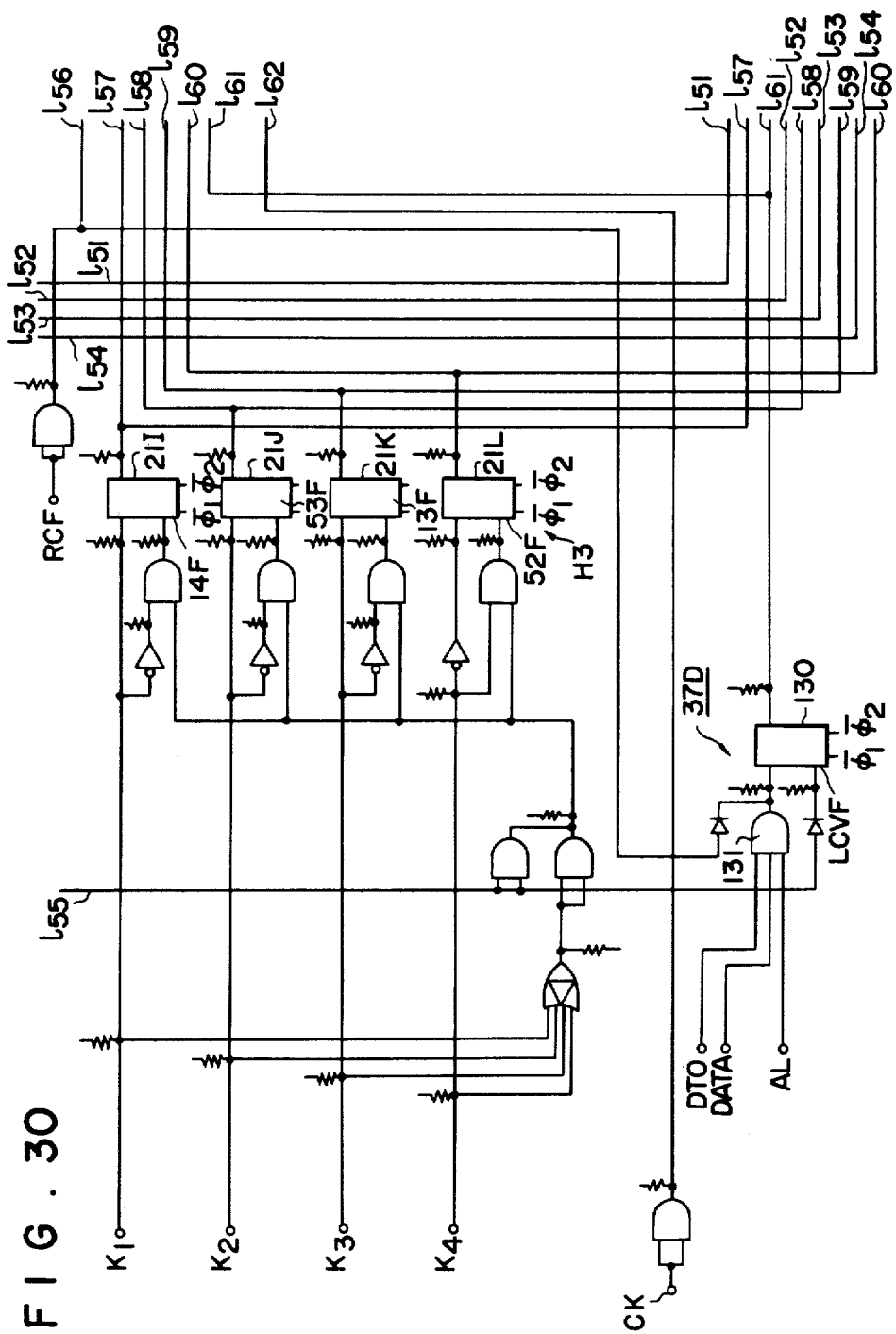

The LCV flag forming circuit 37D, as is shown in FIG. 30, comprises a flip-flop circuit 130 and its input condition circuit 131, which is an AND circuit. The input condition circuit 131 operates to set the flip-flop circuit 130 with the timing of a predetermined timing signal DTO when data DATA from the ROM 36B is applied to the input condition circuit 131, under the condition that a condition signal AL is available which is introduced to the same circuit 131 only when data is registered by the ten-key device 12A with the group of payment money classifying key-switches $G_3$ being not operated.

Thus, the LCV flag forming circuit 37D produces the LCV signal LCVF when the keys of the ten-key device 12A are operated before the operation of the other keys.

Depending on the program address signal and the registered data from the data input system 8, which comprises the instruction input system 1 and the program addressing system 2, the memory operational processing system 3 of the above-mentioned composition first carries out buffer operation programs as defined hereinbefore for classifying and memorizing the same, and then carries out main operation programs.

1. In the case of receiving:

The buffer operation programs are carried out as follows.

a. Either one of the switches 21B through 21E (for cash through other bank 2) of the deposition classification switch group $G_1$ is depressed.

i. A main branch for the buffer operation corresponding to the depressed key switch is selected by the operation instruction circuit 34, and a sub-branch corresponding to the main branch is set in the instruction selecting decoder 34F.

b. The amount of money to be deposited is registered by means of ten-key device 12A.

i. The data thus registered are combined in the operation processing control circuit 36 with the instruction words, and the data thus combined are read into the register NKR (FIG. 9) in the operation discriminating circuit 36D.

c. The + key switch 13A is depressed.

i. The buffer operation is started by the buffer operation starting circuit 34G, and the registered data are added into the buffer memories $B_2$ through $B_5$ in the memory device 31.

ii. The registered data are also read into the collation buffer memory $B_1$.

iii. The registered data printed out of the operation discrimination circuit 36D are sent to the data output device 5.

d. The collation key switch 14A is depressed.

i. All the registered data in the "collation" buffer memory $B_1$ are added together, and the added result is sent to the data output device 5 as an output to be displayed.

Then, for carrying out the main operational programs.

e. A certification printing slip is inserted in the certification-printing chute, and the deposit total key switch 11M is depressed.

i. The main operation is thereby started without delay, and the data in the buffer memories $B_2$ through $B_5$ for 10,000-yen note through 500-yen note are added to the cash payment main memory $M_6$, thereby to rewrite the added result in the main memory $M_6$.

ii. All the data in the collation buffer memory $B_1$ are added together, and the added result is transferred to the data output device 5 as an output to be printed.

iii. 1 is added to the lowest position of the content stored in the date, serial number main memory $M_7$, and the thus added result, which is printed out, is also applied to the data output device 5.

f. The certification printing slip is pulled out.

i. The data in the collation buffer memory $B_1$ are sequentially printed out and sent to the data output device 5.

ii. All the data in the "collation" buffer memory $B_1$ are added together, and the added result read out of the buffer memory $B_1$ is sent to the data output device 5 to be displayed thereafter.

iii. Data from the "date, serial number" main memory $M_7$ are printed out to be delivered toward the data output device 5.

2. In the case of payment with the monetary denominations designated (payment through the first automatic money dispensation):

Buffer operational programs are carried out as follows.

a. Desired key switches among the switches 21I through 21L in the money denomination designating switch group $G_3$ are depressed.

i. The buffer operation programs corresponding to the depressed key switches are selected in the operation instruction circuit 34, and set in the instruction selecting decoder 34F.

b. The amount of the money to be paid is registered by depressing ten-key device 12A.

i. The data thus registered is combined in the operation processing control circuit 36 with the instruction words, and the thus combined data are read into the register NKR.

c. The + key switch 13A is depressed.

i. The buffer operation is started by means of the buffer operation starting circuit 34G, and the resulting data are added to the data in the buffer memories $B_2$ through $B_5$.

ii. The data are read into the collation buffer memory $B_1$.

iii. The output data printed out of the operation discriminating circuit 36D are registered into the data output device 5.

d. The collation key switch 14A is depressed.

i. All of the registered data in the collation buffer memory $B_1$ are added together, and the result is sent to the data output device 5 as an output to be displayed.

Then for carrying out the main operational programs in the main memory, e. A certification printing slip is inserted in the certification printing chute, and the deposit total key switch 11M is depressed.

i. The main operation is at once started thereby adding the data in the buffer memories $B_2$ through $B_5$ (for 1,000-yen note through 500-yen note) to the data in the cash payment main memory $M_6$, and rewriting the added result into the main memory $M_6$.

ii. All of the data in the collation buffer memory $B_1$ are added together, and the added result is sent to the data output device 5 as an output to be printed out.

iii. 1 is added to the lowest position of the content in the date, serial number main memory $M_7$, and the thus added result is sent to the data output device 5.

f. The payment key switch 11O is depressed.

i. A start-payment signal ST is delivered from the branch-and-step control circuit 34E of the operation instruction circuit 34 to the money dispensing machine 4.

ii. A data transferring signal TRF is delivered from the transfer-status control circuit 37A to the transfer control circuit 37B.

iii. The data concerning the highest note stored in the collation buffer memory $B_1$ are transferred through the transfer control circuit $37_B$ to the money dispensing machine 4.

iv. Upon transfer of the data concerning the highest denomination, data concerning lower denominations, if any, are transferred successively to the money dispensing machine 4 by repeating the above described steps (ii) and (iii).

v. When the money dispensing machine has paid all of the cash as designated by the data thus transferred, the payment completion signal EOC is delivered from the machine. The signal EOC resets the payment instruction memory 21T, and all the data concerning the monetary denomination stored in the collation buffer memory $B_1$ are added together, with the results being further added to the data in the automatic dispensing main memory $M_5$ to be rewritten in the same memory $M_5$.

3. In the case of payment at a minimum sheet number (LCV or second automatic money dispensation):

a. Required data are registered by the ten-key device 12A.

i. Under the conditions of neither of the paid money designating switch group $G_3$ being depressed, and only the data through the ten-key device 12A being registered, a signal LCVF forming an LCV flag is generated in the LCV flag forming circuit 37D.

ii. The data thus registered are read into the register NKR of the operation discriminating circuit 36D.

b. The + key switch 13A is depressed.

i. The data thus registered are read into the collation buffer memory $B_1$.

ii. The registered data printed out from the operation discriminating circuit 36D are sent to the data output device 5.

c. The collation key switch 14A is depressed.

i. All of the data registered in the collation buffer memory $B_1$ are added together, and the added result is sent into the data output device 5 as a displaying output. Next, for executing the main operation, d. The certification printing slip is inserted into the certification printing chute, and the payment total key switch 11M is depressed.

i. the data in the collation buffer memory $B_1$ are added to the data in the cash payment main memory $M_6$, and the thus added result is rewritten in the main memory $M_6$, ii. All of the data in the collation buffer memory $B_1$ are added together, and the result is sent to the data output device 5 as an output to be printed out.

iii. 1 is added to the lowest position in the date, serial number main memory $M_7$, and the added result is sent to the data output device 5 as an output to be printed out.

e. The certification printing slip is pulled out.

i. All of the data in the collation buffer memory $B_1$ are added together, and the result is sent to the data output device 5 as an output to be printed out.

ii. The data in the date, serial number main memory $M_7$ are delivered as an output to be printed out to the data output device 5.

f. The withdrawal key switch 11O is depressed.

i. A dispensation start signal ST is delivered from the branchand-step control circuit 34E in the operation instruction circuit 34 to the money dispensing machine 4.

ii. A data transfer signal TRF is delivered from the transfer status control circuit 37A to the transfer control circuit 37B.

iii. The data in the collation buffer memory $B_1$ are transferred through the transfer control circuit 37B to the money dispensing machine 4.

iv. Upon completion of the money dispensation from the money dispensing machine 4 in accordance with the transferred data, the payment instruction memory 21T is reset by the dispensation completion signal EOC, and the data in the collation buffer memory $B_1$ are added together so that the added result is in turn written into the automatic dispensation main memory $M_5$.

4. In the case of exchanging money:

The buffer operations are first carried out as follows.

a. The non-addition mode selecting key switch, that is, the T key switch 11J is depressed.

i. The zero-proof program is selected in the operation instruction circuit 34, and the program is set in the instruction selecting decoder 34F.

b. Money classification key switches corresponding to the kinds of money to be exchanged (switches 11F through 11I for 10000 yen note through 500 yen note) are depressed, and then the amount thereof is registered by means of the ten-key device 12A.

i. The data thus registered are combined with the instruction words in the operation process control circuit 36, and read into the register NKR in the operation discriminating circuit 36D.

c. The − key switch 13B is depressed.

i. The buffer operation is started by the buffer operation starting circuit 34G, and the data to be registered are read into the collation buffer memory $B_1$ with the sign inverted to negative.

ii. The data printed out of the operation discriminating circuit 36D are sent to the data output device 5.

d. After depression of the money exchange key switch 11K, the money classification key switches 11G through 11I (corresponding to 500 yen note) are depressed.

i. The programs corresponding to the depressed key switches are selected in the operation instruction circuit 34.

e. The amounts in all of the kinds of money to be exchanged are registered by means of the ten-key device 12A.

i. The registered data are combined with the instruction words in the operation processing control circuit 36, and read into the register KKR.

f. The + key switch BA is depressed.

i. The registered data concerning the amounts for every denominations of money to be exchanged are added to the corresponding ones in the buffer memories $B_1$ through $B_5$ (for 10,000-yen note through 500-yen note).

ii. All of the data are read into the collation buffer memory $B_1$.

iii. The output printed out of the operation discriminating circuit 36D is sent into the data output circuit 5.

g. The T key switch 11J is depressed.

i. All of the data in the collation buffer memory $B_1$ are added together, and the thus added result is delivered from the operation discriminating circuit 36D as a displaying output to be sent to the output device. When the displaying output is 0, this means that the money exchange has been executed without error.

ii. All the data in the collation buffer memory $B_1$ are added together, and the added result is printed out of the operation discrimination circuit 36D to be applied thereafter to the data output device 5. Then the main operation programs are executed as follows.

h. The payment key switch 11O is depressed.

i. A dispensation start signal ST is sent from the branch and step control circuit 34E of the operation instruction circuit 34, to the money dispensing machine 4.

ii. A data transfer signal TRE is delivered from the transfer status control circuit 37A, and sent to the transfer control circuit 37B.

iii. A part of the data corresponding to the highest monetary denomination is transferred from the collation buffer memory $B_1$ to the money dispensing machine through the transfer control circuit 37B.

iv. After completion of the transfer of the data concerning the highest denomination, the data concerning lower denominations, which might exist in the collation buffer memory $B_1$, are transferred to the money dispensing machine by repeating the above described steps (ii) and (iii).

v. When the money dispensing machine 4 has dispensed the money corresponding to the data thus transferred, entirely, the dispensation completion signal EOC issues thereupon causing the dispensation instruction memory 21T to be reset. All of the data concerning the monetary denominations contained in the collation buffer memory $B_1$ are added together, and the result is further added to the data in the automatic dispensing main memory $M_5$. The ultimate result is then rewritten into the same memory $M_5$.

5. In the case of change transactions:

The buffer operational programs are executed as follows:

a. The non-additional mode selecting key switch, that is, T key switch 11J is depressed.

i. The zero proof program is selected in the operation instruction circuit 34, and the program is set in the instruction selecting decoder 34F.

b. The key switches corresponding to the money brought by a customer, which are selected from the group of the money classification key switches 11F through 11I for 10,000-yen note through 500-yen note, are first depressed, and the amount of the money is thereafter registered by means of the ten-key device 12A.

i. The data thus registered are combined in the operation processing control circuit 36 with the instruction words, and the thus combined data are read into the register NKR.

c. The − key switch 13B is depressed.

i. The buffer operations are started by means of the buffer operation start circuit 34G, and the registered data are read into the collation buffer memory $B_1$ with the sign thereof being inverted to negative.

ii. The registered data thus read into the collation buffer memory $B_1$ are passed through the operation discriminating circuit 36D, and the output thereof is printed out and delivered to the data output device 5.

d. The cash switch 11A in the key switch group $G_1$ is depressed.

i. A buffer operation program corrsponding to the cash deposit is selected in the operation instruction circuit 34, and the thus selected result is set in the instruction selecting decoder 34F.

e. The received amount of money is registered by the ten-key device 12A.

i. The registered data are combined in the operation processing control circuit 36 with the instruction words, and the result is read into the register NKR.

f. The + key switch 13A is depressed.

i. The buffer operation is started by means of the buffer operation start circuit 34G, and the registered data are added to the contents of the cash payment buffer memory $M_6$.

ii. The registered data are read into the collation buffer memory $B_1$.

iii. The registered data are passed through the operation discriminating circuit 36D, and the output thereof is sent to the data output device 5.

g. The change key switch 11L is depressed, and then the amount of the change is registered by the ten-key device 12A.

i. The registered data concerning change are combined in the operation processing control circuit 34 with the instruction words, and the result is read into the register NKR.

h. The + key switch 13A is depressed.

i. The registered data are read into the collation buffer memory $B_1$.

ii. The registered data are then passed into the operation discriminating circuit 36D, and the printed-output thereof is delivered to the data output device 5.

i. The T key switch 11J is depressed.

i. All of the data in the collation buffer memory $B_1$ are added together, and the added result is delivered as a displaying output to the data output device 5 by way of the operation discriminating circuit 36D. Herein, it is judged that the change payment was correct when the displayed output from the data output device is zero.

ii. All of the data in the collation buffer memory $B_1$ are added together, and the result is delivered as its output to be printed to the data output device 5 by way of the operation discriminating circuit 36D.

The main operational programs are executed as follows.

j. The certification printing slip is inserted into the certification printing chute, and the deposit total key switch 11M is depressed.

i. The main operations are at once started, with the data in the cash deposit buffer memory $B_2$ being added to the data in the cash deposit main memory $M_1$, and the added result is rewritten in the main memory.

ii. All of the data in the collation buffer memory $B_1$ are sequentially sent to the data output device to be printed out therefrom.

iii. 1 is added to the lowest position in the content of the date, serial number main memory $M_7$, and the result is sent to the data output device 5 as an output to be printed out.

k. The certification printing slip is pulled out.

i. The data concerning cash deposit contained in the collation buffer memory $B_1$ are sent to the data output device 5 to be printed out therein.

ii. The data in the date, serial number main memory $M_7$ are sent to the data output device to be printed out therein.

l. The payment key switch 110 is depressed.

i. A dispensation start signal ST is delivered from the branch and step control circuit 34E of the operation instruction circuit 34 to the money dispensing machine 4.

ii. A data transfer signal TRF is delivered from the Transfer status control circuit 37A to the transfer control circuit 37B.

iii. The registered change data in the collation buffer memory $B_1$ are transferred via the transfer control circuit 37B to the money dispensing machine 4.

iv. When the money dispensing machine completes the money dispensation in accordance with the data thus transferred, a money dispensation completion signal EOC is issued thereby resetting the payment instruction memory 21T, and the registered change data in the collation buffer memory $B_1$ are then added and rewritten in the automatic dispensation main memory $M_5$.

4. Money dispensing machine

Figure 6:
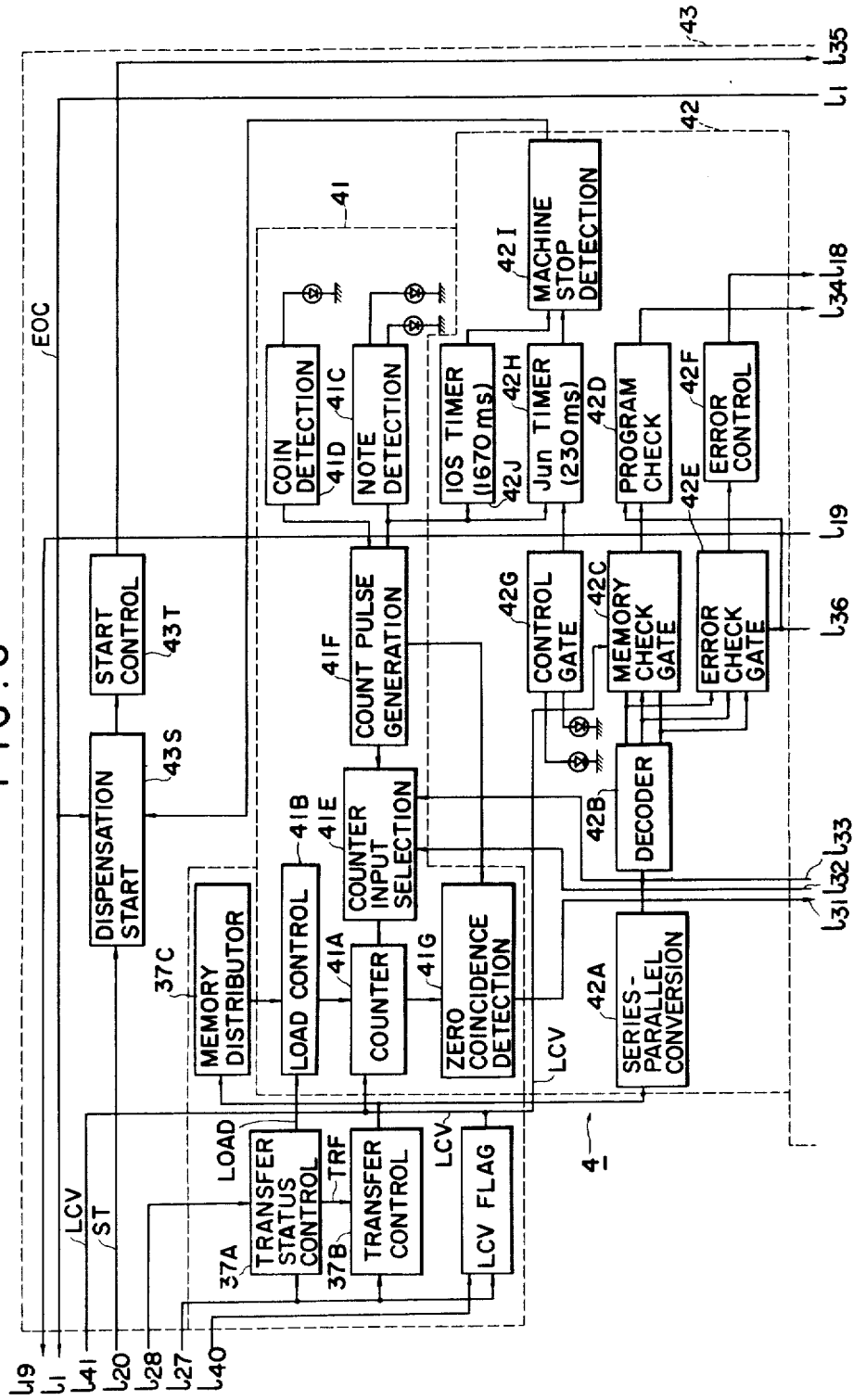

The money dispensing machine 4 is designed to dispense notes and coins in the hereinbefore mentioned first money dispensation mode or in the second money dispensation mode automatically, in accordance with the data and control signals transferred from the memory operation processing system 3. The money dispensing machine comprises the following sections (refer to FIGS. 6 and 7).

4-1. Dispensed money amount collation section:

The dispensed money amount collation section 41 receives the monetary data and the LCV signal concerning the dispensing mode, both delivered from the transfer output circuit 37 in the memory operation processing system 3, and collates the amount and denomination of the money automatically dispensed as described above against the transferred data. The section 41 comprises following elements:

A dispensation counter 41A of, for instance, six digit decimal composition, and including, for instance, six reversible counters, for receiving data about the amount of money to be dispensed, through a load control circuit 41B;

A note passage detector 41C and a coin passage detector 41D, each of which generates a detecting pulse whenever a piece of note or coin is dispensed through each passage leading to a dispensing outlet;

A counter-input selection circuit 41E which distributes the series of pulses generated in a count pulse generating circuit 41F to a counter for a corresponding digit upon reception of the detecting pulses from the detectors 41C and 41D, each series being weighted by a condition signal delivered from a hereinlater described money dispensation control section 43 and representing the denominations of the money now dispensed. To be more specific, when a 500 yen note is dispensed, five pulses are introduced through a counting input terminal of the dispensation counter 41A into the 100 position counter; and A zero coincidence detecting circuit 41G which receives a borrowing output from each digit counter in the dispensation counter 41A, and, according to the condition of whether the content of each counter is zero or not, detects in each monetary denomination the coincidence between the sum of money thus dispensed and the sum designated by the data.

However, it should be noted that a borrowing gate circuit is provided between each of the digit counters in the dispensation counter 41A. The gate circuit is closed upon reception of the LCV signal from the transfer status control circuit 37A. Thus, when the hereinbefore described first automatic money dispensation mode is designated, the borrowing gate circuits for the digit counters corresponding to the designated denominations and therefore for the counters of higher positions than said positional counters are kept open, and since the zero-coincidence circuit 41G does not issue any detecting output as long as the contents of the positional counters corresponding to the designated denominations and of the counters of higher positions are not zero, the money dispensing operations for the designated denominations are continued until a detecting signal is issued from the zero-coincidence detecting circuit 41G.

When the second automatic money dispensing mode is instructed by the arrival of the LCV signal, the zero coincidence detecting circuit 41G issues a detecting signal each time the content of the positional counter corresponding to 10,000-yen note in this example becomes zero, whereby denominations of money corresponding to the lower positional counters are successively dispensed until the contents of the lower positional counters become zero.

An example of the counter circuit 41A of the money dispensing machine will now be described with reference to FIGS. 38 through 41.

The money dispensing machine 4 comprises six positional counters $DC_1$ through $DC_6$ which correspond to 1 position through 100000 position respectively of the decimal notation of the money to be dispensed. The positional counters $DC_1$ through $DC_6$ may be reversible counters. A memory distributor MD composed of shift registers $SR_1$ through $SR_6$ corresponding to the six digits respectively, of the decimal notation of the money is also provided for receiving the money dispensing data transferred from the command input system 1. When a load signal generating means (not shown) detects the completion of the data transfer and generates a load signal, the signal is applied to the preset terminals L of the positional counters $DC_1$ through $DC_6$, and the contents in the shift registers $SR_1$ through $SR_6$ are thereupon transferred to the corresponding positional counters $DC_1$ through $DC_6$. In the drawing, TCP designates a clock pulse supply line.

Output terminals BR of the positional counters $DC_1$ through $DC_4$ are connected with borrowing signal gate circuits $A_{11}$ through $A_{41}$, respectively, each of the gate circuits comprising a two-inputs logical product gate circuit (AND gate in the illustrated example). When the content in any of the positional counters becomes 0, the level at the borrowing output terminal BR of a positional counter corresponding thereto becomes L. Thus, when the content of the counter is further subtracted by 1 and thereby changed to 9, the level of the output terminal BR is changed to H, and the content of the next counter corrsponding to the next higher position is subtracted by 1 through the gate circuit at the instant of the rise of the output level.

To the borrowing gate circuits $A_{11}$ through $A_{41}$, a dispensing mode designating signal LCV, which is H in the case of the first money dispensing mode and L in the case of the second money dispensing mode, is applied as a gate control signal, thereby to execute a borrowing operation only when the data concerning the first money dispensing mode is delivered from the command input system 1. The borrowing terminal BR of the positional counter $DC_5$ is directly connected to the next higher positional counter $DC_6$.

The borrowing input terminals CD of the counters $DC_1$ through $DC_5$ are connected with discriminating gate circuits $G_1$ through $G_5$, respectively, and a count pulse R generated in a count-pulse forming circuit KP is applied to the input terminals CD through these discriminating gate circuits $G_1$ through $G_5$. The discriminating gate circuits $G_1$ through $G_5$ are controlled by the timing gate signals generated in a timing signal generating circuit TG.

Figure 41:
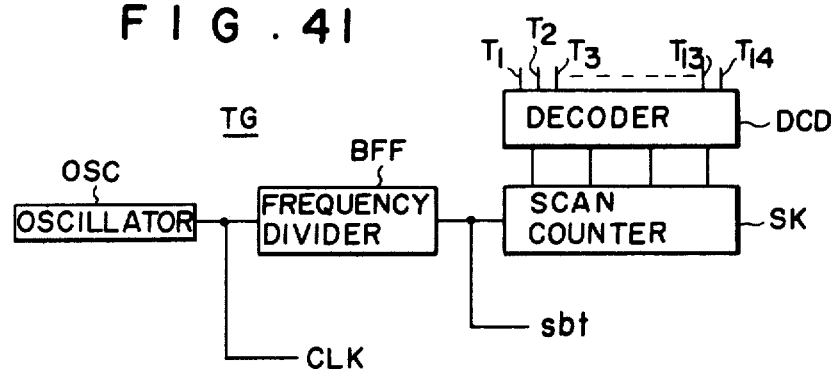

The timing signal generating circuit TG is composed as shown in FIG. 41 including a ½ frequency-divider BFF which divides the frequency of the output CLK from an oscillator OSC for obtaining a reference pulse train Sbt. The reference pulse train Sbt is thereafter passed to a scanning counter SK of, for instance, four-bit construction. The contents of the counter SK are converted by a decoder DCD, and delivered therefrom as a series of timing gate pulses $T_1$ through $T_{14}$ of the quaterdenary system each having a duration period T. The timing gates corresponding to the gate pulses $T_1$ through $T_{13}$ are assigned to every monetary denominations which might appear in the money dispensing operation.

It should be particularly noted that, when the timing gate signals $T_1$ through $T_{13}$ are assigned to the monetary denominations, the timing gate signals are assigned, as a first characteristic feature of the invention, to those tending to appear simultaneously in a manner such that a one-to-one relation is maintained therebetween (a different number of the timing pulses being assigned to each of these monetary denominations), but the gate signals are assigned to those which never appear simultaneously in such a manner that the same number of the timing gate signals are assigned simultaneously to a plurality of different monetary denominations.

According to the second feature of the present invention, the number of the timing gate signals assigned to a monetary denomination are selected to be equal to a remaining figure in the denomination when all 0, if any, in the lower positions thereof are removed.

For instance, when all of the coins are dispensed simultaneously from the money dispensing section, a timing gate signal $T_1$ is assigned to the denomination of one yen, five timing gate signals $T_2$ through $T_6$ are assigned to the denomination of 5 yen, one timing gate signal $T_7$ is assigned to the coin denomination of 10 yen, five timing gate signals $T_8$ through $T_{12}$ are assigned to the 50 yen coins, and one timing gate signal $T_{13}$ is assigned to the 100 yen coins.

In the illustrated example, since the coin dispensing operation of the coin dispensing section is started after the completion of the note dispensing operation of the note dispensing section, there is no possibility of the two sections being operated simultaneously. For this reason, the assignment of the timing gate signals to all denominations of notes can be executed in a duplicated manner with the assignment thereof to the denominations of coins. That is, the timing gate signals $T_2$ through $T_6$, which have been assigned to the 5 yen coins, are also assigned to the 500 yen notes. Likewise, the timing gate signal $T_7$, which has been assigned to the 10 yen coins, is also assigned to the 1000 yen notes, and the timing gate signals $T_8$ through $T_{12}$, which have been assigned to the 50 yen coins are also assigned to the 5000 yen notes. This is the same for the timing gate signals $T_{13}$ which are assigned to both the 100 yen coins and 10,000 yen notes.

As shown in FIGS. 39A and 39B, each of the discriminating gate circuits $G_1$ through $G_5$ has denomination discriminating gates, which are required for dispensing an amount of money memorized in each of the counters $DC_1$ through $DC_5$ in the second money dispensing mode. For instance, the discriminating gate circuit $G_5$ has a denomination discriminating gate $A_{52}$ to dispense an amount corresponding to the content of the 10,000 counter $DC_5$, and the discriminating circuit $G_4$ has denomination discriminating gates $A_{43}$ and $A_{42}$ to dispense respectively 5,000 yen and 1,000 yen corresponding to the content of the 1,000 counter $DC_4$, and so forth down to the discriminating circuit $G_1$ which has denomination discriminating gates $A_{13}$ and $A_{12}$ to dispense respectively 5 yen and one yen corresponding to the content of the 1 counter $DC_1$. It should be noted that no discriminating gate circuit is provided for the 100,000 counter $DC_6$ because the content thereof is always dispensed by the use of 10,000 yen notes. The denomination discriminating gates $A_{12}$ through $A_{52}$ adapted to discriminate one yen through 10,000 yen, respectively are each made of a three-input logic production gate (in this example, threeinput AND gate), and as the first opening-condition signal, one or a plurality of timing gate signals assigned to the denomination are applied to the corresponding one of the gates $A_{12}$ through $A_{52}$.

More specifically, a timing gate signal $T_{13}$ is applied to the 100 yen - and 10,000 yen - denomination discriminating gates $A_{32}$ and $A_{52}$, timing gate signals $T_8$ through $T_{12}$ are applied to the 50 yenand 5,000 yen -denomination discriminating gates $A_{23}$ and $A_{43}$, a timing gate signal $T_7$ is applied to the 10 yen - and 1,000 yendenomination discriminating gates $A_{22}$ and $A_{42}$, timing gate signals $T_2$ through $T_6$ are applied to the 5 yen - and 500 yen -denomination discriminating gates $A_{13}$ and $A_{33}$, and a timing gate signal $T_1$ is applied to the one yen denomination discriminating gate $A_{12}$.

As second opening-condition signals, denomination signals $TM_1$ through $TM_9$ for one yen through 10,000 yen and corresponding respectively to $A_{12}$ through $A_{52}$ are applied to the one yen - discriminating gate $A_{12}$ through 10,000 yen - discriminating gate $A_{52}$.

Figure 38:
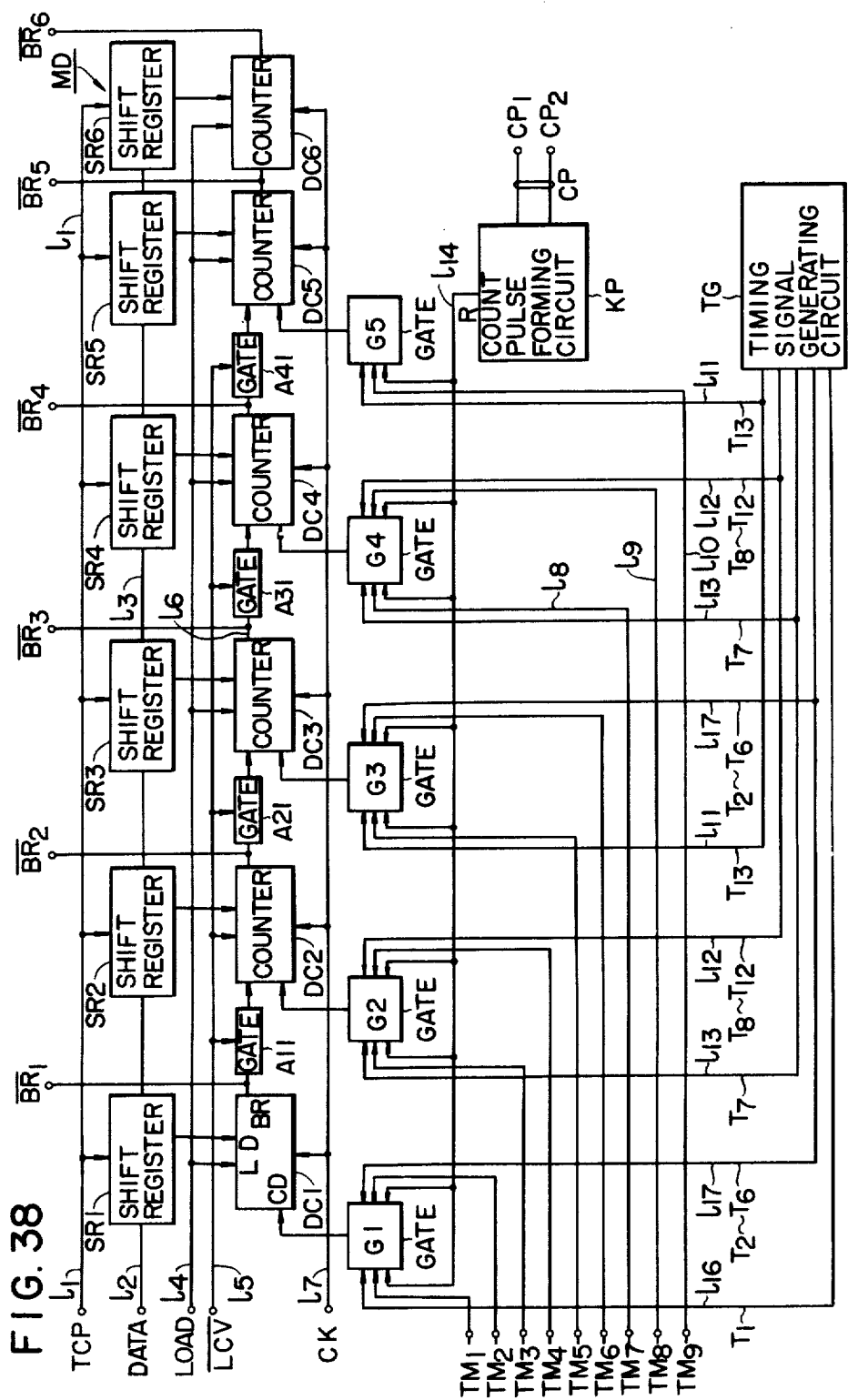
FIG. 38 is a block diagram showing one example of a dispensation counter shown in FIG. 6.
Figure 39:
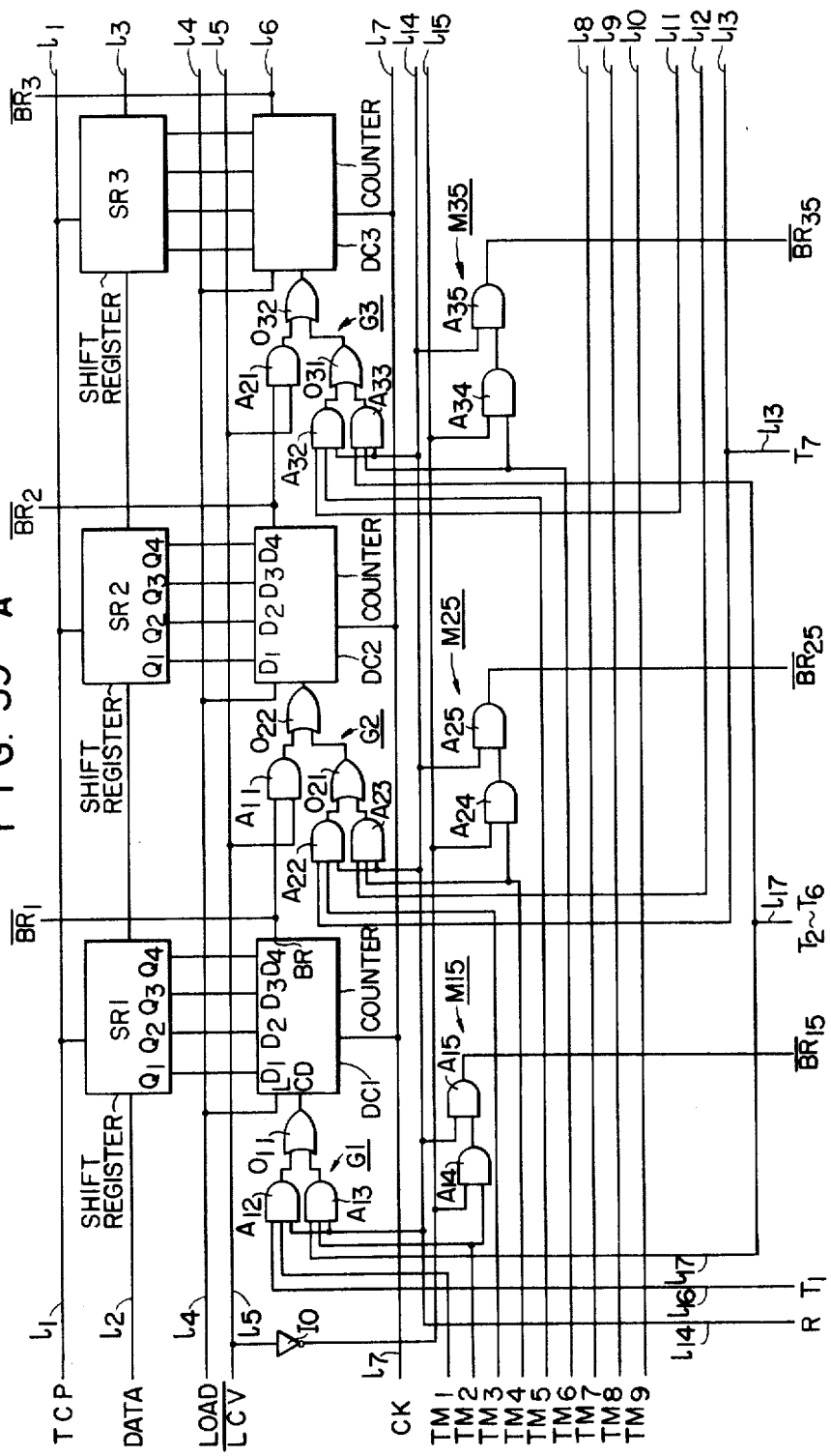
FIGS. 39A & B, 40 and 41 are block diagrams showing in detail the dispensation counter shown in FIG. 38.
Figure 39:
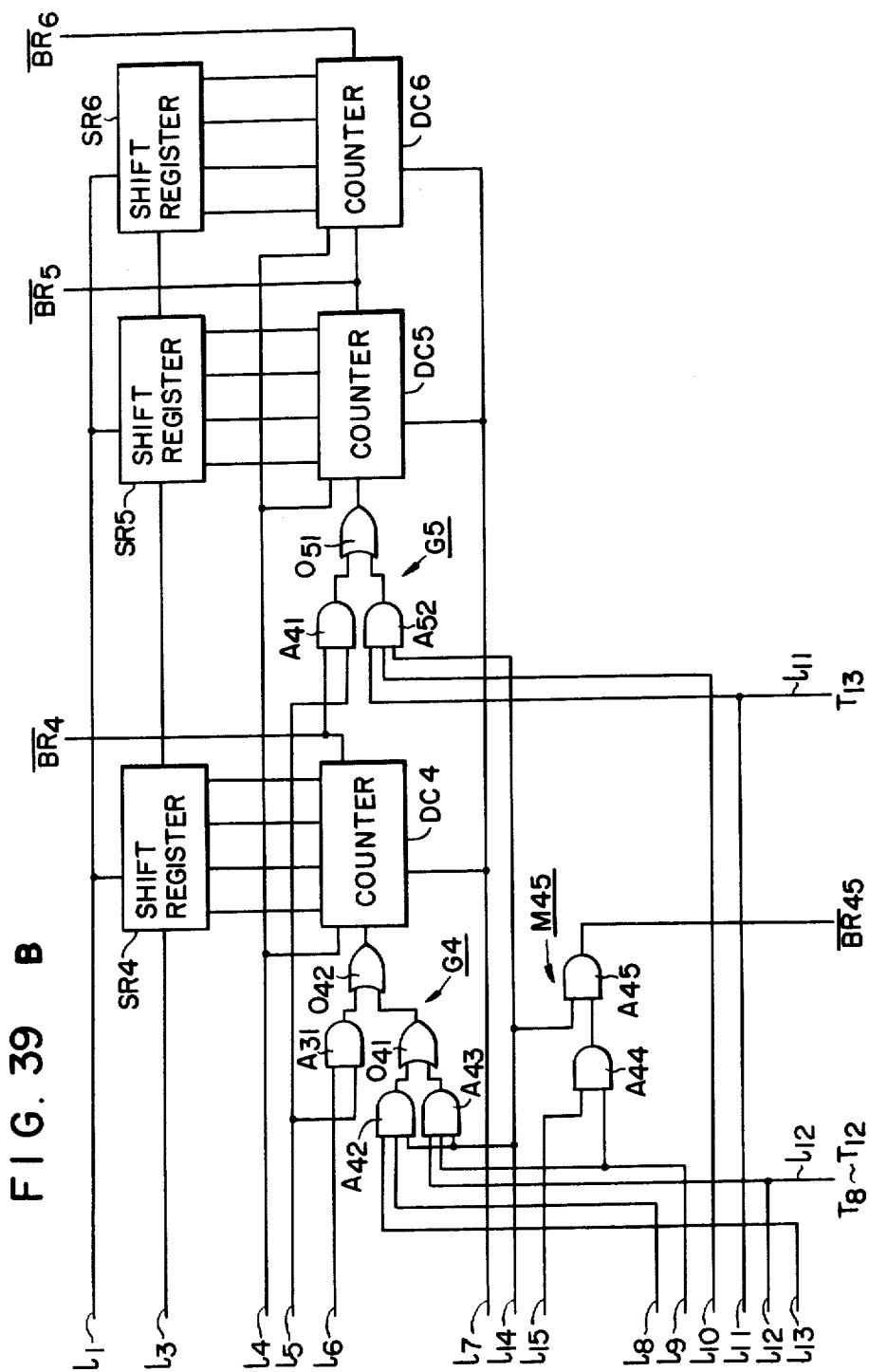
Figure 40:
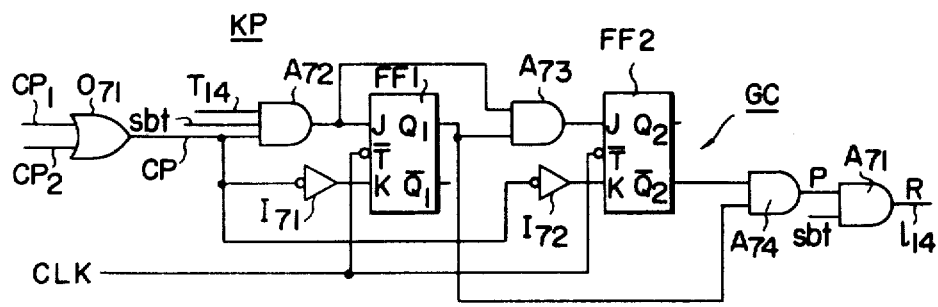

A 10,000 count pulse forming circuit KP shown in FIGS. 38 and 40 generates a count-pulse train R consisting of 14 pulses each time when the detecting pulses $CP_1$ or $CP_2$ are delivered from the note passage detector or the coin passage detector. A series of reference pulses Sbt delivered from the pulse generating circuit TG as shown FIG. 41 is applied to an input of a logic product gate circuit $A_{71}$ (an AND circuit in this example) of the count pulse forming circuit KP in FIG. 40, and another input of the logic product gate circuit $A_{71}$ is connected to a gate control circuit GC which delivers an opening control signal for the gate circuit $A_{71}$. The gate control circuit GC comprises forward and backward J-K flip-flops $FF_1$ and $FF_2$ operable in a master-and-slave relationship. An OR circuit $O_{71}$ receives the aforementioned two money detecting pulses $CP_1$ and $CP_2$, and delivers a dispensed money pieces confirming signal CP which is applied through an inverter $I_{71}$ to the input terminal K of the forward flip-flop $FF_1$.

On the other hand, the output terminal of a three-input logic product gate circuit (an AND circuit in this example) $A_{72}$ which receives the signal CP as its one input, is connected to the J input of the same flip-flop $FF_1$. The above-mentioned reference pulse output Sbt from the pulse generator TG (FIG. 42) and the 14th timing gate pulse $T_{14}$ are applied to the other inputs of the three-input logic product gate circuit $A_{72}$ as the opening condition signals thereof. Furthermore, the input terminal J of the backward flipflop $FF_2$ is connected with the output terminal of a two-input logic product gate circuit (an AND circuit in this example) $A_{73}$, one of the two inputs thereof being connected with the output of the logic product gate circuit $A_{72}$. As an opening condition signal of the logic product gate circuit $A_{73}$, the $Q_1$ output of the forward flip-flop $FF_1$ is applied to the other input of the logic product gate circuit $A_{73}$. The above-mentioned dispensed money pieces confirming signal CP is applied through an inverter $I_{72}$ to the K input of the backward flip-flop $FF_2$. The $Q_1$ output of the forward flip-flop $FF_1$ and the $\overline{Q}_2$ output of the backward flip-flop $FF_2$ are further applied to the two inputs of a two-input logic product circuit $A_{74}$ (an AND circuit in this example), and the output hereof is applied to an input of the aforementioned logic product gate circuit $A_{71}$ as an opening control signal therefor. The flip-flops $FF_1$ and $FF_2$ further receive the clock pulses CLK from the pulse generator TG, and readin the J and K inputs at the instants of the rise of the clock pulses thereby to deliver the Q and $\overline{Q}$ outputs at the instants of the rise of the same pulses.

With the above described composition of the count-pulse forming circuit KP, when it is assumed that the dispensation confirming signal CP (FIG. 42) arrives at a time instant $t_1$, the gate circuit $A_{72}$ opens for a time interval $\tau_1$ wherein a reference pulse Sbt, which synchronizes with the 14th timing gate signal $T_{14}$ arriving just after the arrival of the confirming signal CP is at the higher level. Thus, the J and K inputs of the flip-flop $FF_1$ are in the logic levels of H and L, respectively, and the inputs are read into the flip-flop $FF_1$ at the instant of the rise of a clock pulse CLK (FIG. 42) occurring in this time internal $\tau_1$, and are delivered from the output terminals $Q_1$ and $\overline{Q}_1$ at the instant of decay of the clock pulse. As a result, the $Q_1$ output of the flip-flop $Q_1$ is brought into H level at the instant of decay $t_2$ of a first timing gate signal $T_{14}$ as is apparent in FIG. 42. Since the $Q_1$ output is kept in L level before the time instant $t_2$, the gate circuit $A_{73}$ preceding the flip-flop $FF_2$ is held in the closed state, thereby holding the flip-flop $FF_2$ in the reset state as is indicated at $Q_2$ in FIG. 42.

After the time instant $t_2$, the flip-flop $FF_1$ is brought into the set state, thereby bringing the $Q_1$ output to H and opening the gate circuit $A_{73}$ for the back-ward flip-flop $FF_2$. At this instant, however, the timing gate signal $T_{14}$ has not yet arrived at the gate circuit $A_{72}$, and the backward flip-flop $FF_2$ is held in the reset state until the time instant $t_3$ when the time signal $T_{14}$ arrives.

Figure 42:
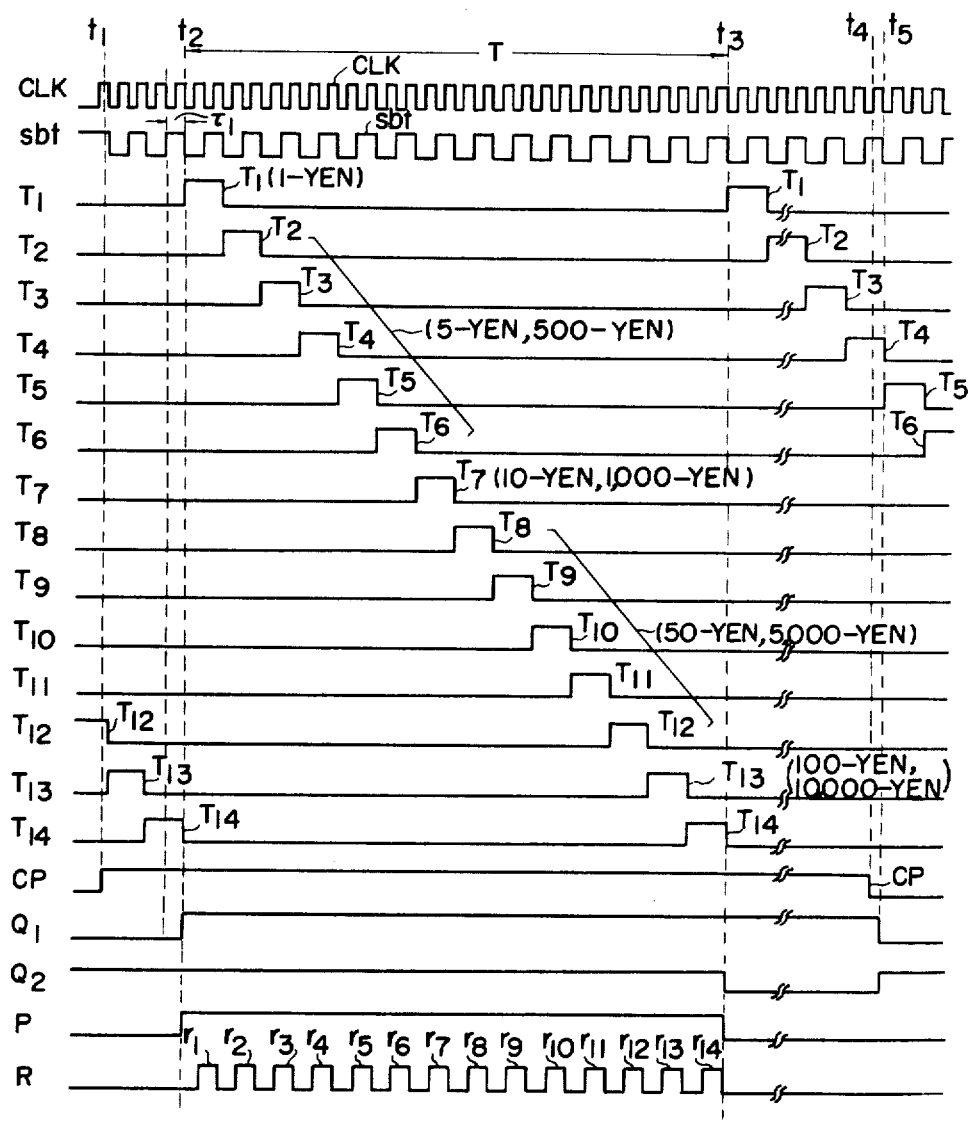
FIG. 42 is a series of graphical representations of various signal waveforms which are used for a description of the operation of the dispensation counter shown in FIGS. 39, 40 and 41.

Thus, the outputs $Q_1$ and $\overline{Q}_2$ applied to the input of the logic product circuit $A_{74}$ are held in H level for a time period, from $t_2$ to $t_3$, which constitutes one period T during which the timing gate signals $T_1$ through $T_{14}$ occur sequentially for one time. The logic product gate circuit $A_{74}$ is thereby opened for this period as indicated at P in FIG. 42. The opening of the gate circuit $A_{74}$ allows fourteen refrence pulses CLK, which occur in this period T, to pass through the output gate circuit $A_{71}$ to be used as a series of count pulses R as indicated in FIG. 42.

When the second 14th timing gate signal $T_{14}$ decays at the time instant $t_3$, the backward flip-flop $FF_2$ is set as described hereinbefore, and the output gate circuit $A_{71}$ is closed at the instant $t_3$. In this state, the count pulses R are not delivered from the output gate circuit $A_{71}$.

This state is held until the dispensation confirming signal CP is thereafter decayed and the flip-flops $FF_1$ and $FF_2$ are thereby reset. When the signal CP decays to L at a time instant $t_4$, the flip-flops $FF_1$ and $FF_2$ are reset at an instant $t_5$ where a reference pulse Sbt, which appears just after the time instant $t_4$, decays and the entire system is set back to the original state.

In the illustrated example of this invention, money dispensation confirming circuits $M_{15}$, $M_{25}$, $M_{35}$, and $M_{45}$ are provided for the counters $DC_1$, $DC_2$, $DC_3$, and $DC_4$, respectively, thereby to produce, the money dispensation confirming outputs $\overline{BR}_{15}$, $\overline{BR}_{25}$, $\overline{BR}_{35}$, and $BR_{45}$ corresponding to the denominations of 5 yen, 50 yen, 500 yen, and 5,000 yen, respectively.

The money dispensation confirming circuits $M_{15}$ $M_{25}$, $M_{35}$, and $M_{45}$ comprise first logic product circuits $A_{14}$, $A_{24}$, $A_{34}$, and $A_{44}$, and second logic product circuits $A_{15}$, $A_{25}$, $A_{35}$, and $A_{45}$, respectively, as shown in FIGS. 39A and 39B, wherein each of the first logic product circuits receives the $\overline{LCV}$ signal through an inverter 10 as a first condition signal, and a corresponding one of the monetary denomination signals $TM_2$ through $TM_8$ as a second condition signal, while each of the second logic product circuits $A_{15}$, $A_{25}$, $A_{35}$, and $A_{45}$ receives the output of the corresponding one of the first logic product circuits as a first condition signal, and the aforementioned pulse series R as a second condition signal.

In the second automatic money dispensing mode as described above, when count pulses corresponding to 5 yen through 5,000 yen arrive, the inverted outputs $\overline{BR}_{15}$ through $\overline{BR}_{45}$ from the second logic product circuits $A_{15}$ through $A_{45}$, respectively, are given to the zero coincidence detecting circuit thereby to deliver a coincidence output CO therefrom upon reception of the first count pulse.

With the above described composition of the dispensation counter circuit 41A, the counting operation in the second automatic money dispensing mode is carried out as follows.

Assuming that monetary data concerning, for instance, 148,976 yen are delivered from the data input device 1 to the memory distributor MD, the counters $DC_6$ through $DC_1$ for 100,000, 10,000, 1,000, 100, 10, and 1 positions receive the data corresponding to 1, 4, 8, 9, 7, and 6 from the shift registers $SR_6$ through $SR_1$, respectively, when a load signal is applied to the counters $DC_6$ through $DC_1$. In this state, however, the dispensing mode designating signal $\overline{LCV}$ is in the L state, and therefore the gate circuits $A_{41}$ through $A_{11}$ for supplying the borrowing signals are in the closed state.

However, because of the entering the data into the counters $DC_6$ through $DC_1$, the borrowing outputs BR of the counters are in H state, indicating that the contents of the corresponding counters $DC_6$ through $DC_1$ are other than 0, and hence inverted signals $\overline{BR}_6$ through $\overline{BR}_1$ are sent to the coincidence detecting circuit.

At this time, the money dispensing program portion of the money dispensing machine 4 firstly delivers a 10,000 yen denomination signal $TM_9$ and the note dispensing portion thereof starts to dispense the 10,000 yen notes one by one. When the first delivered 10,000 yen note is detected by the note passage detector 41C, and a note detecting output pulse $CP_1$ (CP in FIG. 42) is given to the count pulse forming circuit KP simultaneously, fourteen count pulses R (refer to FIG. 42) synchronized with the timing gate signals $T_1$ through $T_{14}$ are sequentially applied to the discrimination gate circuits $G_1$ through $G_5$. However, in the period T wherein the count pulses R are thus applied, only the 10,000 yen discriminating gate $A_{52}$ for the counter $DC_5$ is in a state openable by the 10,000 yen denomination signal $TM_9$, and other discriminating gates are not in the openable state because of the lack of the denomination signals corresponding thereto. Accordingly, when the 13th timing gate signal $T_{13}$, which is assigned to the 10,000 yen note, is delivered from the pulse generator TG, only the 10,000 yen discriminating gate $A_{52}$ for the 10,000 yen counter $PC_5$ is opened.

However, in the rising time of the gate pulse signal $T_{13}$, the 13th count pulse $r_{13}$ is generated from the count pulse forming circuit KP in synchronism with the gate pulse signal, and this count pulse $r_{13}$ is applied to the 10,000 counter $DC_5$ through the gate circuit $A_{52}$. As a result, the content of the counter $DC_5$ has 1 subtracted therefrom, thereby being reduced to 3. When the passage detecting output $CP_1$ ceases to be delivered thereafter, the pulse forming circuit KP is reset.

The above described counting operation of the counter circuit 41A for the 10,000 yen note is repeated each time when the passage detecting output $CP_1$ is obtained, and when four 10,000 yen notes are dispensed, the content of the 10,000 counter $DC_5$ is brought to 0. At this time, the level of the borrowing output terminal BR is changed from H to L, and after another one 10,000 yen note is dispensed, the content of the counter $DC_5$ is changed to 9. Thus, the level of the borrowing terminal BR is changed from L to H, and the content of the 100,000 counter $DC_6$ for the next higher position is thereby reduced by 1 to be brought to 0, when fourteen 10,000 yen notes are thus dispensed, the content of the 10,000 counter $DC_5$ is again reduced to 0.

When the contents of the 100,000 counter $DC_6$ and the 10,000 counter $DC_5$ are both reduced to 0, the zero coincidence detecting circuit 6 detecting circuit 6 detects the completion of the dispensation of the 10,000 yen notes, and delivers a coincidence signal CO. Upon reception of the coincidence signal CO, the note dispensation program 43A generates a 5,000 yen denomination signal $TM_8$, and the note dispensing portion of the money dispensing machine 4 starts to dispense 5,000 yen notes.

In this case also, a pulse train R consisting of fourteen count pulses synchronized with the timing gate signals $T_1$ through $T_{14}$ are delivered from the count pulse forming circuit KP when the circuit KP receives the passage detecting output $CP_1$. Thus, only the 5,000 yen discrimination gate $A_{43}$ which receives the 5,000 yen denomination signal $TM_8$ is in the openable state. Upon reception of the timing gate signals $T_8$ through $T_{12}$, which are assigned to the 5,000 yen note, the gate $A_{43}$ is opened, and five pulses $r_8$ through $r_{12}$ are introduced through the gate $A_{43}$ to the 1,000 counter $DC_4$. As a result, the content of the counter $DC_4$ is reduced by 5, and is changed from 8 to 3.

When a 5,000 yen note is dispensed, a dispensation confirming signal $\overline{BR}_{45}$ is generated from the dispensation confirming circuit $M_{45}$. The note dispensing program 43A thus delivers a denomination signal $TM_7$ for 1,000 yen in response to the coincidence output CO delivered from the zero coincidence circuit 41G. The note dispensing section now starts dispensing 1,000 yen notes as described hereinbefore, and the above-mentioned fourteen count pulses R are delivered each time the passage detecting output $CP_1$ is obtained. Within the fourteen pulses R, the seventh count pulse $r_7$ is introduced into the 1,000 counter $DC_4$ through the 1,000 yen discrimination gate $A_{42}$ which is opened by the seventh timing signal $T_7$ assigned to the 1,000 yen notes. Thus, the content of the 1,000 counter $DC_4$ becomes 0 at the time where three 1,000 yen notes are dispensed, and the 500 yen memory output $\overline{BR}_3$ is thereby changed from H to L.

The dispensation of notes is thus completed, and the coin dispensing program sector 43B now delivers the 100 yen, 50 yen, 10 yen, 5 yen, and 1 yen denominating signals $TM_5$, $TM_4$, $TM_3$, $TM_2$, and $TM_1$, simultaneously. Each times a clutch of the 100 yen through "1 yen" dispensing mechanism in the coin dispensing section is operated by the coin dispense driving source, a coin corresponding thereto is dispensed from a coin dispensing port, and a pulse output $CP_2$ delivered from the coin passage detector is given to the count pulse forming circuit KP, which thereupon delivers a pulse train R consisting of fourteen pulses.

The discriminating gates $A_{32}$ through $A_{12}$ for 100 yen through 1 yen are at this time in the operable state by the denomination signals $TM_5$ through $TM_1$. A first pulse $r_1$ is applied by the aid of a timing gate signal $T_1$ assigned to 1 yen coins to the 1 counter $DC_1$ through the "1 yen" discriminating gate $A_{12}$, and then the second pulse $r_2$ through the sixth pulse $r_6$ are applied by the aid of timing gate signals $T_2$ through $T_6$ assigned to "5 yen" coins to the 1 counter $DC_1$ via the 5 yen discriminating gate $A_{13}$. Likewise, the seventh pulse $r_7$ through the twelfth pulse $r_{12}$ are applied to the 10 counter $DC_2$, and the thirteenth pulse $r_{13}$ is applied to the 100 counter $DC_3$.

After the driving source has completed the first dispensing operation as described, the memory output $\overline{BR}_1$ is changed from H to L when the content of the 1 counter is brought to 0 after the subtraction of 6 therefrom. Simultaneously therewith, the coin dispensing program 5 ceases to deliver the denomination signals $TM_1$ through $TM_2$ when the confirmation output $\overline{BR}_{15}$ is delivered from the 5 yen dispense confirming circuit $M_{15}$. The clutches in the 1 yen and 5 yen dispensing mechanism are thus brought into the opened state, and 1 yen and 5 yen discriminating gates $A_{12}$ and $A_{13}$ are brought into the closed state. In addition, the content of the 10 counter $DC_2$ is changed from 7 to 1 by subtracting 6 therefrom, and therefore only the memory output $\overline{BR}_{25}$ is transferred from "H" to L, which disconnects the clutch for the "50 yen" dispensing mechanism and also closes the 50 yen discriminating gate $A_{22}$. Likewise, the content of the 100 counter $DC_3$ is changed from 4 to 3 by subtracting 1, but the clutch for the "100 yen" dispensing mechanism is kept in the operating state.

When the driving source executes the second dispensing operation at that time, the content of the 10 counter $DC_2$ is changed from 1 to 0 by again applying one count pulse $r_7$ to the 10 counter $DC_2$ through the 10 yen discriminating gate A21, and the clutch of the 10 yen dispensing mechanism is hereby disengaged and the 10 yen discriminating gate $A_{21}$ is thereby closed. Furthermore, the content of the 100 counter $DC_3$ is also changed from 3 to 2 by applying one count pulse $r_{13}$ to the 100 counter $DC_3$ through the 100 yen discriminating gate $A_{32}$.

After the driving source has executed the coin dispensing operations three or four times, only the 100 yen discriminating gate $A_{32}$ is in the openable state, and for this reason the content of the 100 counter $DC_3$ is changed from 2 to 0, whereby the clutch in the 100 yen dispensing mechanism is disengaged, and the 100 yen discriminating gate $A_{32}$ is closed. At this time, the counter circuit completes the entire counting operation of the dispensed money.

Through the aforementioned counting procedures, the counter circuit has discriminatingly counted the dispensation of one 1 yen coin, one 5 yen coin, two 10 yen coin, one 50 yen coin, four 100 yen coins, one 500 yen note, three 1000 yen notes, one 5,000 yen note, and fourteen 10,000 yen notes, and furthermore the coincidence between the amount of money preset as described before and the total amount of money actually dispensed has been judged. In addition, by controlling the money dispensing sections utilizing the aforementioned discriminating operations, the dispense control in the second money dispensing mode and also the counting operation of the thus dispensed money including a plurality of denominations have both been carried out in a reliable manner.

Since the operation of the counter circuit 2 in the second money dispensing mode has been so far described, the operation thereof in the first money dispensing mode will now be described.

Considering the case where 25,000 yen is dispensed as 5,000 yen notes, the data concerning 5 and 2 are transferred to the 1,000 counter $DC_4$ and 10,000 counter $DC_5$ in the counter circuit, respectively, and also a 5,000 yen denomination assigning signal is received in the note dispensing program section thereby to deliver a 5,000 yen denomination signal $TM_8$.

At this time, the borrowing signal gate circuits $A_{11}$ through $A_{41}$ in the counter circuit are supplied with a dispensing mode signal $\overline{LCV}$ in H state meaning the selection of the first money dispensing mode, whereby the gate circuits $A_{11}$ through $A_{41}$ are held in the opened state.

When the note dispensing section starts to dispense 5,000 yen notes in the first money dispensing mode, the 8th pulse $r_8$ through 12th pulse $r_{12}$ within the fourteen count pulses R, which are generated in the count pulse forming circuit KP each time the passage detecting outputs are received, are applied to the 1,000 counter $DC_4$ through the 5,000 yen discriminating gate $A_{43}$ as described hereinbefore with respect to the second money dispensing mode. Thus, the content of the counter $DC_4$ is reduced by 5 as the first 5,000 yen note is dispensed through the dispensing part, and hence is changed from 5 to 0. Thus, the borrowing output from the borrowing terminal BR is changed from H to L, thereby changing the memory output $\overline{BR_4}$ of the same counter from H to L. Since the memory output $\overline{BR_5}$ of the 10,000 counter $DC_5$ is H, the program section continuously delivers the 5,000 yen denomination signal $TM_8$.

The note dispensing section continues the note dispensing operation until the second 5,000 yen note is dispensed, whereupon five pulses $r_8$ through $r_{12}$ are again applied to the 1,000 counter $DC_4$, and the content thereof is reduced by 5 and changed from 0 to 5. Accordingly, the level of the borrowing output BR is changed from L to H, and the content of the 10,000 counter $DC_5$ is reduced by 1 through the gate circuit $A_{41}$. That is, 1 in the content of the 10,000 counter is borrowed into the 1,000 counter $DC_4$.

The above described borrowing operation is repeated each time the content of the 1,000 counter $DC_4$ becomes 0 and the count pulses successively arrive at the counter, and when ultimately five 5,000 yen notes are dispensed through the dispensing outlet, the contents of the 1,000 and 10,000 positional counters $DC_4$ and $DC_5$ are both brought to 0. The counting operation of the counting circuit terminates when the 5,000 yen denomination signal $TM_8$ ceases to be delivered from the program section.

The counter circuit has thus counted five 5,000 yen notes dispensed in the first money dispensing mode, and furthermore, the coincidence between the amount of money in the designated denominations, and the amount thereof thus dispensed has been confirmed.

According to the present invention each time a signal CP confirming the number of money pieces thus dispensed, that is, the passage detecting output $CP_1$ or $CP_2$ in the illustrated example, is obtained as described above, a series of count pulses are produced and a number of the pulses are selected therefrom under the control of the timing gate signals assigned beforehand to respective denominations. The number of the pulses thus selected are then delivered to the counters corresponding to the individual numerical positions as their input count pulses, whereby the desired denominations and numbers of notes or coins in these denominations can be discriminated and counted without error in either of the first and second money dispensing modes of operation.

Also according to the present invention, the timing gate signals are assigned to those denominations, which might be dispensed simultaneously, in a one-to-one relationship, whereby the possibility of erroneous counting can be effectively eliminated.

On the other hand, a plurality of denominations which might not appear simultaneously are assigned to the same timing gate signals, whereby the number and kind of the timing gate signals can be reduced, and the constructions of the timing gate signal generating circuit and the associated circuits thereof can be simplified. Of course, it may be possible to assign the timing gate signals to the denominations, which are not dispensed simultaneously, in a one-to-one relation. However, the compositions of the circuits in that case will be far more complicated than those described above.

Also according to this invention, in the case when it is required to use the same positional counters for a plurality of denominations, the timing gate signals are weighted by the remaining number which is obtained after 0's, if any, at the lowest positions in each denomination are removed. In the case of, for instance, the 1 positional counter, one timing gate signal is assigned to the denomination of 1 yen, and five timing gate signals are assigned to the denomination of 5 yen since no 0 is included in the denominations. Such an arrangement affords all positional counters in an ordinary decimal composition.

Although, in the above described composition, the timing gate signals assigned for a specific denomination of coins have been assigned simultaneously to another specific denomination for notes, the same timing gate signals may also be assigned to a plurality of denominations for notes. For instance, the signal $T_1$ assigned to the coin denomination for 1 yen may also be assigned to the denominations of 1,000 yen and 10,000 yen which are not dispensed simultaneously with the coins.

In the above description, although the assignment of the timing gate signals has been considered for the two groups of denominations for coins and notes, the signals may also be assigned to two or more groups each including denominations for coins and notes in a mixed state.

Furthermore, although reversible counters have been used for the above described positional counters, the invention is not restricted to such a composition, and counters of addition type or subtracting type may also be used for these counters. In this case, the aforementioned borrowing gate circuits are replaced by the gate circuits. However, when the reversible counters are used for the positional counters as in the above described example, there is obtained an advantageous feature in that the coincidence between the amount to be dispensed and the total amount having a been dispensed can be easily detected based on a memorized output generated when the content of the specific positional counter becomes zero.

4-2. Dispensation condition detecting section

The dispensation condition detecting section 42 is intended to detect any improper operation in the command input system 1; to determine monetary denominations required for dispensing money based on the transferred monetary data; and to detect any defect in the money dispensing mechanism and the like. The section 42 includes a series-parallel conversion circuit 42A, a decoder 42B, a memory check gate 42C, and a dispensation program check circuit 42D, of which the series-parallel conversion circuit 42A is of a shift-register type construction capable of handling transferred data for one digit, and when such data arrives at the conversion circuit 42A, the content thereof is decoded by the decorder 42B. The memory check gate 42C discriminates whether the digit is 0, or equal to 5, or greater them "5", and determines the monetary denomination for dispensing money in the case where an LCV signal is generated (i.e., in the case of the second money dispensing mode). The dispensation program check circuit 42D generates a denomination signal based on a denomination check signal from the memory check gate 42C and also on an output signal from the money classification instruction memory group $H_3$ (FIG. 2) in the program addressing system 2.

An error check gate circuit 42E, and an error control circuit 42F, the former circuit 42E of which checks for any error in the registered data by comparing the content of each digit of the transferred data with the result of the operation of the money classification key switch group $G_3$, with reference made to the output signal of the decoder 42B and the output signal from the instruction memory group $H_3$, and, if any error is found, the circuit 42E operates an input inhibition circuit NO provided in the power line for the command input system 1, through the error control circuit 42F, thereby to prevent the entrance of any keying signal from the command input system 1.

The section 42 further includes a control gate 42G and a jam timer 42H. The control gate 42G detects the passage of a note through the two detecting points and produces a note passage detecting signal when the passage is actually detected. The timer 42H starts its operation upon reception of a detecting signal from the note passage detector 41C and is reset by another detecting signal from the control gate 42G. Thus, if any transmission defect occurs as to the note, and the gate 42G does not reset within the limited time of the timer 42H, the latter generates a pulse thereby to drive a machine stop detecting circuit 42I in the subsequent stage, whereby the operation of the note dispensing mechanism is temporarily stopped.

(4-3) Money dispensation control section

The money dispensation control section 43 is operated by a dispensing start signal ST arriving from the memory operation processing system 3 thereby to continue the money dispensation of the money dispensing mechanism until the zero coincidence detecting circuit 41G detects coincidence in all of the denominations detected by the memory check gate 42C. The money dispensation control section 43 includes the following component circuits.

A note dispensation program 43A and a coin dispensation program 43B, both memorize the monetary denomination signals delivered from the above-mentioned dispensation program check circuit 42D. The thus memorized data are sequentially cleared in accordance with the generation of coincidence signals concerning the thus dispensed monetary denominations in the zero coincidence detecting circuit 41G.

A priority circuit 43C controls the note dispensing program 43A in such a manner that the latter delivers the denomination signals memorized therein in a predetermined priority of, for instance, 10,000, 5,000, 1,000, and 500, sequentially.

A lifter predetermined-position detecting circuit 43D judges whether or not the present position of the lifter is aligned with a predetermined position in response to the monetary denomination signal from the priority circuit 43C. When the lifter is aligned with the predetermined position, the note clutch driver 43E is driven, and notes are take out one-by-one from a note storing box placed at this position. If the lifter is not aligned, with the predetermined position, a lifter motor 43J is driven through a lifter upward-movement drive 43H or a lifter downward-movement drive 43I under the action of a lifter upward-movement control 43F or a lifter downward-movement control 43G, respectively. The aforementioned coincidence detecting output is sent to the main operation branch execution completion decision circuit 35 as a branch completion signal.

Coin clutch drivers 43K are operated in response to the monetary denomination signals from the coin dispensing program 43B so that the coins are thereby dispensed.

A note program reset check circuit 43L and a coin program reset check circuit 43M detect the reset state of the monetary denomination signals delivered from the note dispensing program 43A and the coin dispensing program 43B, respectively, and when the delivering of the denomination signals terminates, dispensation completion signals are delivered from the circuits 43L and 43M.

A coin dispensation start control circuit 43N, in this example, causes dispensation of coins to start after the completion of the dispensation of notes. For the realization of such operation, a coin dispensing motor 43P is started by a note dispensation completion signal delivered from the note program reset check circuit 43L, and the same motor is stopped by a coin dispensation completion signal from the coin program reset check circuit 43M.

An EOC flag forming circuit 43Q forms an EOC flag when the note and coin dispensation completion signals from the check circuits 43L and 43M are both obtained, thereby to indicate the completion of the money dispensation. At this time, a note payment motor 43R starts to be driven.

The money dispensing machine 4 constructed as described above is started to operate by way of a dispensation start circuit 43S and also by way of a dispensation start control circuit 43T, upon reception of a start signal ST from the operation processing control circuit 36.

When the payment switch 110 in the command input system 1 is depressed, and the payment instruction memory 21T in the program addressing system 2 is set, a payment program is selected in the operation instruction circuit 34, and the registered data in the collation buffer memory $E_1$ are transferred through the transfer output circuit 37 toward the money dispensing machine 4.

During the execution of the payment program, however, the branch and step control circuit 34E in the operation processing control circuit 36 delivers a start signal ST to the dispense start circuit 43S. At this instant, the start circuit 43S is set, and delivers an operation condition signal, by way of the start control circuit 43T, to the lifter upward-movement control 43F, the lifter downward-movement control 43G, the coin clutch driver 43K, the note program reset check circuit 43L, and the coin dispensation start control circuit 43N until an EOC signal is generated in the EOC flag forming circuit 43Q. Before the generation of the EOC signal, if the machine stop detecting circuit 41C is operated, the start circuit 43S temporarily stops the above-mentioned delivering of the operational condition signal while the operational condition is removed. The EOC signal is at this instant applied to the payment instruction memory 21T as described hereinbefore, and the program based on the main operation instruction for payment given to the operation instruction circuit 34 is thereby terminated.

5. Data output device

The data output device 5 receives the display output and the printed output sent out from the operation processing circuit 36 of the memory operation processing system 3, and thereby executes the display and printing on a journal or a certification slip for the purpose of the collation. The device 5 includes a displaying device 51, printer 52, and a symbol printing control circuit 53.

The printer 52 in this example is of a composition which makes it possible to shift the decimal point in the print-form by, for instance, two positions based on the output of the decimal point control circuit 12F in the data read-in control circuit 22 thereby to shift the decimal point by two positions in registered data in the case where all the denominations are to be changed into 1/100.

The displaying device 51 is so constructed that when data are transferred from the operation discriminating circuit 36D to the printer 52 or to the money dispensing machine 4 in the course of the above described various data processing steps, the device 51 is operable to display the contents of the thus transferred data. Although operations thereof other than the collation have not been fully described in the above description, the displaying device 51 may also be operated in such a manner that displaying outputs are received whenever the registration of the data is carried out by the ten-key device 12A, and the outputs thus received are successively displayed by the displaying device 51. In operation, the displayed results are held as they are until the next following displaying output arrives at the displaying device.

6. Line break protection circuit

The line break protection circuit 6 is intended to protect automatically the memorized data in the main memory MM, which are inherently volatile, from being lost in the case where the power source is accidentally interrupted for any of various reasons. The line break protection circuit 6 comprises a line break detector 61, a timer circuit 62 including timers A and B, a battery circuit 63, and a memory protection circuit 64, as shown in FIG. 5. The timer A provides a time limit of, for instance, about 15 sec. which is sufficiently longer than an instantaneous power failure and the like, and the timer B provides another time limit of, for instance, 30 sec., which is equal to the time limit of the timer A plus the operating time of the operating instruction circuit 34, the time required for the operation processing control circuit 36 operating at most in one branch, and the time required for the printer 52 in printing out the data in the main memory MM.

When a line break occurs, the battery circuit 63 instantaneously connects the battery 65 by way of the memory protecting circuit 64 to the memory device 31. In this case, however, the timer A applies an output pulse A to the memory protecting circuit 64 after the elapse of the above-mentioned time limit, whereby the circuit 64 applies a line break signal to the line break operation instruction circuit 11R in the command input system 1.

Thus, the line break operation instruction circuit 11R gives a main operation instruction concerning the LB by way of an LB instruction memory 21V to the operation instruction circuit 34 thereby to address the execution of the LB program.

As a result, data for the cash deposit, our bank deposit, another bank 1 deposit, another back 2 deposit, automatic dispense, cash payment, and date, serial number stored in the main memory MM, are printed out by the printer 52.

When the time limit of the timer B elapses, an output pulse B is delivered, which is then applied to the battery circuit 63, and the battery circuit in turn separates the battery 65 from the memory device 31, and wasteful discharging of the battery 65 can thus be prevented.

Figure 35:
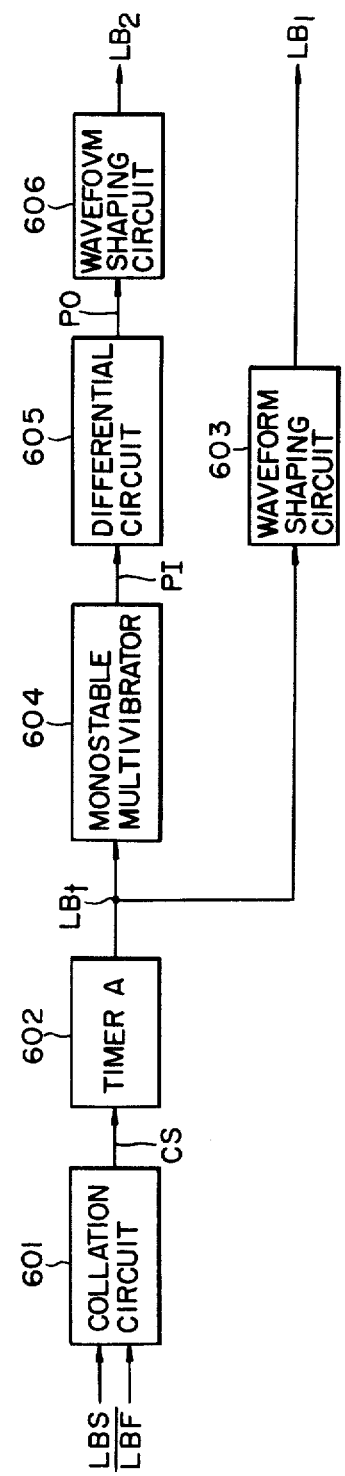
FIG. 35 is a block diagram illustrating a line break operation instruction circuit shown in FIG. 2.
Figure 36:
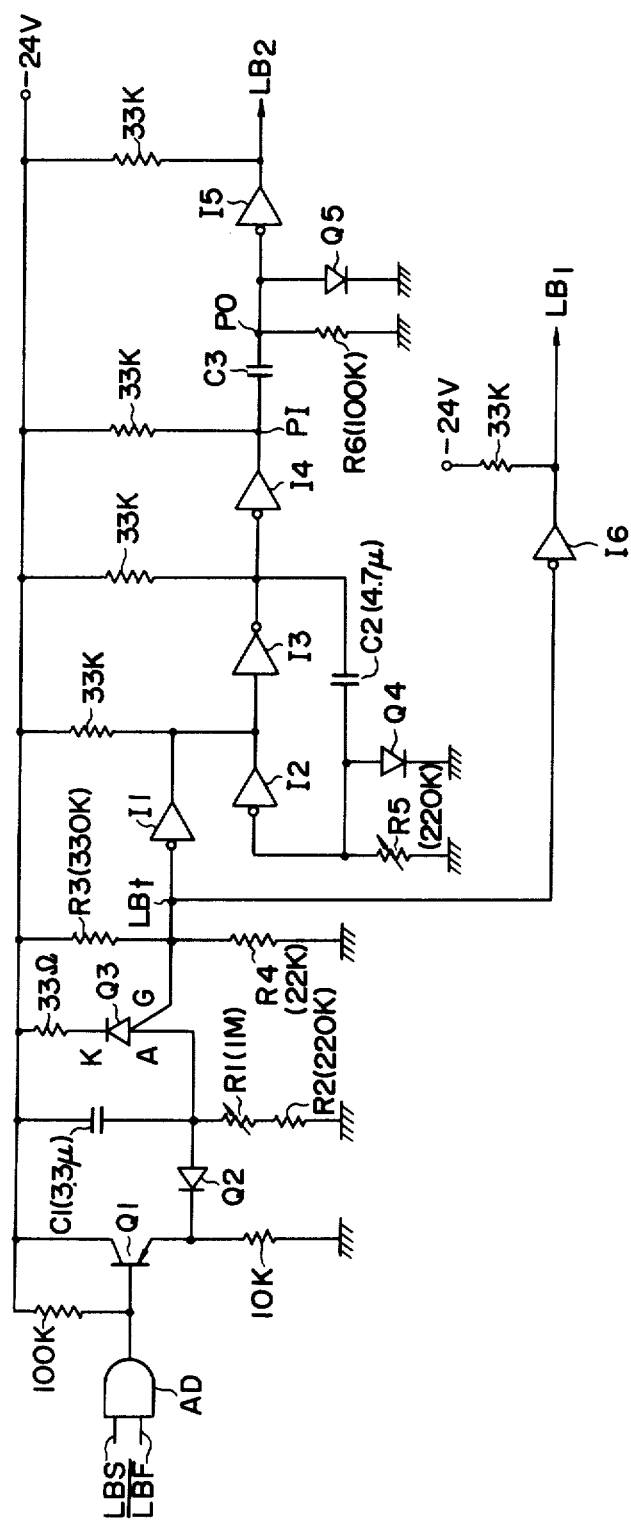
FIG. 36 is a circuit diagram showing in detail the line break operation instruction circuit shown in FIG. 35.

In the above described example, the timer A, memory protecting circuit 64, and the line-break operation instruction circuit 11R are combined as illustrated in FIGS. 35 and 36. Referring to FIG. 35, numeral 601 designates a collation circuit which collates the line-break detecting signal LBS and the reset output $\overline{LBF}$ of the LB memory 21V, and delivers a coincidence signal CS between the two signals. Numeral 602 designates the timer A delivering an LB pulse LBt after a predetermined time limit To from an instant where the coincidence signal CS is formed. Numeral 603 designates a waveform shaping circuit for shaping the waveform of the LB pulse LBt. Numeral 604 designates a monostable multivibrator which is operated in the decay time of the LB pulse LBt. Numeral 605 designates a differentiating circuit which differentiates the output pulse PI of the monostable multivibrator 604, and numeral 606 designates a waveform shaping circuit which inverts and shapes the negative output from the differentiating circuit 605 and obtains a line-break signal $LB_2$.

In a more practical example of the circuit shown in FIG. 36, the collation circuit 601 includes an AND circuit AD and a transistor $Q_1$, and the timer 602 is made of a programmable unijunction transistor (PUT) $Q_3$ which operates on-off in response to a difference voltage between the potential of a gate G and that of the anode A, a capacitor $C_1$, and a variable resistor $R_1$. Inverters $I_1$ through $I_3$, capacitor $C_2$, a variable resistor $R_5$, and a diode $Q_4$ constitute the monostable multivibrator 604, and a diode $Q_5$ cuts off the positive side of the differentiated waveform. In the circuit shown in FIG. 36, resistors $R_3$ and R4 are in a relation of $R_3 >> R_4$.

In the above described circuit, no line-break detecting signal LBS is delivered from the line-break detecting circuit 61 in the normal operation, and hence the timer circuit 62 is not operated. Thus, the a.c. line voltage is converted into d.c. voltage in a power device in the battery circuit 63, whereby the battery 65 is charged while a d.c. power is supplied to the apparatus of this invention.

When the power source voltage drops because of some trouble occurring in the a.c. power line, the line break detecting circuit 61 does not operate until the d.c. power source voltage falls below a critical voltage of, for instance, 80% of the normal voltage, and the power source device in the battery circuit 63 is stabilized to deliver a normal output voltage.

When the a.c. line voltage falls below the hereinbefore described critical value, the output voltage of the d.c. power source device is also lowered. However, the part lowered in the output voltage is compensated for by the battery 65. That is, the battery circuit 63 is continually monitoring the power source voltage, and when the voltage is lowered from its normal value, charging of the battery 65 is stopped. At the same time, the reduced output voltage is compensated for by discharging the battery 65, and the d.c. power is supplied to the invention apparatus through the memory protection circuit 64. Since the lowered part of the output voltage is thus compensated for by the battery as described above, the apparatus according to the present invention can be operated in a stable manner.

On the other hand, when the a.c. power line voltage is lowered below the critical voltage, the line break detecting circuit 61 operates, and a line break detecting signal LBS is delivered. In this case, data related to cash deposit, own bank deposit, other bank 1 deposit, other bank 2 deposit, automatic dispense, cash payment, date, serial numeral, and the like stored in the main memory MM are printed out by the printer 52 as will be described hereinlater.

After a time period required for the printing out, the timer B delivers a battery interrupting signal B to the battery circuit 63, whereby the battery 65 stops discharging, and the extent to which the battery 65 is discharged in case of a power failure can be thereby reduced.

When the power source resumes supplying power after delivery of the battery interrupting signal B, the contents of the main memory MM are completely erased. However, the contents have been printed out by the printer 52 by that time, and no obstacle is thereby caused. After the restoration of the power source, required operations of the apparatus can be carried out on the basis of the printed data.

The circuit shown in FIGS. 35 and 36 operates as follows.

Figure 37:
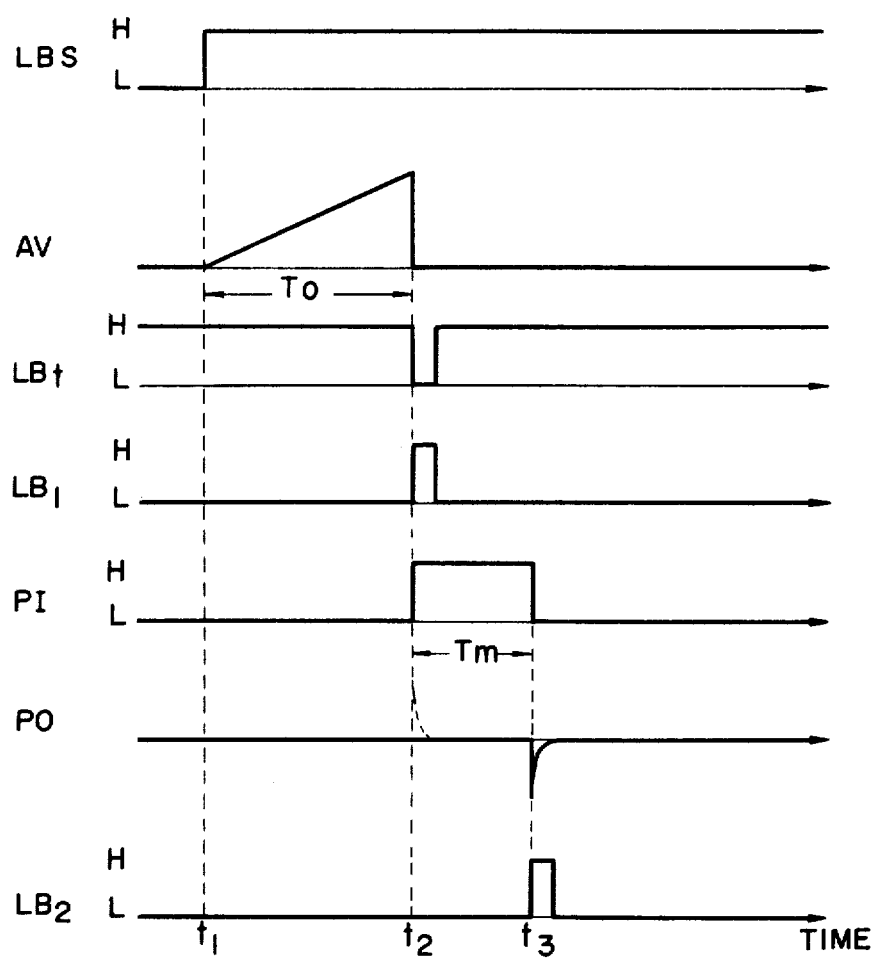
FIG. 37 is a series of graphical representations of various signal waveforms which are utilized for a description of the operation of the line break operation instruction circuit shown in FIG. 36.

Assuming first that a line break occurs when the LB memory 21V is reset and the signal LBF is in H state, the line break is detected by the line break detecting circuit 61, which delivers a line-break detecting signal LBS (in H state) at the time instant $t_1$ where the line break occurs (refer to FIG. 37). Upon reception of the LBS signal, the output from the AND circuit AD is brought to H, whereby the transistor $Q_1$ is brought into the off state, and the capacitor $C_1$ starts to be charged with a time constant of $C_1(R_1 + R_2)$.

When the anode potential of the programable unijunction transistor PUT is made equal to the gate potential thereof at an instant $t_2$ (the gate potential being equal to the potential divided by the resistors $R_3$ and $R_4$ which is approximately equal to the ground potential because the PUT is normally in the OFF state), the PUT is brought into the ON state. Thus, the LB pulse LBt is delivered as shown in FIG. 37, and whereby a line break signal $LB_1$ is issued through the inverter $I_6$.

The line break signal $LB_1$ is passed through an OR circuit and an inverter e-458 as shown in FIGS. 22 and 23 and resets the memories 21R through 21T. The limiting time To of the timer A can be varied by varying the resistor $R_1$.

When the line break terminates after the line break detecting signal LBS has been delivered but before the charging potential of the capacitor $C_1$ is brought equal up to the gate potential of the PUT, the line-break detecting signal LBS becomes L, and the transistor $Q_1$ is brought to ON, whereby the capacitor $C_1$ is discharged through the diode $Q_2$. In this case the line break signal $LB_1$ is not delivered, and the memories 21R through 21T are not reset thereby continuing the operations.

When the LB pulse LBt is supplied to the monostable multivibrator 604, the same multivibrator 604 is thereby triggered thereby to deliver a pulse signal PI having a pulse width Tm. This pulse signal PI is differentiated in the differentiating circuit 605, and by the presence of the diode $Q_5$, only a signal PO constituting the negative side of the differentiated pulse delivered at an instant $t_3$ is applied to the inverter $I_5$. As a result, the inverter $I_5$ delivers a line break signal $IB_2$ as shown in FIG. 37 at the instant $t_3$. This line break signal $LB_2$ is passed through an AND gate of FIG. 22, and sets the LB instruction memory 21V. The set-output of the memory 21V designates the LB routine program in the main operation branch selection address register 33.

At this time, the address register 33 carries out step-by-step selection of the output lines $N_1$ through $N_6$ in a manner similar to that in the case of the hereinafter described grand total calculating process except that the process is performed in this case under a main branch selecting condition designated by the output LBF of the LB instruction memory 21V in place of the main branch selecting condition defined by the operational instruction TMF in the grand total calculating process.

That is, in FIGS. 22 through 27, in the case where $N_6$ output holding circuit 33F is reset by the address routine completion signal ACS caused by a paper feed signal PF, the LB instruction memory 21V is reset through a reset circuit 396, and an output $F(N_7)$ is delivered from an $N_7$ setting output gate circuit 381. As a result, an $N_7$ output holding circuit 33G is set, and an address output is sent out over the output line $N_7$.

At this time, an address $(X_3, Y_6)$ in FIG. 13 is set in the ROM counter 34B, and the date, serial number main branch corresponding to this address is read out of the ROM 34C.

Thus, the data in the date, serial number main memory $M_7$ are read out by way of the operation and decision circuit 36D in a similar manner as described above, and the journal is printed by the printer 52.

When a limiting time of, for instance, 30 sec. of the timer B has elapsed after the line break, a battery interruption signal B is delivered to the battery circuit 63, and the LB mode of the operation is thereby terminated.

Since the printing of the contents of the memory MM is started in 15 sec. after the line break, and the battery 65 is disconnected in 30 sec. after the line break, the amount of discharge of the battery 65 can be reduced thereby prolonging the life of the battery.

By the provision of the memory protecting circuit of the above described composition, the battery is charged during the normal operation with the simultaneous supply of d.c. power from the power source device, and at the time of the power failure, the reduction of the power source voltage is compensated for from the battery. When the voltage drop of the power source exceeds a predetermined value, the contents of the memories, particularly of the main memory, the loss of the content of which would cause serious damage to the entire system, are printed out by the printer after a predetermined time from the exceeding instant. After the contents of the memories are thus printed out, the discharge of the battery terminates so that the amount of discharge thereof is minimized, and the serviceable life of the battery is prolonged.

The foregoing disclosure has been a detailed description of one example of a monetary receipt management apparatus according to this invention. The operation of this apparatus will now be described in the order of the control manipulations.

1. Date, Serial Number setting

As preparation for a control operation, setting of the Date, Serial Number is carried out.

This Date, Serial Number setting is carried out only once at the time of starting of business prior to the start of actual processing work.

For example, when Showa year 48, December, 4 is to be set,

1a. Date switch 14'C is pushed

Then, since the Audit switch 11C is normally in its OFF position, setting of the date therethrough becomes possible.

1b. Registration of 48120 4000 is effected by means of the ten-key device 12A.

This registration data is read into the resister NKR for registration. Here, the last three digits are digits of the serial number. "000" is thus read into these serial number digits.

1c. Total/# switch 11P is pressed.

The date setting program is set in the operation processing control circuit 36, and, as a result, the registration data of the register NKR is written into the Date, Serial Number main memory $M_7$. At the same time, the date and serial number are printed out in the journal 81 at the printer 52 as indicated in FIG. 14.

The normal processing operation is carried out in the following manner.

2. In the case of receipt processing

In accordance with the deposit (receipt) slip filled in and presented at the teller's window by the customer, input of data and processing thereof are carried out. It will now be assumed that, on the basis of a deposit (receipt) slip as shown in FIG. 15, Cash, two Checks on our bank, one Check on another bank 1, and one Check on another bank 2 are deposited (received).

First, for carrying out a buffer operation,

2a. Cash switch 11A is pressed

The cash receipt classification item memory 21B is set, and the Cash receipt program address is specified with respect to the branch controller 34A of the operation instruction circuit 34 in accordance with this classification data, More specifically, as indicated in FIGS. 29 through 32, the set output CAF of the memory 21B is applied through the OR circuit 121A of the branch controller 34A to the $Y_2$ address signal forming circuit 121. Then, since a condition signal $\overline{T} \cdot \overline{BRS}$ has been obtained at this time (since the present operational mode is neither the main operational mode nor the 0 proof operational mode), a $Y_2$ address signal is sent out from this signal forming circuit 121 to the input circuit 142 of the ROM counter 34B.

At the same time, the condition signal $\overline{T_3} \cdot \overline{BRS}$ is sent out as a $Y_1$ address signal to the input circuit 141 of the ROM counter 34B.

On one hand, the set output CAF of the memory 21B is applied with respect to the input gate circuit 150 (FIG. 31) of the buffer operation starting circuit 34G by way of the OR circuit 151, and, as a result of the other gate conditions of Eq. (36) set forth above all being satisfied, the receipt item designation signal forming circuit 111 is immediately set. Accordingly, its output ICF causes an X5 address signal $\overline{BRS}$ (ICF + ODF) to be produced as output from the signal forming circuit 116 of the branch controller 34A.

In this manner, the branch controller 34A sets the $X_5$ address signal and the $Y_1$ and $Y_2$ address signals with respect to the ROM counter 34B, and as a result, as is apparent from FIG. 13, the branch controller 34A assumes a state for reading out the Write main branch of the address ($X_5$, $Y_1$) of the ROM 34C and the Receipt main branch.

At this time, the Write main branch is immediately applied to the instruction selection decoder 34F, and thus the sub-branch for carrying out the Write program with respect to the address register 36A of the operation processing control circuit 36 is designated.

2b. The monetary value ¥10,000 of the Cash is registered by the ten-key device.

This registration data is supplied by way of the data read-in decoder 22 to the operation processing circuit 36, by which it is subjected to signal conversion into a scheduled format, and is read into a register NKR for registration of the operation decision circuit 36D thereof, the content thereof being displayed by the display device 51.

2c. The + switch 13A is pressed.

The key-out output thereof is introduced as input into the buffer operation start circuit 34G, but since a classification instruction CAF from the Receipt classification item memory 21B is being applied at this time as a signal generation condition to the circuit 36G, the result is that a buffer operation start instruction is immediately applied with respect to the branch controller 34A.

Figure 31:
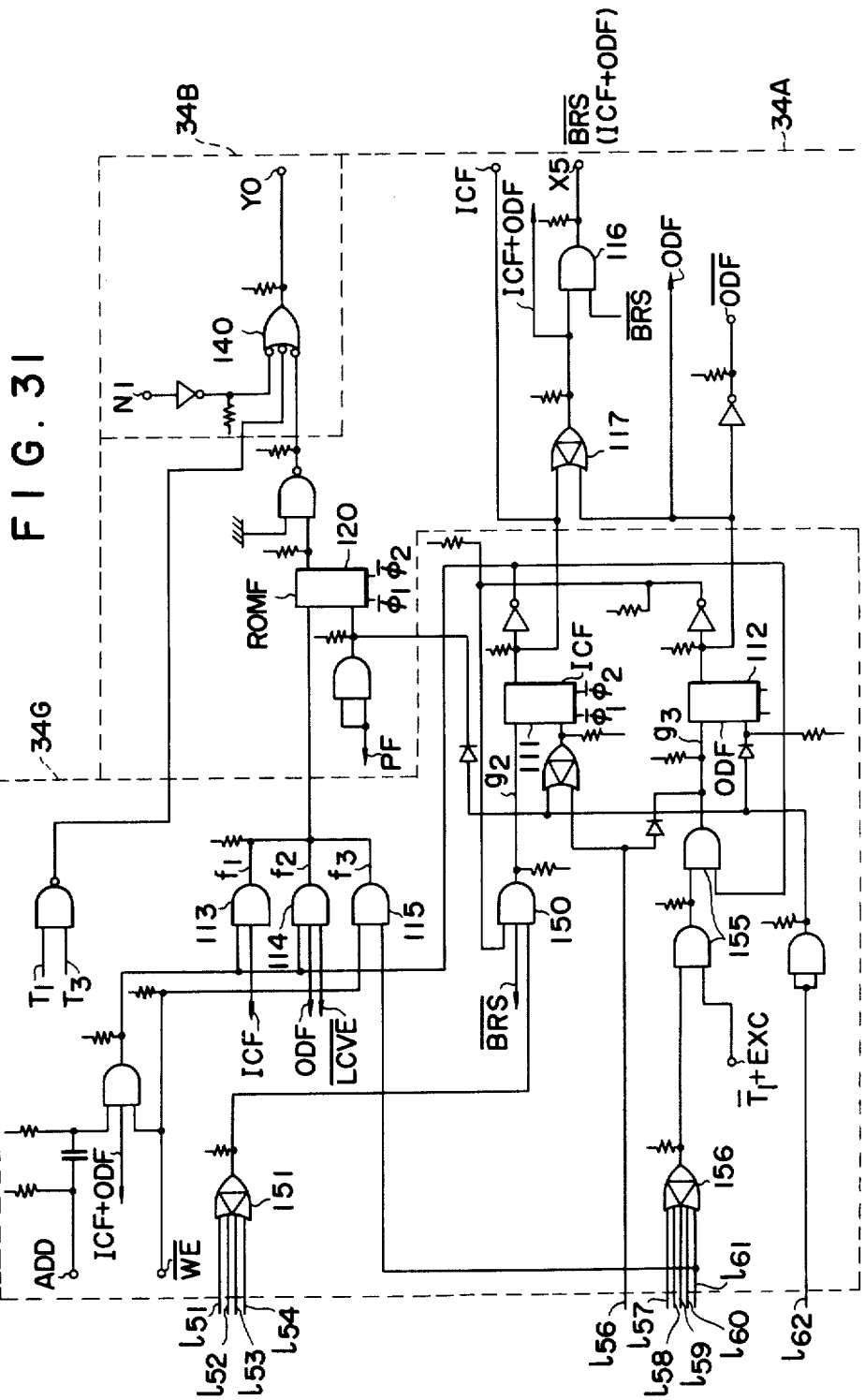

More specifically, the signal forming circuit 113 for forming a start signal at the time of receipt item operation mode in FIG. 31 produces as output a start signal $f_1$ upon receiving an output ADD of the key input circuit 13D of the + switch 13A applied thereto as a condition for generation of its output signal $f_1$ (Eq. (38) set forth hereinbefore). As a consequence, the signal forming circuit 120 of the branch controller 34A is set and produces as output a YD address signal.

Accordingly, a Buffer operation start main branch of the address $X_5$, YD of FIG. 13 is read out from the ROM 34C and is subdivided, the step control signal thus obtained being distributed from the branch and step control circuit 34E to the surrounding equipment. At the same time, specification of the sub-branch from this circuit 34E with respect to the control circuit 36 is effected.

First, the step control signal is applied to the printer 52. As a result, registration data is sent as output from the register NKR for registration to the printer 52 where it is printed in the journal together with the Cash symbol.

On one hand, a specification signal of the sub-branch is applied to the instruction selection decoder 34F and is set as a Cash receipt sub-branch buffer operation condition of a scheduled format in the address register 36A. Consequently, in accordance with this operational condition, a step execution instruction read out from the ROM 36B is produced as output through the decoder 36C, whereby the succeeding buffer operation is executed.

As the first step of this operation, the stored data (O at this time) of the Cash receipt buffer memory $B_2$ is read out at the register ACR for temporary storage of the operation decision circuit 36D under the control of the memory field specification circuit 36E, thereby being added to the registration data of the register NKR. At the same time, the registration data is read into the collation buffer memory $B_1$.

Then, as the second step, the registration data of the register NKR for registration is again written into the Cash receipt buffer memory $B_2$ under the control of the specification circuit 36E. Thus, a state wherein the registration data of ¥10,000 and ¥10,000 are respectively stored in the Collation buffer memory $B_1$ and the Cash receipt buffer memory $B_2$ is obtained, whereupon the process relating to the Cash receipt classification item terminates.

2d. The Our switch 11B is pressed.

The Our bank instruction memory 21C is set, and in accordance with this classification data CBF, the Our bank check receipt program address is specified with respect the branch controller 34A of the operation instruction circuit 34. At this time, the Cash receipt instruction memory 21B is reset.

At this time, in exactly the same manner as the Cash switch 11A was pressed in the above set forth section (2a), $Y_1$ and $Y_3$ address signals to the input circuits 141 and 143 of the ROM counter 34B are respectively sent out from the branch controller 34A. On one hand, an $X_5$ address signal is sent out from the signal forming circuit 116.

Accordingly, as indicated in FIG. 13, the operation assumes a state wherein an Write main branch and a Our bank main branch are read out from the ROM 34C.

2e. The monetary value ¥5,000 of the first Check on our bank is registered by means of the ten-key device 12A.

At this time, similarly as in the case of the above set forth section (2b), registration data is read into the register NKR and is also displayed at the displayer 51.

2f. The + switch 13A is pressed.

At this time, similarly as in the case set forth above in secton (2c), a buffer operation start is applied to the operation instruction circuit 34, whereby the execution of the "Our bank check receipt" program is addressed. Thus, the registration data is printed together with a symbol by the printer 52, and the registration data is added to the Our bank check receipt buffer memory $B_3$ and, at the same time, is read into the Collation buffer memory $B_1$. In this manner, ¥5,000 is stored in the Our bank check receipt buffer memory $B_3$, and, furthermore, the content of the Collation buffer memory $B_1$ becomes ¥10,000 . ¥5,000.

2g. The monetary value ¥3,000 of the second Our bank check is registered by means of the ten-key device 12A.

Since the Our bank instruction memory 21C continues to be in the set state, the same operation as described in section (2e) above is carried out.

2h. The + switch 13A is pressed.

The same operation as set forth in the above section (2f) is carried out. As a result, the symbol R and the registration data ¥3,000 are printed out by the printer 52, and the stored content of the Our bank check receipt buffer memory $B_3$ becomes ¥8,000 (i.e., ¥5,000 + ¥3,000), while the content of the Collation buffer memory $B_1$ becomes ¥10,000 . ¥5,000 . ¥3,000. Thus, the processing with respect to the "Our bank check receipt" classification item is completed.

2i. Thereafter, in the same manner, the Another 1 switch 11C is pressed and then the monetary value of the Another bank check 1 is registered by the ten-key device 12A. The + switch 13A is then pressed, and, after the Another 2 switch 11D is pressed immediately thereafter, the monetary value of the Another bank check 2 is registered. The + switch 13A is then pressed.

Thereupon, a state wherein ¥20,000 and ¥30,000 are stored respectively in the Another bank check 1 receipt and Another bank check 2 receipt buffer memories $B_4$ and $B_5$, and ¥10,000 . ¥5,000 . ¥3,000 . ¥20,000 . ¥30,000 are stored in the Collation buffer memory $B_1$ is attained. On one hand, printing is carried out for every item. Thus, the registration of data is completed, and printing indicating the registration progress as illustrated in FIG. 26B is accomplished in the journal of the printer 52.

2j. The Collation switch 14A is pressed.

The key-out signal thereof is applied as an operation sub-branch specification signal relating to the Collation buffer memory $B_1$ directly with respect to the instruction selection decoder 34F, whereupon the items of registration data of Collation buffer memory $B_1$ are successively added in the operation decision circuit 36D. The result of this addition, that is ¥68,000 (¥10,000 + ¥5,000 + ¥3,000 + ¥20,000 + ¥30,000) is applied to the displayer 51. Thus, the total amount of this transaction is displayed at the displayer 51.

Then, by seeing this collation display, the customer can verify in a very simple manner that there is no error in the registration total.

The buffer operation relating to receipt processing is accomplished in the above described manner, whereby the items of data relating to one transaction are respectively accommodated and stored in buffer memories provided respectively for the items of data. On one hand, the items of data for one transaction are accommodated and stored sequentially in series in the collation buffer memory. Particularly in this invention, by carrying out the main operation on the basis of the stored data of this buffer memory, addition for the total sum for the main memory is accomplished, and, furthermore, certification printing for certifying the one tansaction is carried out.

More specifically, in the operational state wherein, upon completion of the buffer operation as described above, ¥10,000, ¥8,000, ¥20,000, and ¥30,000 are respectively accommodated and stored in the Cash receipt buffer memory $B_2$, Our bank check receipt buffer memory B3, the Another bank check 1 receipt buffer memory $B_4$, and the Another bank check receipt buffer memory $B_5$, and, on one hand, all monetary values of one transaction are stored in the Collation buffer memory $B_1$, the following operations are carried out.

2k. A certification printing slip is inserted into the chute part of the printer 52.

Thereupon, a detection circuit 11T for detecting the insertion of the certification printing slip carries out this detection, whereby keying out of a signal from the Receipt total switch 11M becomes possible.

21. The Receipt total switch 11M is pressed.

At this time, the Receipt total instruction memory 21R is set, and the set output IAR thereof is applied to the instruction branch start circuit 21Y. As a result, the instruction branch start circuit 21Y introduces a Receipt total main branch selection condition signal as input into the address register 33 for main operation branch selection and, at the same time, introduces a main operation start signal as input into the address register 33.

Then, since there are data in the buffer memories $B_2$ through $B_5$ at this time, condition outputs $jg_2$ through $jg_5$ are being introduced as input into the address register 33, address selection outputs can be sent out through the output lines $N_1$ through $N_5$ as indicated in the "Receipt total" column of the table shown in FIG. 11. More specifically, in FIGS. 22 through 27, outputs $G_1$, $G_2$, $G_3$, and $G_4$ are obtained at input gate circuits 351, 352, 353, and 354 for setting $N_1$, $N_2$, $N_3$, and $N_4$ through condition circuits 323, 327, 331, and 334 of the address register 33. On one hand an output $G_6$ is obtained at the $N_5$ setting input gate circuit 378, as indicated in Table 1.

Accordingly, the address register 33 first sends out an address output through the output line $N_1$ when a main operation start signal BRSS from the instruction branch start circuit 21Y is introduced as input into the NI output holding circuit 33A of the output circuit 33I thereof. This address output is introduced as an input address signal through the input circuit 140 (FIG. 31) of the ROM counter 34B.

At this time, the ROM counter 34B is operated by an instruction signal IAF from the instruction branch start circuit 21Y to select the $X_1$ address indicated in FIG. 13 and, at the same time, is operated by a selection output from the output line $N_1$ to select the $Y_0$ address. Thus, the Cash main branch corresponding to the address $(X_1, Y_0)$ is read out from the ROM 34C. As a consequence, the corresponding execution step instruction and sub-branch selection instruction are caused to be sent out from the circuit 34E.

This step instruction is applied to the printer 52, and the stored data of the Cash receipt buffer memory $B_2$, that is, ¥10,000, is read out and is printed on a certification printing slip.

The sub-branch instruction is applied to the instruction selection decoder 34E, whereupon, from the address register 36A for operation execution, the addition execution instruction of the stored data (¥10,000 in this case) of the Cash receipt buffer memory $B_2$ and the cumulative total data of the Cash receipt main memory $M_1$ is sent out as output by way of the decoder 36C to the operation decision circuit 36D. Thus, the data of the Cash receipt buffer memory $B_2$ and the Cash receipt main memory $M_1$ are read out and added at the circuit 36D under the control of the field specification circuit 36E, and the added result is rewritten as a new cumulative total data into the main memory $M_1$.

Upon completion of one series of steps relating to such a Cash receipt classification item, an address routine completion signal ACS based on the paper feed signal PF is generated at the branch and step control circuit 34E. As a result, the $N_1$ output holding circuit 33A of the address register 33 is reset, while, on the other hand, the $N_2$ output holding circuit 33B is set. As a consequence, the register 33 is caused by the address output from the output line $N_2$ to select the $Y_1$ address, and, thus, the Our main branch corresponding to the address $(X_1, Y_1)$ of FIG. 13 is read out from ROM 34C, whereby corresponding execution steps and sub-branch selection instructions are sent out from the circuit 34E.

At this time, similarly as in the case described above, the stored data of the Our bank check receipt buffer memory $B_3$ is read out and is printed on a certification printing slip. At the same time, cumulative addition of the stored data of the buffer memory $B_2$ and the Our bank check receipt main memory $M_2$ and the rewriting of the addition result thereof into the main memory $M_2$ are accomplished.

Thereafter, in the same manner, the address specifying operation is carried out whenever an address routine completion signal ACS arrives, whereupon printing on the certification printing slip regarding the Another bank check 1 receipt classification item and the Another bank check 2 receipt classification item and the cumulative addition operation of the main memory are effected.

Upon completion of the operation through the output lines $N_1$ through $N_4$ in this manner, there are obtained respectively in the Cash receipt, Our bank check receipt, Another bank check 1 receipt, and Another bank check 2 receipt main memories $M_1$, $M_2$, $M_3$, and $M_4$ states wherein data of monetary amounts resulting from the addition of ¥10,000, ¥8,000, ¥20,000, and ¥30,000 to the cumulative total data prior to the start of operation are recorded as new cumulative total data.

If, in the operation of selecting the output lines $N_1$ through $N_4$ of the address register 33, there is a buffer memory among the buffer memories $B_2$ through $B_5$ in which data has not been stored, the output line thereof is not selected but is skipped or passed over.

After the data of the main memories relating to all classification items have been renewed, the address register 33 selects the output line $N_5$ on the basis of the fact that the $N_4$ output holding circuit 33D thereof has been reset, whereupon address $(X_1, Y_4)$ of FIG. 13 is addressed, and the "Collation" main branch is read out from the ROM 34C. At this time, all of the data of the classification items of the "Collation" buffer memory $B_1$ are successively added, and the addition result is printed by the printer 52 as a total amount for this one transaction.

When the series of step operations as described above through the output line $N_5$ is completed, and the $N_5$ output holding circuit 33E of the address register 33 is reset, the $N_6$ output holding circuit 33F, in turn, is set. As a consequence, the address $(X_1Y_5)$ of FIG. 13 is addressed, and the corresponding Date, Serial Number main branch is read out from the ROM 34C. At the same time, the series number part of the lower 3 digits of the data stored in the Date, Serial Number main memory $M_7$ is first read out as a first step, and 1 is added to the lowest digit thereof. As a second step, the remaining date part is read out and coupled to the serial number parts. As a third step, the resulting data is printed out by the printer 52. As a fourth step, the coupled data is rewritten as renewed data into the Date, Serial Number main memory $M_7$.

Then, upon completion of execution of operation relating to all classification items and Data, Serial Number in this manner, a branch completion signal is generated by the branch and step control circuit 34B and is applied to the Receipt total instruction memory 21R as a resetting signal thereof. As indicated in FIGS. 22 and 23, the branch completion signal is formed as a logical product condition of the paper feed signal DF and the address output to the output line $N_6$. Then, on the certification printing slip, the monetary amount, the total amount, data, and serial number are printed for each transaction as indicated in FIG. 15C. In actual practice, the reverse side of the receipt slip as shown in FIG. 15A is used as the certification printing slip 82.

2m. The certification printing slip is extracted from the chute part.

This is detected by a certification printing slip extraction strobe circuit 11U, which thereupon generates a strobe pulse as its detection output. At this time, the V receipt total instruction memory 21W is set, and as a result of the set output thereof, a main operation instruction having a V receipt total operation as a content is applied from the instruction branch start circuit 21Y to the address register 33 for main operation branch selection.

In the execution of this main operation instruction, the same steps as those carried out in the above section (21) are executed with the exception of the step of adding the data of the buffer memories relating to each classification item to the main memory and the step of adding 1 with respect to the serial number part, which steps are not executed. Accordingly, the printer 52 carries out printing for verification of the same content as the content printed on a certification printing slip as indicated in FIG. 14D with respect to the journal.

The operation of the apparatus part for accomplishing payment operation according to this invention will now be described with respect to payment processing with denomination specification, payment processing without denomination specification, exchange processing, and change processing.

Payment processing will be considered for the case of automatic dispensation with denomination specification and the case of automatic dispensation without denomination specification.

3. Automatic dispensation with denomination specification.

Introduction as input and processing of data is carried out in accordance with a deposit (receipt) slip which has been filled in and presented at the teller's window by a customer.

It will be assumed that payment is to be made with 10,000 yen notes, 5,000-yen notes, 1,000-yen notes, and 500-yen notes on the basis of the payment slip shown in FIG. 16A.

First, in order to carry out the buffer operation,

3a. The 10,000 switch 11F is pressed.

The 10,000-yen note classification item memory 21 I is set. As a result of this classification item data 14F, the 10,000-yen note payment program address is specified with respect to the branch controller 34A of the operation instruction circuit 34.

Figure 32:
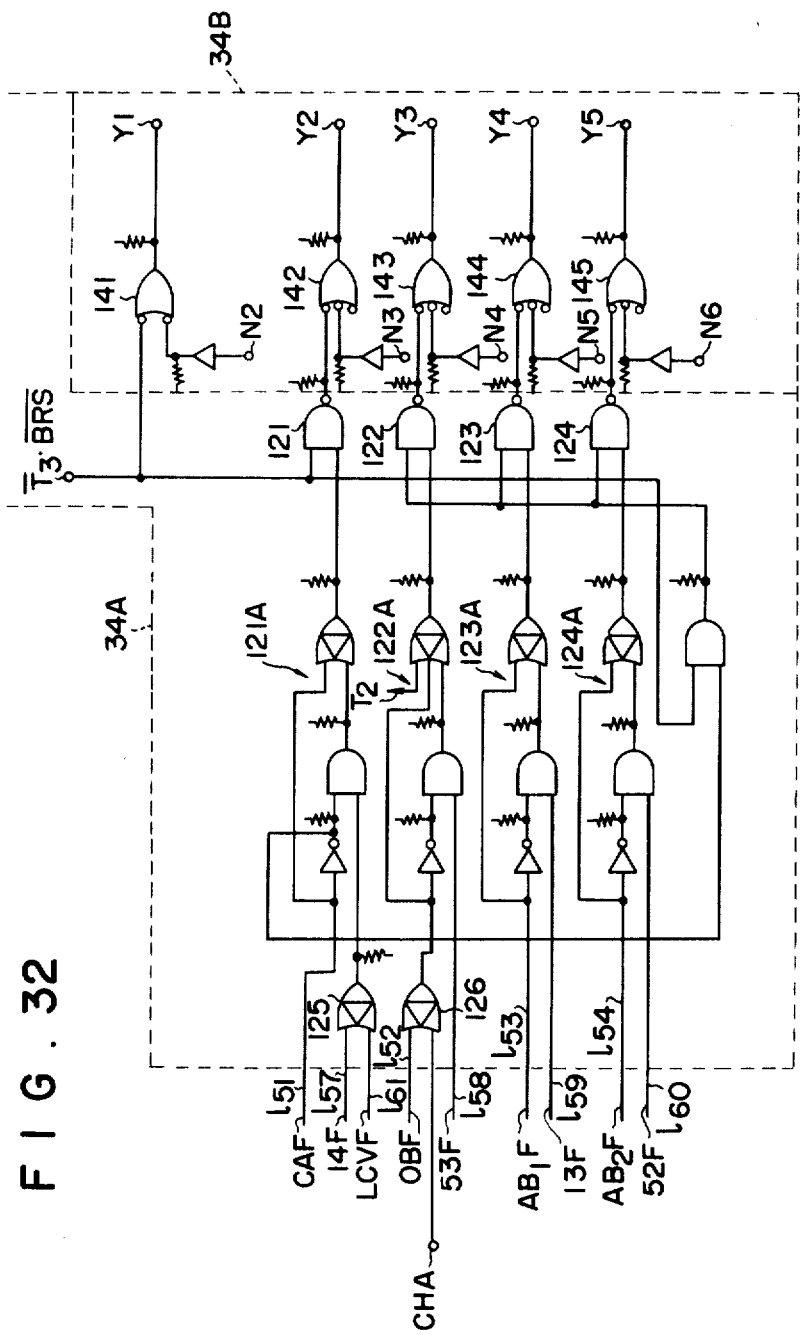

More specifically, as indicated in FIG. 32, the set output 14F of the memory 21I is applied through the OR circuit 121A of the branch controller 34A to the $Y_2$ address signal forming circuit 121. At this time, however, since a condition signal $T_3 \cdot BRS$ is being obtained, a $Y_2$ address signal is sent from the forming circuit 121 to the ROM counter 34B.

Simultaneously, a condition signal $\overline{T} \cdot \overline{BRS}$ is sent out as a $Y_1$ address signal.

One one hand the set output of the memory 21I is applied by way of the input OR circuit 156 to the input gate circuit 155 of the 14F buffer operation start circuit 34G (FIG. 31). Then, if at this time, all of the other conditions have been applied, the payment item specification signal forming circuit 112 will be set. Consequently, its output ODF causes an $X_5$ address signal $BRS(ICF + ODF)$ to be produced as output from the forming circuit 116 of the branch controller 34A.

In this manner, an $X_5$ address signal and $Y_1$ and $Y_2$ address signals are set with respect to the ROM counter 34B, whereby the branch controller 34A assumes a state for reading out the Write main branch and ¥10,000 main branch of the address $(X_5, Y_1)$ shown in FIG. 13.

In this case, furthermore, a sub-branch corresponding to the Write main branch is set with respect to the address register 36A of the operation processing control circuit 36.

3b. 10,000-yen note monetary amount ¥50,000 is registered by means of the ten-key device 12A.

This registration data is passed through a data read-in decoder 22 and converted into a prescribed format at the operation processing circuit 36 and is read into the register NKR for registration of the operation decision circuit 36D thereof, and, at the same time, the content thereof is displayed at the displayer 51.

Furthermore, the registration data thus read in passes through the operation decision circuit 36D, and, further passing through the transfer control circuit 37B controlled by the branch and step control circuit 34E by way of the transfer status circuit 37A, is introduced as input into the series-parallel conversion circuit 42A of the dispensation condition detection part 42 of the money dispensing machine 4.

The dispensation condition detecting part 42 operates at this time to determine whether or not there is an error in the registration control in the error check gate 42E with the content of each digit part of the transfer data from the circuit 37B and the classification data 14F from the above mentioned 10,000-yen note classification item memory 21I as decision conditions. For example, in the case where, in the instant example, ¥5,000 is registered when ¥50,000 should have been registered, since it is not possible to dispense the registered ¥5,000 with specified ¥10,000-yen notes, the error check gate 42E of the detecting part 42 produces an error signal. This error signal is applied by way of error control circuit 42F to the input inhibit circuit NO inserted in the power supply line of the control command input system 1, whereupon introduction thereafter of data as input into the receipt and payment management apparatus is inhibited.

In this case, furthermore, as a result of the money classification key switch, that is, the ¥10,000 switch 11F, being pressed prior to the registering of the monetary amount data by the ten-key device 12A, the money classification data 14F has been introduced as input, whereby the LCV flag forming circuit 37D does not produce an LCV signal LCVF (FIG. 30).

3c. The + switch 13A is pressed.

While the key out output thereof is introduced as input into the buffer operation start circuit 34G, since a classification instruction 14F from the 10,000-yen note classification item memory 21 I being applied at this time as a signal producing condition to this circuit 34G, a buffer operation start instruction is immediately applied to the branch controller 34A.

That is, in FIG. 31, the forming circuit 114 for forming a start signal of the time of payment item operation mode is supplied with an output ADD of the key input circuit 13D of the + switch 13A as a condition for producing its output signal $f_2$ (reference: Equation (3a) set forth hereinbefore). The forming circuit 114 thereby produces the start signal $f_2$, whereby the forming circuit 120 of the branch controller 34A produces as output a $Y_o$ address signal.

Accordingly, a Buffer operation start main branch of the address ($X_5$, $Y_0$) shown in FIG. 13 is read out from the ROM 34C. This is subdivided to produce a step control signal which is distributed from the branch and step control circuit 34E to the surrounding equipment, and, at the same time, specification of a subbranch is effected from the circuit 34F with respect to the control circuit 36.

First, the step control signal is applied to the printer 52, thereby causing registration data to be sent as output from the register NKR for registration to the printer 52 and thereby to be printed in the journal together with the Cash A symbol (indicating 10,000-yen note).

On one hand, the sub-branch specification signal is applied to the instruction selection decoder 34F and is set in the address register 36A as a 10,000-yen note sub-branch payment buffer operation condition of the prescribed format. Consequently, a step execution instruction read out from the ROM 36B according to this operation condition is produced as output through the decoder 36C, whereby the succeeding buffer operation is executed.

As the first step thereof, data (O at present) of the 10,000-yen note buffer memory B2 is read out at the register ACR for temporary storage of the operation decision circuit 36 under the control of the memory field specification circuit 36E. Then, to this data, the data (¥5,000 at present) of the register NKR for registration is added, and the result of this addition is rewritten into the 10,000-yen note buffer memory B2, the registration data being read into the Collation buffer memory B1 at the same time. Thus, ¥5,000 data is stored in the 10,000-yen note buffer memory B2, and ¥5,000 data is stored in the Collation buffer memory B1.

3d. The control procedures of the above sections (3a), (3b), and (3c) and the responsive actions thereof are carried out successively and similarly with respect also to 5,000-yen notes, 1,000-yen notes, and 500-yen notes.

In the case of this example, the 10,000-yen note through 500-yen note classification item memories B2 through B5 are similar to the above described classification item memories 21B through 21G in that, when, with one memory thereof in the set state, another memory is set, the memory which has been the set state up to this time is reset.

When the introduction as input of the classification data and monetary amount data relating to all money classification items has been completed, a state is attained wherein the monetary amount data ¥50,000 is stored in the 10,000-yen note buffer memory B2, that of ¥25,000 in the 5,000-yen note buffer memory B3, that of ¥20,000 in the 1,000-yen note buffer memory B4, and that of ¥5,000 in the 500-yen note buffer memory B5, and, furthermore, the monetary amount data of ¥5,000, ¥25,000, ¥20,000, and ¥5,000 are stored in the Collation buffer memory B1.

In addition, printing for each classification item indicating the past progress of the registration control is carried out in the journal 81 of the printer 52 as shown in FIG. 16B. In this connection, it should be mentioned that Cash A, B, C, and D are symbols respectively representing 10,000-yen note, 5,000-yen note, 1,000-yen note, and 500-yen note.

On one hand, the program memory of the note dispensation program circuit 43A contained within the money dispensation control part 43 is in the set state with respect to all denominations ¥10,000, ¥5,000, ¥1,000, and ¥500, whereby ¥10,000 through ¥500 denomination signals are being sent out from this note dispensation program circuit 43A.

3e. The Collation switch 14A is pressed.

The key out signal thereof is applied to the direct instruction selection decoder 34F, whereupon the various data of the "Collation" buffer memory B1 are successively added, and the result of this addition is produced as output at the displayer 51 to be displayed as the total amount of money of this transaction.

Accordingly, the customer sees this collation display and thereby verifies in a very simple manner that there is no error in the registration total.

In the above described manner, the buffer operation with respect to a payment processing with monetary amount designation is carried out, and data for the various items in one transaction are stored respectively in buffer memories provided respectively for the items. On one hand, the various data of the itemization in each transaction are recorded successively in series in the collation buffer memory but particularly in accordance with this invention, the main operation is carried out on the basis of the stored data of these buffer memories, whereby transfer of the data to the money dispensing machine 4 and the dispensation of the money corresponding to the contents of this transferred data are accomplished.

More specifically, with the apparatus in a state wherein: an operation has been completed; the monetary amount data of ¥50,000, ¥25,000, ¥20,000, and ¥5,000 are respectively stored in the 10,000-yen note, 5,000-yen note, 1,000-yen note, and 500-yen note buffer memories B2, B3, B4, and B5; and, on one hand, all monetary amounts of one transaction are stored in the Collation buffer memory B1, the following control procedures are carried out.

3f. A certification-printing-slip is inserted into the chute slot part.

The certification-printing-printing-slip insertion detection circuit 11T thereupon detects the insertion of this slip, whereby keying out of a signal from the Payment total switch 11N becomes possible.

3g. The Payment total switch 11M is pressed.

The Payment total instruction memory 21W is thereupon set, and the set output OAF thereof is applied to the instruction branch start circuit 21Y. As a result, the instruction branch start circuit 21Y introduces a Payment total main branch selection condition signal as input into the address register 33 for main operation branch selection and, at the same time, introduces a main operation start signal as input into the ROM counter 34B of the operation instruction circuit 34.

Then, when there is data in the collation buffer memory B1, a decision output $jg_1$ is being introduced as input into the address register 33. Consequently, as indicated in the line designated Payment total in FIG. 11, the address register 33 assumes a state wherein it can send an address selection output through output lines $N_1$ and $N_5$.

More specifically, in FIGS. 22 through 27, an output $G_1$ is obtained at the $N_1$ setting input gate circuit 351 through the condition circuit 324 of the address register 33, while an output $G_6$ is obtained (Table 2) at the $N_5$ setting input gate circuit 378.

Accordingly, the address register 33 operates first when, into the $N_1$ output holding circuit 33A of its output circuit 33I, a main operation start signal BRSS from the instruction branch start circuit 21Y is applied as input to send an address output through the output line $N_1$. This address output is applied as a $Y_0$ address signal to the ROM counter 34B by way of its input circuit 140 (FIG. 31).

The ROM counter 34B thereupon operates in response to an instruction signal from the instruction branch start circuit 21Y to select the $X_2$ address of FIG. 13 and, at the same time, is caused by a selection output from the output line $N_1$ to select the $Y_0$ address. Thus, a Cash Payment main branch corresponding to the address $(X_2, Y_0)$ is read out from the ROM 34C, whereby a corresponding execution step instruction and sub-branch selection instruction are read out and sent out from the circuit 34E.

These step instructions are applied to the printer 52, and the various data of the Collation buffer memory $B_1$ are read out and successively added, the result of this addition being printed on the certification printing slip 82. Furthermore, the sub-branch selection instruction is applied to the instruction selection decoder 34F, whereby an addition execution instruction of the monetary amount data (¥100,000 in this case) of the Collation buffer memory $B_1$ and the cumulative total data of the Cash payment main memory $M_6$ is produced as output from the address register 36A for operation execution and applied by way of the decoder 36C to the operation decision circuit 36D. In this manner, the data of the Collation buffer memory BL and the Cash payment main memory $M_6$ are read out and added at the circuit 36D under the control of the field specification circuit 36E, and the result of this addition is rewritten as new cumulative total data into the "Cash payment" main memory $M_6$.

Upon completion of one series of steps relating to the Collation classification items, an address routine completion signal ACS based on the paper feed signal PF is produced at the branch and step control circuit 34E, whereby the $N_1$ output holding circuit 33A of the address register 33 is reset, while the $N_5$ output holding circuit 33E is set.

Consequently, the register 33 is operated by the address output from the output line $N_5$ to select the $Y_4$ address. Thus, a Collation main branch corresponding to the address $(X_2, Y_4)$ of FIG. 13 is read out of the ROM 34C, whereby the corresponding execution step instruction and sub-branch selection instruction are sent out from the circuit 34E.

Similarly as in the above described case, the data of the Collation buffer memory $B_1$ are added, and the result of this addition is printed on the certification printing slip 82.

When, upon completion of this printing, an address routine completion signal ACS based on the paper feed signal PF is obtained at the branch and step control circuit 34E, and the $N_5$ output holding circuit 33E and the $N_5$ input gate control circuit 375 are thereby reset, the $N_6$ output holding circuit 33F, conversely, is set. Consequently, the register 33 is operated by the address output from the output line $N_6$ to read out a Date, Serial Number main branch corresponding to the address $(X_2, Y_5)$ of FIG. 13 from the ROM 34C.

As a result, of the numerical data stored in the Date, Serial Number main memory $M_7$, the serial number portion of the lower three digits is first read out, and 1 is added to the lowest digit as a first step. As a second step, the remaining data portion is read out and coupled to the serial number portion. As a third step, the resulting coupled data is printed out by the printer 52. As a fourth step, the coupled data is rewritten as renewed data in the Date, Serial Number main memory $M_7$.

Then, upon completion of operation execution relating to Collation classification items and Date, Serial Number in the above described manner, a branch completion signal is sent out from the branch and completion decision circuit 35B and is applied to the Payment total instruction memory 21S as a resetting signal thereof. At the same time, the total amount to be paid, the date, and serial number are printed on the certification printing slip 82 as indicated in FIG. 16C. Here, the resetting signal is formed as a logical product condition of the paper feed signal PF and the address output to the output line $N_6$ of FIGS. 22 and 23.

3h. The certification printing slip is extracted from the chute.

The V payment total instruction memory 21 X is thereupon set through the certification printing slip extraction strobe circuit 11U, and as a result of the set output OVF, a main operation instruction having V payment total operation as its content is applied from the instruction branch start circuit 21Y to the address register 33 for main operation branch selection. In the execution of this main operation instruction, the same steps as those in section (3g) above, except for the step of adding the data of the Collation buffer memory $B_1$ to the Cash payment main memory $M_6$ and the step of adding 1 relative to the serial number portion, which steps are not carried out, are executed. Accordingly, the printer 52 carries out printing with respect to the journal 81 for verification of the same content as the content printed on the certification printing slip as indicated in FIG. 16D.

3i. The Payment switch 110 is pressed.

The Payment instruction memory 21T is set by the resulting key out signal. In this case, however, since the Payment instruction memory 21S has been previously set, the setting of the memory 21T is not obstructed. The set output DIP of the memory 21T is applied to the instruction branch start circuit 21Y, whereby the execution of the program of automatic dispensation by denomination is addressed in the operation instruction circuit 34.

The setting operation of the Payment memory 21T is normally inhibited by the payment condition circuit 395 inserted in the input path from the Payment switch 110 to the setting end, but when the Payment total memory 21S is reset from the set state with at least the set output OAF of the Payment total memory 21S and the set output ODF of the payment item specification signal forming circuit 112 (FIG. 31) as conditions, that is, when the Payment total main operation is completed, the condition circuit 395 terminates its inhibitng operation and operates so as to obtain an input to he Payment memory 21T.

As a result of data being stored in the buffer memories $B_2$ through $B_5$, condition outputs $jg_2$ through $jg_5$ are being applied as input to the address register 33. Accordingly, the address register assumes a state wherein t can send out address selection outputs through output lines $N_1$ through $N_4$ as indicated in line Payment By denomination of the table shown in FIG. 11.

That is, when condition outputs $jg_2$, $jg_3$, $jg_4$, and $jg_5$ are applied to the condition circuits 322, 326, 330, and 333 of the address register 33 in FIGS. 22 through 27, and predetermined position detection signals by denomination $S_{14}$, $S_{53}$, $S_{13}$, and $S_{52}$ arrive respectively as other condition inputs, the address register assumes a state wherein it can send out condition outputs $h_2$, $h_6$, $h_{10}$, and $h_{13}$ (Table 3).

However, since the money dispensing control section 43 of the money dispensation machine 4 in the case of this example causes its note dispensing mechanism to assume the 10,000-yen note containing box position during its standby period, it applies only the ¥10,000 predetermined position detection signal $S_{14}$ to the register 33.

Consequently, an output $G_1$ is sent with the output $h_2$ of the condition circuit 322 as a condition to the $N_1$ set input gate circuit 351, whereby the address register 33 sends out an address output to the output line $N_1$ when a main operation start signal BRSS from the instruction branch start circuit 21Y is introduced as input, and this address output is applied as a $Y_0$ address signal to the ROM counter 34B by way of its input circuit 140 (FIG. 31). On one hand, as a consequence of an operation instruction output DIP being sent out from the Payment instruction memory 21T, the $X_4$ address in FIG. 13 is specified. In this manner, the ¥10,000 main branch corresponding to the address ($X_4$, $Y_0$) is read out from the ROM 34C, and the corresponding execution step instruction is thereby sent from the step and branch control circuit 34E to the transfer status control circuit 37A.

The circuit 37A thereupon first applies a data transfer signal TRF as a 10,000-yen note data transfer instruction to the tranfers control circuit 37B. This circuit 37B thereupon transfer the data relating to 10,000-yen note stored in the Collation buffer memory $B_1$ of the memory device 31 to the memory distributor 37C.

Upon completion of this transfer of the 10,000-yen note data, the branch and step control circuit 34E applies a load signal to the load control circuit 41B of the money dispensing machine 4. As a consequence, the monetary amount data of the memory distributor 37C is transferred through the circuit 41B to the dispensation counter 41A.

Next, a dispensation start instruction is sent as output from the branch and control circuit 34E to the dispensation start circuits 43S, which is thereby set. This set state of the circuit 43S is sustained until a dispensation completion signal EOC is subsequently sent out from the EOC flag forming circuit 43Q. Accordingly, the money dispensation start control circuit 43T generates a dispensation drive output, whereby the money dispensing machine 4 assumes a state wherein is can dispense 10,000-yen notes.

As described in section (3d) above, denomination signals relating to all denominations ¥10,000 through ¥500 are being sent out from the note dispensation program circuit 43A, and the priority circuit 43C receiving these signals selects, from among these denomination signals, the denomination of high monetary amount and produces an output (whereby, at present, a ¥10,000 denomination signal is produced as output). On one hand, in the case of the instant example, the 10,000-yen note note accommodating box position of the lifter is made the standby stopping position. Consequently, the lifter predetermined position detection circuit 43D produces as output a predetermined position detection signal, whereby, among the note clutch drivers 43E, the 10,000-yen note clutch driver is driven. Thus, since all of the dispensation conditions for 10,000-yen notes are present, dispensation of 10,000-yen notes is started.

The notes thus dispensed are detected by the note passage detector 41C, which produces detection signals. Each time these detection signals are obtained, a count pulse train of a predetermined number is sent out from the count pulse generating circuit 41F. From this count pulse train. The counter input selection circuit 41E, with the ¥10,000 denomination signal being applied thereto from the priority circuit 43C as a condition, discriminates and introduces as input one count pulse to the digit counter, i.e., the ¥10,000 digit counter, corresponding to this denomination.

Thus, the dispensation counter 41A carries out subtraction counting by 1 for each dispensation of a note from the monetary amount of the data which has been transferred from the memory distributor 37C and is the preset value thereof. When the content thereof eventually becomes 0, this is detected by the zero coincidence detection circuit 41G, and, in accordance with the coincidence detection output thereof, the ¥10,000 program memory of the note dispensation program circuit 43A is reset, whereupon the priority circuit 43C sends out a ¥5,000 denomination signal instead of the previous ¥10,000 denomination signal. As a result, the lifter predetermined position detection circuit 43D becomes incapable of obtaining a ¥10,000 predetermined position detection signal. Accordingly, the lifter lift control circuit 43H operates, and the lifter motor 43J begins to drive the lifter in lifting movement.

Then, when the lifter reaches the predetermined position of ¥5,000, the predetermined position detection circuit 43D detects this fact and operates to stop the lifter at this position and, at the same time, sends out a ¥5,000 predetermined position detection signal S53 and a predetermined position detection signal Ftcs.

This ¥5,000 predetermined position detection signal $S_{53}$ is applied to the condition circuit 326 of the address register 33 (FIG. 24), and, through this circuit 326, an output $G_2$ is produced at the output terminal of the $N_2$ set input gate circuit 352.

On one hand, the predetermined position detection signal Ftcs functions as the address routine completion signal ACS to reset the $N_1$ output holding circuit 33A of the address register 33 and the $N_1$ input gate circuit 359, whereby the $N_2$ output holding circuit 33B is set through the $N_2$ set output gate circuit 356. Consequently, an address output is sent out to the output line $N_2$ and is introduced as input as a $Y_1$ address signal into the ROM counter 34B through its input circuit 141 (FIG. 32). Thus, the address ($X_4$, $Y_1$) of FIG. 13 is set in the ROM counter 34B, and the corresponding ¥5,000 main branch is read out from the ROM 34C.

Accordingly, similarly as described above with respect to 10,000-yen notes, the step execution instruction of the branch and step control circuit 34E causes the date of ¥5,000 from among the data of the Collation buffer memory $B_1$ of the memory device 31 to be transferred through the transfer control circuit 37B to the memory distributor 37C and thereafter to be transferred again by way of the load control circuit 41B to the dispensation counter 41A.

On one hand, the ¥5,000 clutch driver of the note clutch drivers 43E is driven by the predetermined position detection signal of ¥5,000 of the lifter predetermined position detection circuit 43D, whereupon the dispensing of ¥5,000 notes is started. This dispensation of notes is detected by the note passage detector 41C similarly as in the case of ¥10,000 notes. In the instant case, however, the counter input selection circuit 41E, under the condition that a ¥5,000 denomination signal is being applied thereto from the priority circuit 43C, applies five count pulses to the ¥1,000 digit counter of the dispensation counter 41A each time a note is dispensed.

At this time, however, since a LCV signal is being sent from the LCV flag forming circuit 37D, the digit counter corresponding to the ¥5,000 note, i.e., the ¥1,000 digit counter, sends out a borrow signal to the digit counters of higher digit positions. Thus, the zero coincidence detection circuit 41G does not send out a zero coincidence output until the contents of the ¥1,000 digit counter and the higher position digit counters all become 0, whereby automatic dispensation by denomination is carried out.

Then, when a coincidence detection signal is obtained at the zero coincidence detection circuit 41G, the dispensing of ¥5,000 notes is stopped. Thereafter, automatic dispensing by denomination is carried out successively in this manner with respect to the remaining ¥1,000 and ¥500 notes.

When the dispensations with respect to notes of all denominations, ¥10,000 through ¥500 have been completed, all of the program memories of the note dispensation program circuit 43A have been reset. This reset state is detected by the note program reset check circuit 43L, the resulting detection signal of which is applied to the EOC flag circuit 43Q. Similarly, the output of the coin program reset check circuit 43M is received also by this EOC flag circuit 43Q, but since there is no necessity of carrying out dispensation of coins in the present transition, a normal detection signal is being produced as output from this coin program check circuit 43M. Accordingly, the EOC flag circuit 43Q produces as output a dispensation of money, i.e., an EOC signal, when a detection signal is obtained at the note program reset check circuit 43L.

This EOC signal, as a first function, causes the note payment motor 43 R to start operating thereby to send the dispensed notes out of the money dispensing machine 4. While not described with reference to the drawings, in the case of the instant example, the money dispensing mechanism is provided with a money dispensation receiving box which moves vertically unitarily therewith, and the pieces of money dispensed into this box are sent out through the payment aperture by the money payment mechanism when the dispensatin with respect to all denominations has been completed.

Furthermore, the EOC signal, as a second function, is applied to the dispensation start circuit 43S to reset the same.

In addition, the EOC signal, as a third function, is applied to the Payment instruction memory 21T (FIG. 2) of the program address signal forming circuit 2 as a reset signal thereof. Consequently, the main operation instruction which has Payment as its content, and which until this time has been applied by way of the instruction branch start circuit 21Y to the address register 33 for main operation branch selection, can no longer be obtained. Consequently, the branch and step control circuit 34E applied an operation execution instruction for renewal of storage of the Automatic dispensation main memory $M_5$ to the instruction selection decoder 34F.

As a consequence, the address register 36A for operation execution reads out accumulated data of the Automatic dispensation main memory $M_5$, as a first step, next successively adds to this 10,000-yen note data ¥50,000, 5,000-yen note data ¥25,000, 1,000-yen note data ¥20,000, and 500-yen note data ¥5,000, which have been read out from the Collation buffer memory $B_1$, and then rewrites the result of this addition into the Automatic dispensation main memory $M_5$.

In this manner, 5 10,000-yen notes, 5 sheets of 5,000-yen notes, 20 1,000-yen notes, and 10 sheets of 500-yen notes are automatically dispensed from the money dispensing machine 5, and the cummulative data resulting from the new addition of the total amount ¥100,000 of the money dispensed with respect to the Automatic dispensation main memory $M_5$ is renewed, whereupon all processes for payment by automatic dispensation by denomination are completed.

4. Automatic dispensation without denomination specification.

Introduction of data and processing thereof are carried out in accordance with a payment (demand) slip filled in the presented at the counter by the customer. On the basis of this payment slip as shown in FIG. 12, the monetary amount demanded without specification of denominations is automatically dispensed as follows with the minimum number of notes.

First, a buffer operation is carried out as follows.

4a. The demanded amount ¥148,976 without denomination specificatin is registered with the ten-key device 12A.

However, since the data has been registered by the ten-key device 12A without any key switch of the payment money classification key switch group $H_3$ being pressed, the LCV flag forming circuit 37 D (FIG. 30) produces as output an LCV signal LCVF.

This LCV signal LCVF passes through the OR circuit 125 of the branch controller 34A and further through the OR circuit 121A and is applied to the $Y_2$ address signal forming circuit 121. At this time, however, since the condition signal $T_3$. BRS is being obtaned, a $Y_2$ address signal is sent from this forming circuit 121 to the ROM counter 34B.

Simultaneously, the condition signal $T_3$. BRS is sent out as a $Y_1$ address signal.

On one hand, the LCV signal LCVF is applied to the input gate circuit 156 of the buffer operation start circuit 34G (FIG. 31) and immediately sets the payment item specificatin signal forming circuit 112 when the other gate conditions are all being applied. Consequently, its output ODF causes an $X_5$ address signal BRS (ICF + ODF) to be produced as output from the forming circuit 116 of the branch controller 34A.

As a result, the branch controller 34A sets the $X_5$ address signal and the $Y_1$ and $Y_2$ address signals with respect to the ROM counter 34 B and thereby assumes a state (FIG. 13) for reading out the Writing main branch of the address ($X_5$, $Y_1$) of the ROM 34 C and the LCV main branch of the address ($X_5$, $Y_2$).

The Writing main branch thereupon is immediately applied to the instruction selection decoder 34 F, and, thus, the registration data passes through the data read-in decoder 22 and is converted into a predetermined format in the operation processing control circuit 36 and is read into the register NKR for registration of the operation decision circuit 36 D thereof, and, at the same time, its content is displayed by the displayer 51.

4b. The + switch 13 A is pressed.

The key output thereof is applied as input to the buffer operation start circuit 34 G, but since the LCV signal LCVF is being applied as a signal generation conditin to the circuit 34G at this time, a buffer operatin start instruction is applied immediately to the branch controller 34A.

That is, referring to FIG. 14, the forming circuit 115 for forming a start signal at the time of LCV payment item operation mode produces as output a start signal $f_3$ upon receiving an output ADD of the key input circuit 13D of the + switch 13A as a condition for generating the output signal $f_3$ (Eq. (5) set forth hereinbefore), whereupon the forming circuit 120 of the branch controller 34A produces a $Y_0$ address signal as output.

Consequently, the Buffer operatin start main branch of the address ($X_5$, $Y_0$) of FIG. 13 is read out from the ROM 34 C and subdivided, and the resulting step control signal is distributed from the step control circuit 34E to the surrounding equipment, and, moreover, sub-branch specification from the circuit 34E with respect to the control circuit 36 is effected.

First, the step control signal is applied to the printer 52, whereupon registration data is sent as output from the register NKR for registration to the printer 52 and is printed on the journal together with a Cash symbol (indicating dispensation of a minimum number of notes).

On one hand, a sub-branch specification signal is converted into a scheduled format in the instruction selection decoder 34F and is set in the address register 36A. Consequently, a step execution instruction read out in accordance with this set condition from the ROM 36B is sent as output through the decoder 36C, whereby the succeeding buffer operation is executed.

First, the data (0 at present) of the LCV buffer memory $B_2$ is read out in the register ACR for temporary storage of the operation decision circuit 36D under the control of the memory field specification circuit 36E, and then, to this data, the data (148,976 at present) of the register NKR for registration is added. The result of this addition is rewritten into the LCV buffer memory $B_2$, while the registration data is read into the Collation buffer memory $B_1$.

Next, the registration data of the LCV buffer memory $B_2$ is applied by way of the operation decision circuit 36D and further through the transfer control circuit 37 B controlled by way of the transfer status control circuit 37A by the branch and step control circuit 34E to the series-parallel conversion circuit 42A. The resulting conversion output obtained at the decoder 42B on the basis of the output of the conversion circuit 42A is applied as input to the memory check gate 42 C. This memory check gate 42C operates, under the condition that the LCV signal LCVF is being applied as input thereto, to make a decision on the denominations necessary for dispensing money in a minimum number of notes from the monetary amount data stored in the present LCV buffer memory $B_2$ and to set the resulting denomination signal output by way of the built-in dispensation program check circuit 42A in the program memories of the note and coin dispensation program circuits 43A and 43B.

Since the monetary amount data ¥148,976 is stored in the present LCV buffer memory $B_2$, the money necessary for dispensing this amount comprises notes of four denominations, namely, ¥10,000, ¥5,000, ¥1,000, and ¥500 and coins of five denominations, namely, ¥100, ¥50, ¥10, ¥5, and ¥1. Accordingly, program memories corresponding to the total of nine denominations are set in the note and coin dispensation program circuits 43A and 43B.

Thus, registration of the demanded monetary amount data is completed. During this operation, the registration data ¥148,976 is good respectively in the LCV buffer memory $B_2$ and in the Collation buffer memory $B_1$. Furthermore, printing indicating the progress of the registration is effected on the journal 81 of the printer 52 as shown in FIG. 12B.

On one hand, the program memories of the note dispensation program circuit and the coin dispensation program circuit incorporated within the money dispensation control section 43 are in the set state with respect to all denominations from ¥10,000 through ¥1, whereby ¥10,000 through ¥1 denomination signals are being sent out from these note and coin dispensation program circuits.

4c. The Collation switch 14A is pressed.

The resulting key out signal is applied to the instruction selection decoder 34F, whereupon the data of the Collation buffer memory $B_1$ is sent as output to the displayer 51 and displayed as the total amount for this one transactions.

The customer, therefore, can observe the collation display and verify in a very simple manner that there is no error in the registration total.

The buffer operation for automatic dispensation without denomination specification is carried out in the manner described above. By this operation, the data respectively for the various items of one transaction are respectively stored in the iten buffer memories provided respectively for items, while one one hand, the various data of itemization in one transaction are successively stored in collation buffer memories. In accordance with this invention, however, the main operation is carried out on the basis of these data, whereby certification printing, cumulative total addition for the main memory, and transfer of the dispensation data to the money dispensing machine 4 by a transfer method differing from the payment processing with specification of denominations are carried out.

More specifically, as described above, upon completion of the buffer operation, the amount ¥148,976 is stored in the LCV buffer memory $B_2$, and all amounts of the one transaction, i.e., the same amount ¥148,976 is stored in the Collation buffer memory $B_1$. Then, with the apparatus in this state, the following steps are carried out.

4d. A certification printing slip is inserted into the chute.

The certification printing slip insertion detection circuit 11T detects this insertion of the slip, whereupon keying out of a signal from the Payment total switch 11N becomes possible.

4e. The Payment total switch 11N is pressed.

In exactly the same manner as set forth in the above section (3g), the various data of the Collation buffer memory $B_1$ are thereupon added, and the result of this addition is printed out on the certification printing slip 82. At the same time, the various data of the Collation buffer memory $B_1$ are cumulatively added to the Cash Payment main memory $M_6$, and 1 is added to the serial number digit of the Date, Serial Number main memory $M_7$. Thereafter, the data of this Date, Serial Number main memory $M_7$ are printed out on the certification printing slip 82.

Thus, on the certification printing slip 82, the total amount to be paid, the date, and the serial number are printed as shown in FIG. 12C.

4f. The certification printing slip is extracted from the chute.

In exactly the same manner as set forth in the above section (3h), printing as shown in FIG. 12D is carried out on the journal 81 of the printer 52.

4g. The Payment switch 110 is pressed.

The resulting key out signal causes the Payment instruction memory 21T to be set, and the set output thereof is applied to the instruction branch start circuit 21Y, whereupon the execution of the dispensation program with a minimum number of notes is addressed in the operation instruction circuit 34.

At this time, however, since data are stored in the buffer memory $B_2$, a condition output $jg_2$ is being applied as input to the address register 33, and, accordingly, as indicated in the line of Payment-LCV in the table of FIG. 11, the address register 33 assumes a state wherein an address selection output can be set out through the output line $N_1$.

Figure 24:
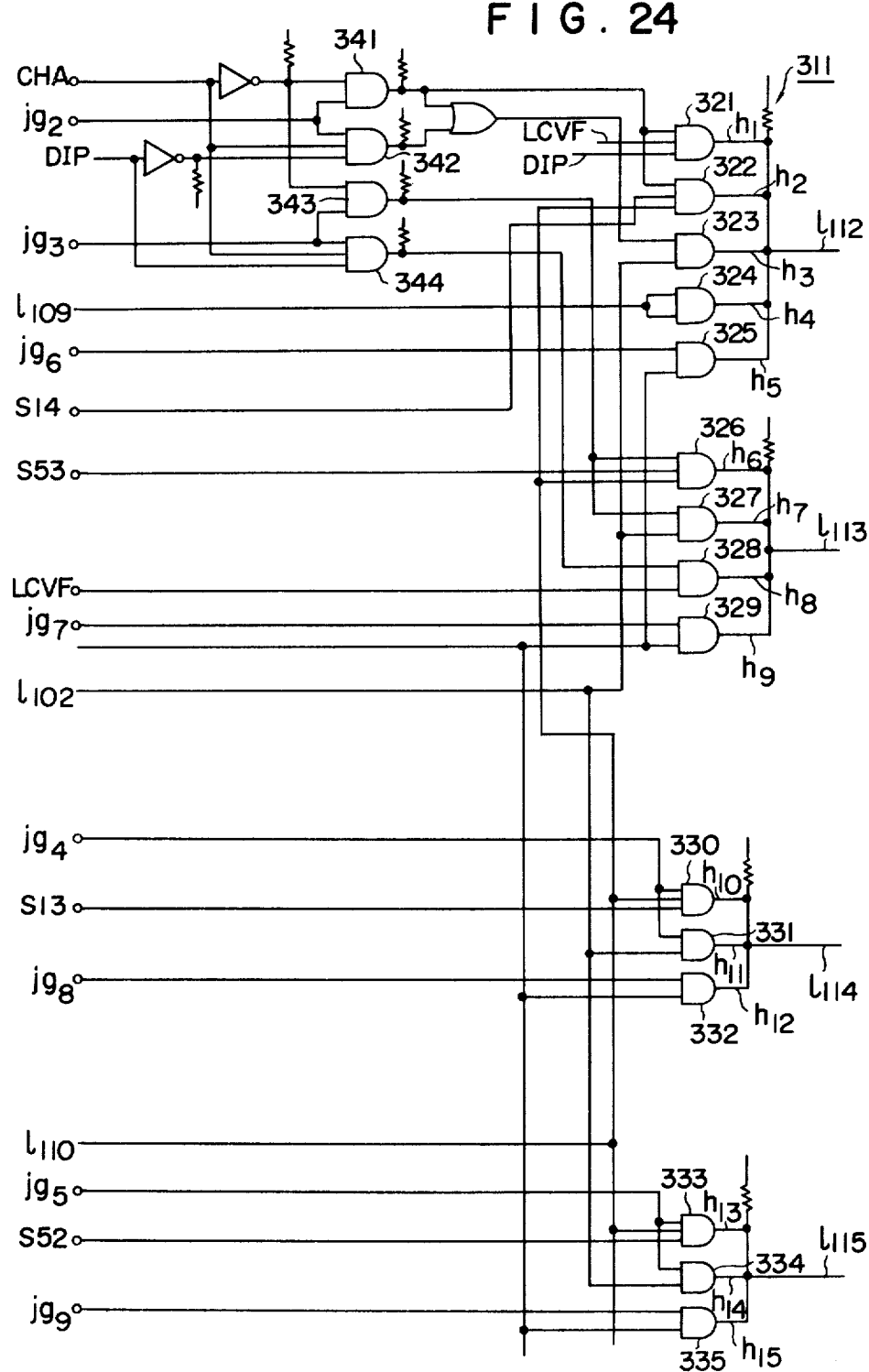
Figure 25:
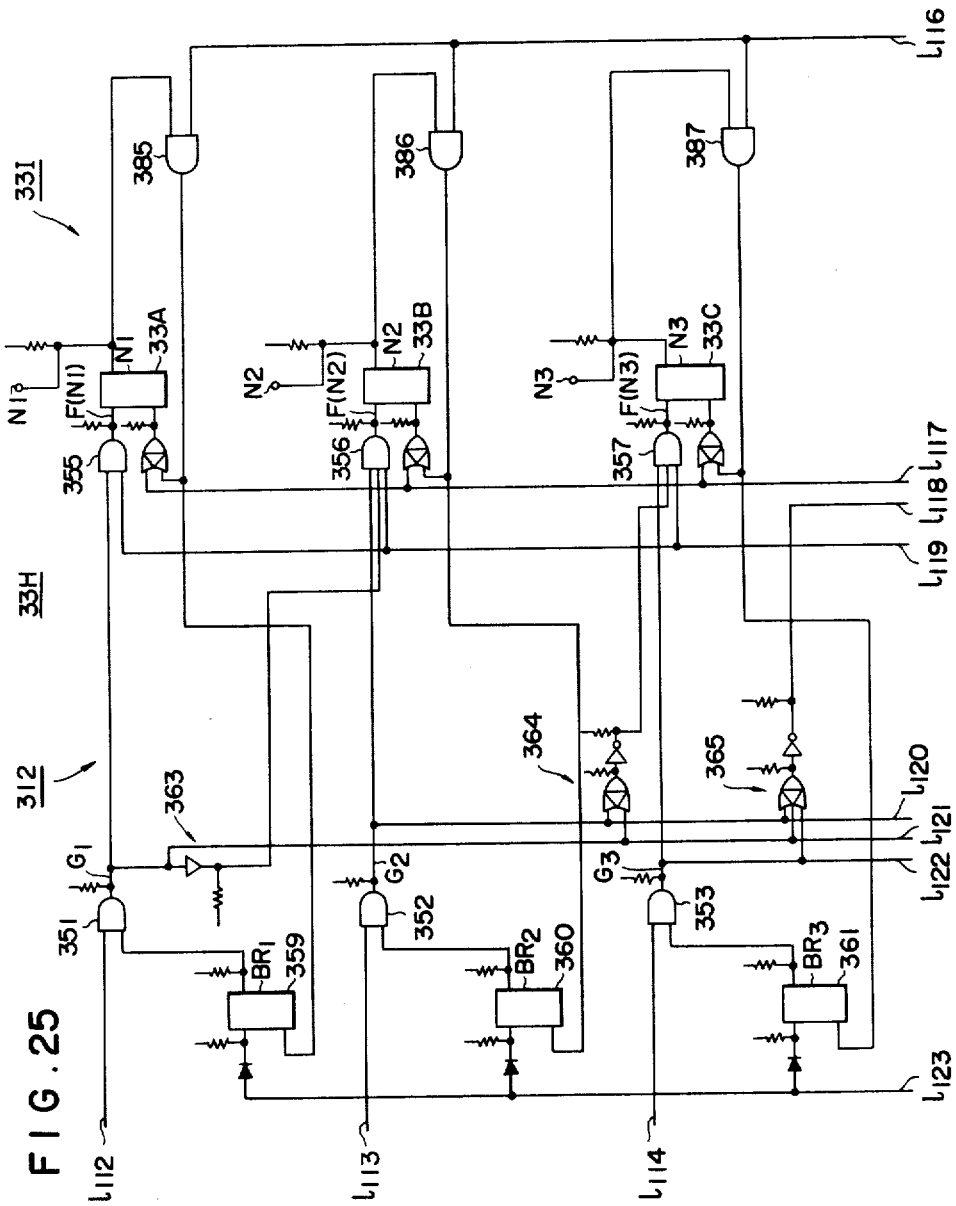
Figure 26:
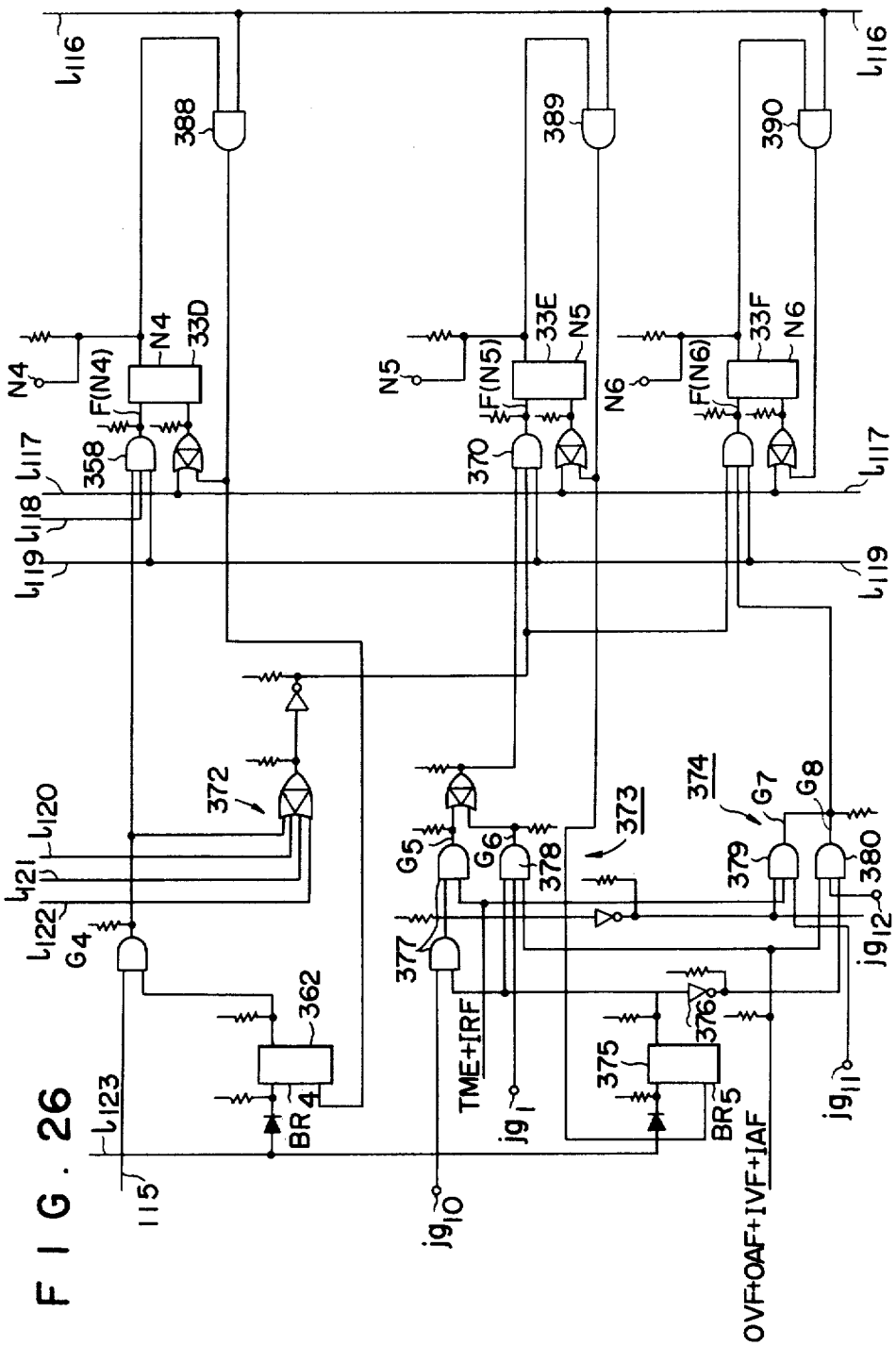
Figure 27:
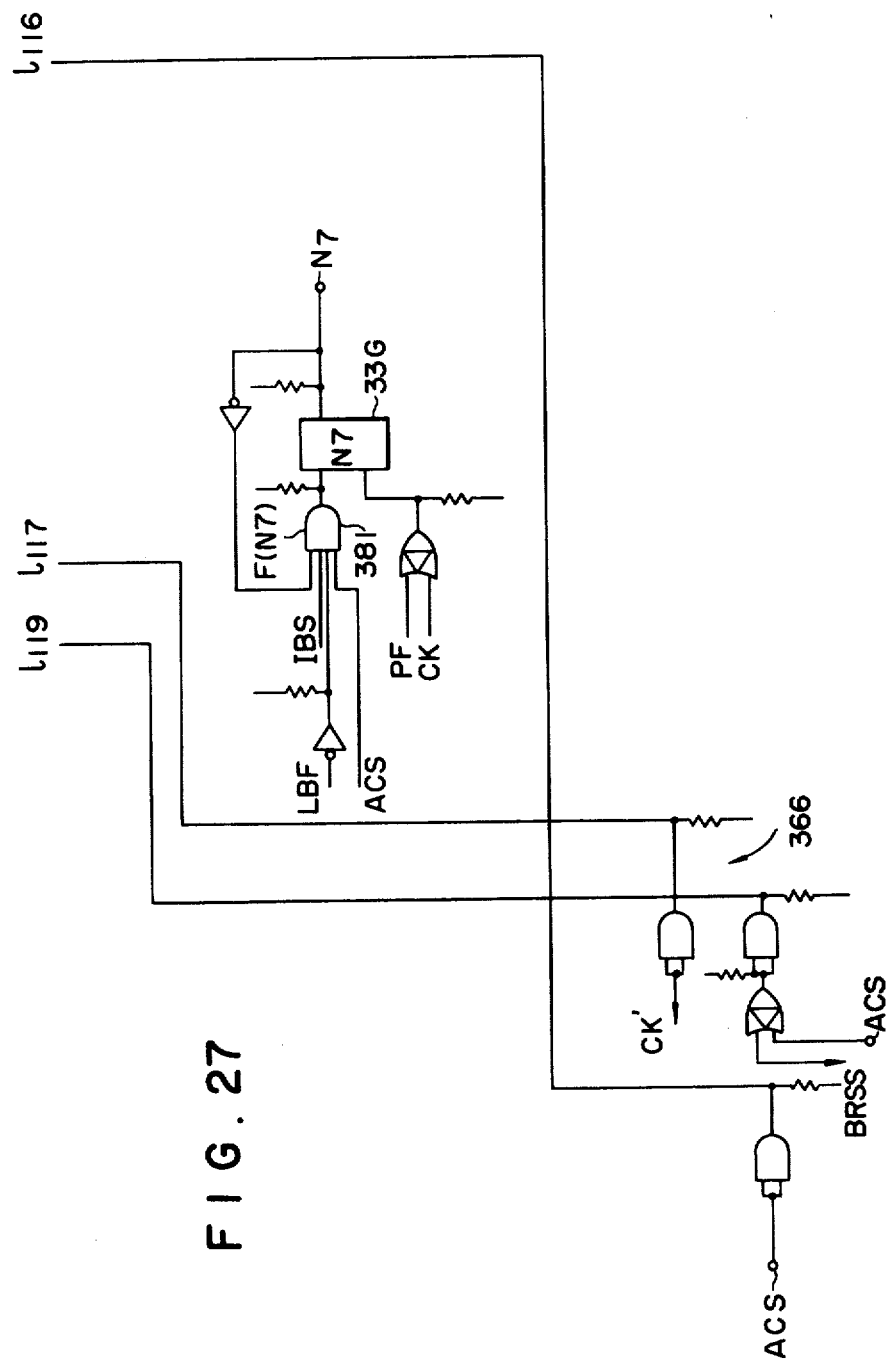
Figure 29:
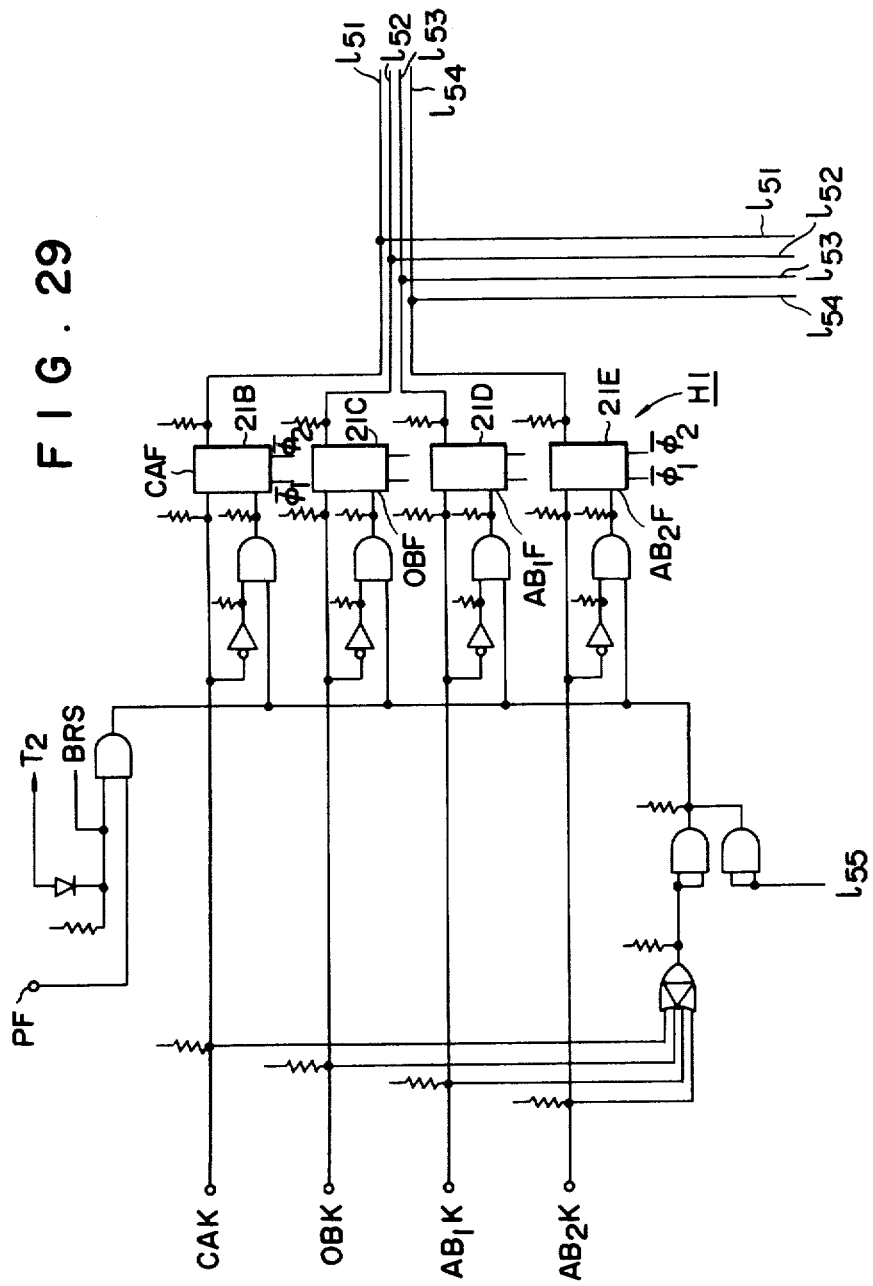
FIGS. 29 through 32 are block diagrams illustrating in detail the construction of a branch controller shown in FIG. 4.

That is referring to FIG. 24, a condition output $jg_2$, an LCV signal LCVF, and a Payment instruction output DIP are applied to the condition circuit 321 of the address register 33, whereby an output $h_1$ is sent out (Table 4). Consequently, an output $G_1$ is sent as output on the basis of this output $H_1$ of the condition circuit 321 to the $N_1$ setting input gate circuit 351, whereby the address register 33 sends an address output to the output line $N_1$ when a main operation start signal BRSS from the instruction branch start circuit 21Y is received as input, and this address output is applied as input to the ROM counter 34B as a $Y_0$ address signal thereof.

On one hand, as a result of the operation instruction output DIP being sent from the Payment instruction memory 21T, the $X_4$ address of FIG. 13 is specified. Thus, an LCV main branch corresponding to the address ($X_4$, $Y_0$) is read out from the ROM 34C, and an execution step instruction corresponding thereto is sent from the step and branch control circuit 34E to the transfer status control circuit 37A.

The circuit 37A thereupon applies a data transfer signal TRF as a data transfer instruction to the transfer control circuit 37B, which, consequently, transfers data relating to the LCV dispensation amount stored in the Collation buffer memory $B_1$ of the memory device 31 to the memory distributor 37C.

Upon completion of this transfer of data, the branch and step control circuit 34E applies a load signal to the load control circuit 41B of the money dispensing machine 4, and, through this circuit 41, the monetary amount data of the memory distributor 37C is retransferred to the dispensation counter 41A.

Next, a dispensation start instruction is sent from the branch and step control circuit 34E to the dispensation start circuit 43 S, which is thereby set. This set state of the circuit 43S is sustained until a dispensation completion signal EOC is subsequently sent from the EOC flag forming circuit 43Q. Consequently, the money dispensation start control circuit 43T generates a dispensation driving output, whereby the money dispensing machine 4 assumes a state wherein it is capable of dispensing money.

On one hand, denomination signals relating to all denominations ¥10,000 through ¥500 are being sent out from the note dispensation program circuit 43A as described above in section (4b), and the priority circuit 43C receiving these signals selectively produces as output a signal of the denomination of the highest monetary amount, that is, a ¥10,000 denominations signal. Since the lifter, on one hand, is at rest in a standby state at the 10,000-yen note note accommodating box position as described hereinabove in section (3i), the lifter predetermined position detection circuit 43D produces as output a predetermined position detection signal of ¥10,000. The clutch driver 43E of 10,000-yen notes is driven, and the dispensation of 10,000-yen notes is started.

Thereafter, in exactly the same manner as described hereinabove in section (3i) with regard the case of 10,000-yen note dispensation, a single count pulse is applied as input through the counter input selection circuit 41 E to the ¥10,000 digit counter every time the passage of a note is detected by the note passage detector 41C. Then, since data relating to 1 and 4 have been transferred respectively to the ¥100,000 of the dispensation counter 41A and the ¥10,000 digit counter, the contents of both digit counters become 0 when 14 10,000-yen notes have been dispensed. Accordingly, this is detected by the zero coincidence circuit 41G, whereby the ¥10,000 program memory of the note dispensation program circuit 43A is reset. As a result, the priority circuit 43C sends out a ¥5,000 denomination signal.

At this time, the lifter of the note dispensing mechanism rises and stops at the predetermined position of ¥5,000. The lifter predetermined position detection circuit 43 D detects this action of the lifter and causes the clutch drive to start driving. Then, at the time of dispensing one the note, 5 count pulses are applied as input to the ¥1,000 digit counter of the dispensation counter 41A, whereupon a single pulse is applied from the count pulse generating circuit 41F to the zero coincidence circuit 41G. Upon receiving this pulse, the zero coincidence circuit 41G produces a zero coincidence detection output with respect to ¥5,000 under the conditions that LCV dispensation is being carried out at present and that the money being dispensed comprises ¥5,000 notes. Therefore, when one sheet of ¥5,000 note has been dispensed, the succeeding dispensation with respect to ¥1,000 notes is started with the content of the ¥1,000 digit counter of the dispensation counter 41A in the state wherein the transfer data has been changed from 8 to 3.

Thereafter, when 3 sheets of ¥1,000 notes are dispensed, the content of the ¥1,000 digit counter becomes 0, whereupon a coincidence detection output is sent out from the zero coincidence detection circuit 41 G.

Then, when one ¥500 note is subsequently dispensed, a coincidence detection output is sent out from the zero coincidence detection circuit 41G with the content of the ¥100 digit counter of the dispensation counter 41A in the state wherein the transfer data has changed from 9 to 4.

At this time, the program memories of all denominations of the note dispensation program circuit 43A are all reset, whereupon dispensation of notes is completed. This completion of dispensation is detected by the note program reset check circuit 43L, the detection output of which, acting by way of the coin dispensation control circuit 43 N, causes the coin dispensation motor 43P to start its driving operation. This operational state is stored and sustained by the dispensation control circuit 43 N until a detection output arrives at the coin dispensation control circuit 43N from the coin program reset check circuit 43M.

In the case of the instant example, the coin dispensation motor 43P is used as a common motive power source for the coin dispensation mechanisms (not shown) for dispensing piece by piece coins of various denominations, and, by controlling each coin clutch driver 43K provided for a corresponding dispensation mechanism, this dispensation mechanism is coupled to the coin dispensation motor 43P. The clutch driver 43K for each denomination is driven by the corresponding denomination signal from the coin dispensation program 43 B.

At present, denomination signals of all denominations are being produced as output from the coin dispensation program circuit 43 B as described above in section (4b). Consequently, when the coin dispensation motor 43P is started, the coins of all denominations are simultaneously dispensed piece by piece. Thus, the coins are respectively dispensed, the three denominations of ¥100, ¥10, and ¥1 being dispensed similarly as in the above described case of ¥10,000 and ¥1,000, and the two denominations of ¥50 and ¥5 being dispensed similarly as in the above described case of ¥5,000 and ¥500. Every time a coin is thus dispensed, a count pulse from the count pulse generation circuit 41F is applied as input through the counter input selection circuit 41E, in accordance with a detection signal of the coin passage detector 41D, to the counter of the corresponding digit of the dispensation counter 41A. Furthermore, the zero coincidence detection circuit 41G carries out zero coincidence detection operation.

As a result, first, at the start of coin dispensation, the contents of the counters of the ¥100, ¥10, and ¥1 digits of the dispensation counter 41A respectively become 4, 7, and 6. Thereafter, the coins of all denominations are dispensed piece by piece, whereupon the contents of the digit counters become 3, 1, and 0, and zero coincidence is detected with respect to the denominations of ¥50, ¥5, and ¥1. Consequently, the coin clutch drivers 43K of these denominations assume in inoperative state.

When coins of the denomination remaining thereafter, that is, ¥100 and ¥10, are dispensed piece by piece, the contents of the digit counters 41A become 2, 0, and 0, and zero coincidence is detected with respect to the denomination ¥10. Consequently, the coin clutch driver 43K of this denomination assumes an inoperative state. When two coins of the denomination remaining thereafter, that is, ¥100, are dispensed, the contents of the digit counters become 0, 0, and 0, and zero coincidence with respect to the denomination 100 is detected. Consequently, the coin clutch driver 43 K of this denomination assumes an inoperative state.

The money dispensed in this manner comprises 14 ¥10,000 notes 1 ¥5,000 note, 3 sheets of ¥1,000 notes, 1 sheet of a ¥500 note, 4 ¥100 coins, 1 of a ¥500 coin, 2 ¥10 coin, 1 ¥5 coin, and 1 ¥1 coin.

When the contents of the digit counters become 0, 0, and 0, the program memories for all denominations of the coin dispensation program circuit 43 B are reset, and thus dispensation of coins is completed. This completion of dispensation is detected by the coin program reset check circuit 43M, and the resulting detection output thereof resets the storage state of the coin dispensation control circuit 43N and stops the coin dispensation motor 43P.

At this time, a dispensation completion signal (i.e., an EOC signal) indicating the completion of the operations of dispensation of the notes and coins is generated in the EOC flag forming circuit 43Q in accordance with the outputs of the note and coin program reset check circuits 43L and 43M.

Thereafter, as described hereinbefore in section (3j), this EOC signal is used for the purpose of renewal of the Automatic dispensation main memory $M_5$ due to, first, payment of the dispensed money, second, resetting of the dispensation start circuit 43S, and, third, resetting of the Payment instruction memory 21T.

PAYMENT PROCESSING

In the case of money payment processing, in addition to the above described cases of automatic dispensation with or without a designation of the monetary denomination, there could be a case of handing the money directly by the teller to a customer. Therefore, it is required that the money dispensing machine can account for such a payment by hand as well as automatic dispensation, which is a compound monetary transaction. Hereinafter, the term compound transaction is used to means a single transaction in which plural type of items are handled.

5. In the case of a compound transaction wherein automatic dispensation without any denomination designation and hand dispensing are combined.

Upon receipt of a money receipt slip written and submitted by a customer at the counter, the teller inputs the data written thereon and operates the necessary elements of the system for the motor related thereto accordingly. According to the payment slip in the amount as shown in FIG. 17A, the money is payable in such a manner that the large notes such as ten thousand yen are handed by the teller to the customer in a "the thousand yen note wad" and the odd parts of the requested amount without any designation of the denomination are automatically dispensed in a most expedient manner or in a minimum number of pieces of money. The steps of such a combined payment operation will now be described below.

5a. The amount requested without any designation of the denomination is registered by way of ten-key board device 12A. In the example of FIG. 17A, this amount is ¥148,976.

The registered data is converted in accordance with a predetermined format by the operation and decision circuit 36D through the data read-in decorder 22 and read into the register NKR in the operation and decision circuit 36D, whereupon the content of the register is displayed in the display 51.

Conditional upon depression of the ten-key device 12A instead of the classification item key switch, there is produced the LCVF instruction for the execution of the payment program by way of dispensation of a minimum number of notes from the ROM 36B in the operation processing control circuit 36, which instruction is applied to the LCV flag forming circuit 37D in the transfer output circuit 37, whereby the LCV signal is delivered from the LCV flag forming circuit 37D.

5b. The + switch 13A is depressed.

The key-out output of the + switch is applied to the buffer operation start circuit 34G, and as the circuit 34G is at this moment provided with the LCV signal as a signal generating condition, there is immediately produced the buffer operation start instruction to the branch controller 34A. By this operation, the execution of the LCV payment program is addressed in the operation instruction circuit 34, and the divided execution instructions are further delivered through the branch and step controller 34E in the following manner.

The first execution instruction is applied to the printer 52, whereby the registered data is delivered from the register NKR to the printer 52, so as to print out the amount of the money with the cash symbol on the journal (the symbol designates the dispensation by way of a minimum number of notes).

The second execution instruction is applied to the address register 36A after it is converted according to the predetermined format by the instruction selection decoder 34F. Consequently, the step execution instruction which is read out from the ROM 36B according to the set condition, is delivered through the micro operation decoder 36C, whereby the following buffer operation is executed.

First, the data of the LCV buffer memory $B_2$ (presently, it is 0) is read out in the register ACR for temporary storage in the operation and decision circuit 36D under the control of the memory field specifying circuit 36E, thereafter the register NKR (presently, 148976) is added to this data, and the result of such addition is rewritten in the LCV buffer memory $B_2$, while the registration data is read in the collation buffer memory $B_1$.

Next, the registration data of the LCV buffer memory $B_2$ is applied to the series-parallel conversion circuit 42A through the transfer control circuit 37B which is controlled by way of the transfer status control circuit 37A by the branch and step control circuit 34E, and there is obtained the conversion output in the decoder 42B according to the output from the circuit 42A, which conversion output is delivered to the memory check gate 42C. The memory check gate 42C, on the condition that the LCV signal is delivered thereto, functions to decide the note denomination which are necessary to dispense the money in term of a minimum number of notes that is stored in the buffer memory $B_2$, and the denomination signal outputs are stored in the program memories in the program circuits 43A and 43B for dispensing the bank notes and the coins through the dispensation program check circuit 42D.

Presently, there is stored a money amount data such as 148,976 in the buffer memory $B_2$. In this connection, there is need for the denomination of the money by way of a minimum number of notes and coins, whichever are necessary, i.e., four kinds of notes in the denominations of ten thousand yen, five thousand yen, one thousand yen, and five hundred yen, as well as five kinds of coins in the denominations of hundred yen, fifty yen, ten yen, five yen, and one yen, thus nine kinds of denominations in total. Therefore, there are provided the corresponding number or nine program memories for storing the data corresponding to the denominations in the program circuits 43A and 43B for dispensing the notes and coins.

5c. The handing switch 11E is depressed.

By the key-out signal of the handing switch 11E, the handing classification item memory 21G is set, and by this set output, the execution of the handing program is addressed with respect to the branch controller 34A.

5d. The figure of the handing amount 1,000,000 yen is registered by way of ten-key device 12A.

This registration data is, similarly as in the step of 5(a) above, read into the register NKR, and at the same time the content of the register is displayed in the display 51.

5e. The + switch 13A is depressed.

Similarly as in the case of 5(b), the handing buffer operation starts, whereby the registration data of the register NKR is printed out together with the symbol ten thousand in the journal by the printer 52.

Subsequently, the registration data of the register NKR is read into the collation buffer memory $B_1$.

The registration of the data of money amount on demand is thus completed, and with such sequential operations, there are stored the registration data, i.e., 148,976 in the LCV buffer memory $B_2$ and 148,976. 1,000,000 in the buffer memory $B_1$, respectively. At the same time, there is printed a printing showing the sequence of registration in the journal 81 in the printer 52 as shown in FIG. 17B.

5f. The collation switch 14A is depressed.

The key-out signal of the collation switch 14A is applied to the instruction selection decoder 34F, whereupon sequential additions of the data in the buffer memory $B_1$ occur, and the result of this addition is delivered to the display 51 for displaying the subtotal amount of this particular transaction.

By this display for collation, the teller can readily ascertain that there is no error in the registration procedure.

5g. The certification-printing-slip is inserted into the chute.

When inserting the certification-printing-slip, the circuit for detecting the insertion of the certification-printing-slip 11T functions to detect the insertion of the slip, thereby permitting the key-out of the signal from the payment total switch 11N.

5h. The payment total switch 11N is depressed.

When depressing the payment total switch 11N, the data in the collation buffer memory $B_1$ is added, and the result of such addition is printed out on the certification-printing-slip 82 and at the same time the data in the collation buffer memory $B_1$ is added in accumulation to the cash payment main memory $M_6$. After adding 1 to the series digit of the date, serial number main memory $M_7$, the data of this date, serial number main memory $M_7$ is now printed out on the certification-printing-slip 82.

With the sequential operation as described above, the sub-total amount of the money to be payable, and the date and serial number are printed out on the certification-printing-slip as shown in FIG. 17C.

5i. The certification-printing-slip is taken out from the chute.

In the manner as set forth in the step of (3h), printing is carried out on the journal 81 in the printer 52, as shown in FIG. 17D.

5j. The payment switch 110 is depressed.

By the key-out signal from the payment switch 110, the payment instruction memory 21T is set, and the output thus obtained is applied to the instruction branch start circuit 21Y, whereby the execution of the program for dispensing a minimum number of money is addressed in the operation instruction circuit 34.

At this moment, the branch and step control circuit 34E permits the transfer of the data of money amount to be dispensed in a minimum number of money units anong the data in the collation buffer memroy B₁ to the memory distributor 37C through the transfer control circuit 37B, and upon this transfer, subsequently retransferring the data thus transferred to the dispensation counter 41A through the load control circuit 41B.

After this retransfer operation, the dispensation start instruction is sent from the branch and step control circuit 34E to the dispensation start circuit 43B, the dispensation start circuit 43S thereby being triggered. This set status is held until the dispensation completion signal EOC is sent from the EOC flag formation circuit 43Q. Consequently, as the money dispensation start control circuit 43T produces a dispensation drive output, the money dispensation machine 4 is now in a state permitting the dispensation of the money.

However, as described in the step of (5b) above, there are supplied from the note dispensation program circuit 43A the signals corresponding to all denomination of notes, i.e., from ten thousand yen down to five hundred yen, and the priority circuit 43C adapted to receive such signals selectively delivers the highest digit of the money amount, e.g., a denomination signal corresponding to the denomination of ten thousand yen. On the other hand, as previously described in the step of (ei), since the lifter remains resting in the position adjacent the ten thousand yen note container, the lifter predetermined-position detection circuit 43D delivers a predetermined ten thousand position detection signal, whereby the note clutch driver 43E for ten thousand yen note now starts to be driven so as to start the dispensation of the ten thousand yen notes.

In the following stages of operation, in exactly the same manner as described in the step of (3i), i.e., the dispensation of ten-thousand yen notes, a single count pulse is supplied to the ten-thousand digit counter through the counter input selection circuit 41E every time the passage of a note is detected by the note passage detector 41C. On the other hand, there were previously transferred the data of 1 and 4 in the hundred-thousand and ten-thousand digits of the dispensation counter 41A, respectively, and after fourteen ten-thousand yen notes were dispensed, the contents of the above mentioned counter digits are now cleared to 0. This content 0 is now detected by the zero coincidence detection circuit 41G, whereby the ten-thousand program memory in the note dispensation program circuit 43A is reset, and consequently, the priority circuit 43C delivers a five-thousand denomination signal.

Upon receipt of this signal, the lifter moves upwardly to the predetermined position for the denomination of five-thousand yen, the lifter predetermined-position detection circuit 43D detecting the positioning of the lifter and starting to drive the note clutch driver 43E for the five-thousand yen notes. In the meantime, when five count pulses are delivered to the 1,000 digit counter in the dispensation counter 41A upon dispensation of a sheet of five-thousand yen note, one pulse is applied to the zero coincidence detection circuit 41G from the count pulse generation circuit 41F. Upon receipt of this pulse, the zero coincidence detection circuit 41G produces a zero coincidence detection output with respect to the denomination of five-thousand yen on the condition that the memory dispensation operation be presently engaged in the LCV dispensation, and that the money be dispensed by way of notes. Consequently, when a five-thousand yen note is dispensed, the dispensation operation now turns to thousand yen notes with the operational state being such that the content of the 1,000 digit counter of the dispensation counter 41A turns from 8 in terms of the data transferred to the remainder 3 so as to start the dispensation of the thousand yen notes.

Thereafter, when three sheets of thousand yen notes are dispensed, the content of the thousand digit counter becomes 0, whereupon a coincidence detection output is delivered from the zero coincidence detection circuit 41G.

In such fashion, upon subsequent dispensation of a five-hundred yen note, similarly as in the case of five-thousand yen notes above, there is delivered a coincidence detection output from the zero coincidence detection circuit 41G in the operational state wherein the content of the 100 digit counter of the dispensation counter 41A changes from the transferred data 9 to 4.

At this moment, all the program memories for each denomination in the note dispensation program circuit 43A are reset, whereby all of the dispensation steps are completed with respect to the notes. This state of the dispensation completion is detected by the note program reset check circuit 43L, and the resulting detection output starts the coin dispensation motor 43P through the coin dispensation control circuit 43N. This state is stored in the dispensation control circuit 43N until the detection output reaches the coin dispensation control circuit 43N from the coin program reset check circuit 43N.

In the case of this example, the coin dispensation motor 43P is a common driving means for the individual coin dispensing mechanisms (not shown) to dispense the coins of several denominations piece-by-piece so that each of the individual dispensation mechanisms is operatively connected to the coin dispensation motor 43P through the control of the coin clutch drives 43K provided respectively corresponding to the individual dispensation mechanisms. The clutch driver 43K for each denomination is driven by an individual denomination signal from the coin dispensation program 43B.

As previously described in the step of (5b), the signals covering all of the money denominations are presently delivered to the coin dispensation program circuit 43B. Consequently, when the coin dispensation motor 43P is driven, the coins of all of the denominations are concurrently dispensed piece-by-piece. In this connection, with respect to the three denominations of hundred, ten, and one, the coins are dispensed in the same manner as described above with ten-thousand and thousand yen notes, and with respect to the two denominations of fifty and five in the same manner as described above with five-thousand and five-hundred yen notes, wherein every time the individual coins are dispensed, a count pulse is delivered to the corresponding digit counter of the dispensation counter 41A through the input selection circuit 41E according to the detection output of the coin passage detector 41D, the zero coincidence detection circuit 41G performing zero coincidence detection.

Consequently, at the time of starting the coin dispensation, the contents the 100, 10, and 1 of digit counters of the dispensation counter 41A are 4, 7, and 6, respectively. Upon dispensation of one each of the coins of all denominations, the contents of the individual digit counters become 3, 1, and 0, respectively, thus detecting the state of zero coincidence with respect to the denominations of fifty, five, and one, the coin clutch drivers 43K for these denominations thus being in the inoperative state. Thereafter, when one each of the coins with respect to the remaining denominations, i.e., hundred and ten is dispensed, the contents of the individual digit counters 41A are now 2, 0, and 0, thus detecting the state of zero coincidence with respect to the denomination of ten, and consequently, the coin clutch driver 43K corresponding to this denomination is in the inoperative state. After this, when two coins are dispensed with respect to the remaining denomination, i.e., hundred, the contents of the individual digit counters are now 0, 0, and 0, respectively, thus now detecting the state of zero coincidence with respect to the denomination of hundred, and consequently the coin clutch driver 43K for the hundred denomination is in the inoperative state.

Through such sequential dispensation, there are dispensed fourteen ten-thousand yen notes, one five thousand yen note, three thousand yen notes, one sheet of five hundred yen note, four hundred yen coins, one fifty yen coin, two pieces of ten yen coins, one piece of five yen coin, and one yen coin.

With the contents of the individual digit counters being 0, 0, and 0, respectively, the program memories in the coin dispensation program circuits 43B corresponding to all the coin denominations are now reset, thus completing the dispensation of all the coins on demand. This completion of dispensation is detected by the coin program reset check circuit 43M, and this detection output resets the storage state of the coin dispensation control circuit 43N, thereby stopping the coin dispensation motor 43P.

Upon completion of this note and coin dispensation, a dispensation completion signal (EOC signal) for indicating the completion of the dispensation is generated in the EOC flag formation circuit 43Q with the output of the note and coin program reset check circuits 43L and 43M.

In the following steps of dispensation, as described in the step (3i), this EOC signal iis available for the renewal of the "automatic dispensation" main memory $M_5$ through the successive procedures, i.e., first, paying the money dispensed; second, resetting the dispensation start circuit 43S; and third, resetting the payment instruction memory 21T.

6. In the case of the compound monetary transaction wherein automatic dispensation with a denomination designation and handing are combined.

The processing in this type compound transaction corresponds to the combination of the steps (5c) through (5e) of the case (5) with the case (3), i.e., the case of automatic dispensation with a denomination designation.

For instance, in the case of the compound transaction wherein handing ten-thousand yen notes to the customer in a wad is combined with automatic dispensation, it is required to apply the following three operating steps:

3c. depressing the + switch 13A as in the case (3);

5c. depressing the handing switch 11E as in the case (5); and 5d. registering the amount of money handed by the ten-key device 12A, and then to 5e. depress the + switch 13A, thereafter, applying the successive steps (3d) and the succeeding steps as in the case (3).

7. In the case of handing the money to the customer.

The processing in this transaction may be performed by applying the steps (5c) through (5e) as in the case (5), in place of the steps (3a) through (3d) in the case (3) and thereafter applying only the steps (3e) through (3h) in the case (3).

8. In the case of exchange processing

In this processing, it is required that the teller perform the steps of the data input and other procedures relative thereto according to the exchange slip prepared and handed by the customer at the counter. The case wherein an instance of exchange is processed according to the exchange slip shown in FIG. 18A from ten-thousand yen note to a five-thousand yen note and thousand yen notes with reference to FIG. 34 in accordance with the following steps.

8a. The T switch 11J is depressed.

An output signal TK of the T switch 11J is adapted to set the flip-flop circuit 21M in the T instruction memory 21M through the AND circuit 211. Upon delivery of the set output of the flip-flop circuit 21M to the AND circuits 213 and 218, this output is simultaneously introduced, respectively, into the instruction selection decoder 34F and the branch and step control circuit 34E as a zero proof operation instruction $T_1$, whereby zero proof operation instruction is supplied from the instruction selection decoder 34F. In the meantime, the output from the flip-flop circuit 21M is delivered as an input to the AND circuit 221 in the setting path through the inverter 12, thus securing the set conditions of the flip-flop circuit 21M.

8b. The Ten-Thousand switch 11F corresponding to the denomination of the money to be exchanged is depressed, and thereafter the amount of twenty-thousand yen is registered by means of ten-key device 12A.

Then, the money classification data for ten-thousand yen are sequentially read into the register NKR incorporated in the operation and decision circuit 36D of the operation processing control circuit 36 through the instruction selection decoder 34F in the operation instruction circuit 34, as well as the money amount data read-in decoder 22, and then displayed in the display 51.

At this moment, although the ten-thousand classification data 14F is supplied to the buffer operation start circuit 34G (FIG. 31), since the input gate circuit 155 of the payment item specifying signal forming circuit 112 is not provided with the conditions of the operation instruction $T_1$, the circuit 112 is not set, whereby it does not deliver the payment item specifying signal ODF.

8c. The − switch 13B is depressed.

A key-out signal of the − switch 13B is supplied to the AND circuit 218 of the T control circuit 21P through the key input circuit 34D and is also supplied to the buffer operation start circuit 34G. As a classification operation instruction is applied to the buffer operation start circuit 34G from the ten-thousand classification item memory 21I, an operation start instruction is immediately applied to the branch controller 34A from the circuit 34G. At this moment, according to the contents of the instruction selection decoder 34F, the operation instruction execution address register 36A supplies a zero proof operation execution step instruction, whereby a buffer operation is performed, and thus the registration data of the register NKR assumes a negative sign and is read into the collation buffer memory $B_1$.

On the other hand, when the − switch 13B is depressed, the flip-flop circuit 21M is already set, and, therefore, a set signal is applied to the flip-flop circuit 217 from the AND circuit 218. This set output from the flip-flop circuit 217 is now supplied to the printer 52 as a printing control signal $T_3$. In this manner, the printer 52 operates to print the registration data of the register NKR together with the symbol ten thousand in the journal in accordance with the instruction of the branch and step controller 34E. When the desired printing is completed through the steps described above, there is delivered a paper feed signal PF for the following steps from the branch and step control circuit 34E.

8d. The Exchange switch 11K is depressed.

An output signal EXK of the exchange switch 11K is adapted to set the flip-flop circuit 21M of the exchange memory 21N through the AND circuits 210 and 213. The set output of the flip-flop circuit 22M is applied to the AND circuit 216, while being delivered as an EXC signal of the classification item signal, thereby selecting the exchange branch of the operation instruction circuit 34, and thhe instruction selection decoder 34F delivers an exchange operation instruction. The output of the flip-flop circuit 212 is read as an input to the AND circuit 213 in the setting path through the inverter 13, thus securing the set conditions of the flip-flop circuit 212. The output of the inverter 13 is also applied to the NOR circuit NR.

8e. The Five Thousand switch 11G corresponding to the first denomination of the money to be exchanged is depressed.

Upon depression of this switch 11G, the five thousand classification memory is set, the set output now specifies an address of the five thousand yen note payment program at the branch controller.

8f. The amount of 10000 is registered by the denomination for five thousand yen by using the ten key.

This registration data is then read into the register NKR and, at the same time is displayed in the display 51.

8g. The + switch 13A is depressed.

The buffer operation starts, and the buffer operation instruction is delivered to the ROM counter 34B, whereby the registration data is now without a negative sign and read into the collation buffer register $B_1$, and at the same time is read into the five-thousand yen not buffer memory $B_3$. Also, the registration data in the register NKR is printed with a symbol on the journal by the printer 52.

Through these operational steps, the data of −20000 . +10000 are stored in the collation buffer memory $B_1$, and the data of 10000 in the five thousand yen note buffer memory $B_3$, respectively.

At this moment, as described hereinbefore, the five thousand program memory in the note dispensation program check circuit 43A is set.

8h. The thousand switch 11H corresponding to the second denomination of the money to be exchanged is depressed, and thereafter than money amount of 10000 yen is registered by ten-key device 12A.

Likewise in the steps (8e) and (8f) above, the same buffer operation is performed whereby the printer 52 operates to print the amount of 10000 yen by way of thousand yen note together with the symbol, and at the same time the data corresponding to the above amount of 10000 are read into the thousand yen note buffer memory $B_4$.

Consequently, the data of −20000 . +10000 . +10000 are stored in the collation buffer memory $B_1$, the data of 10000 in the five thousand yen note buffer memory $B_3$, and the data of 10000 in the thousand yen note buffer memory $B_4$, respectively.

8i. The T switch 11J is again depressed.

Upon depression of the T switch 11J, the output signal TK of the T switch 11J is applied to the AND circuits 215 and 216. Consequently, since the flip-flop circuit 21N is already set, the flip-flop circuit 214 is set through the AND circuit 216. The set output $T_2$ of the flip-flop circuit 214 is delivered to the branch controller 34A, whereby the data of the collation buffer memory $B_1$ are sequentially added, the result of this addition being displayed in the display 51, and the data is printed with a symbol by the printer 52 in the journal.

8j. The payment switch 110 is depressed.

A payment program addressing is performed with respect to the main operation selection address register 33, and the dispensation start circuit 43S is set, and consequently, through the same steps as in the step (3i) for the money dispensation with denomination designation described hereinbefore, the steps of note dispensation are carried out. By a note dispensation completion signal EOC, the data of five thousand yen note and thousand yen note in the collation buffer memory $B_1$ are cumulatively added in the automatic dispensation main memory $M_5$.

Upon completion of the desired printing, a paper feed signal PF for the following steps is delivered from the branch and step control circuit 34E, thus resetting the flip-flop circuit 217 through the OR circuit OR and the flip-flop circuit 214 through the AND circuit 219 and OR circuit $OR_1$, respectively. Furthermore, all flip-flop circuits 21M, 21N and 214 are commonly reset by a clear signal CK.

9. In the case of change processing

The change processing is performed according to the payment slip presented by a customer at the counter, the teller performing the steps of data input and other procedures relative thereto according to the declaration of the customer. The case wherein change is returned to the customer according to a payment slip as shown in FIG. 19A will now be described with reference to FIG. 34.

9a. The T switch 11J is depressed.

The output signal TK of the T switch 11J is introduced through the AND circuit 211 so as to set the flip-flop circuit 21M of the T instruction memory 21M. The set output of the flip-flop circuit 21M is applied to the AND circuits 213 and 218, and is further delivered as a zero proof operation instruction $T_1$ to the instruction selection decoder 34F and the branch and step control circuit 34, respectively. Consequently, a zero proof operation execution instruction is delivered from the instruction selection decoder 34F.

9b. The Ten Thousand switch 11F corresponding to the money denomination to be paid is depressed, and thereafter the submitted amount of ten thousand yen is registered by means of ten-key device 12A. Thereafter the − switch 13B is depressed.

As described in the step (8c), the buffer operation starts, and the data 10000 with a negative sign is read into the buffer memory $B_1$. The money amount submitted is printed by the printer 52 is red in the journal as shown in FIG. 19B.

9c. The cash swich 11A is depressed.

Upon depression of the cash switch 11A, money receipt program addressing is carried out in the operation instruction circuit 34.

9d. The money received in the amount of 6525 yen by way of ten-key device 12A, thereafter depress + switch 13A.

As soon as the data 6525 is read into the collation buffer memory $B_1$, the registration data mentioned above is read into the cash receipt buffer memory $B_2$. Then, the registration data is printed out in the journal for the money receipt by the printer 52.

9e. The change switch 11L is depressed.

The output signal CHAK of the change switch 11L sets the change instruction memory 210 through the AND circuit 212. The set output of the memory 210 is delivered as an input to the AND circuit 215 and also as a CHA signal of the classification item signal, thereby selecting the change branch of the operation instruction circuit 34, and the instruction selection decoder 34F produces as output an exchange operation instruction.

9f. The change amount of 3475 yen is registered by means of ten-key device 12A, and thereafter the + switch 13A is depressed. Upon depression of the + switch 13A, the registration data is read into the collation buffer memory $B_1$, and then the change amount is printed in the journal.

As a result, the data of −10000 . +6525 . +3475 are stored in the collation buffer memory $B_1$, and the data 6525 in the cash receipt buffer memory $B_2$, respectively.

9g. The T switch 11J is again depressed.

The output signal TK of the T switch 11J is applied to the AND circuits 215 and 216. Since the flip-flop circuit 222 is already set, the flip-flop circuit 214 is now set through the AND circuit 215. The set output $T_2$ of the flip-flop circuit 214 is applied to the branch controller 34A, whereby the data in the collation buffer memory $B_1$ is sequentially added, and the result of this addition is displayed in the display 51. 0 is thereby printed in the journal by the printer 52.

9h. The receipt total key 11M is depressed with the certification-printing-slip inserted.

The receipt total instruction memory 21R is set in position, whereby the receipt total operation program is specified for the address register 33, thus executing a receipt total operation.

In the recept total operation, the data in the cash receipt buffer memory $B_2$ is read out, and the words for such instruction are put in the condition memory $JG_2$, whereby a first selection line $N_1$ is selected, thus performing the cash receipt operation. In the cash receipt operation, the data in the cash receipt buffer memory $B_2$ is added to the data in the cash receipt main memory $M_1$, and the data of cash receipt in the collation buffer memory $B_1$ is printed out by the printer 52, subsequently adding 1 to the data in the date serial number main memory $M_7$, and thereafter printing the data serial number. (FIG. 19C)

9i. Certification-printing-slip is removed.

With the V receipt total instruction memory 21W set, the V receipt total branch starts, and the data of cash receipt in the collation buffer memory $B_1$ and the data in the date serial number main memory $M_7$ are printed again in the journal. (FIG. 19D)

9j. The payment switch 110 is depressed.

While the payment instruction memory 21T is set, and according to the same steps as described in the step (4j), an LCV dispensation is carried out with respect to the data 3475 for a change in the buffer memory $B_3$. Upon dispensation, the data of change is added in the automatic dispensation main memory $M_5$ in accordance with the dispensation completion signal EOC.

10. In the case of grand total processing

The grand total summation is processed by shifting the audit switch 11Q toward the on position by using the audit key when closing the daily account.

10a. After the audit switch 11Q is shifted to the on contact, the Total/#switch 11P is depressed.

The key-out signal of the total/#switch 11P sets the grand total instruction memory 21U, and the set output TMF selects a grand total summation program address for the main operation branch selection address register 33.

First, if the data is stored in the memories $M_1$ through $M_7$, the condition outputs $jg_6$ through $jg_{11}$ are being introduced as input into the address register 33, and consequently, as shown in the grand total column of the table of FIG. 11, the address register 33 is in a state for delivering the address selection outputs through the output lines $N_1$ through $N_6$.

In other words, referring to FIGS. 22 through 27, the input gate circuits 351, 352, 353 and 354 for setting the output lines $N_1$, $N_2$, $N_3$ and $N_4$ deliver the outputs $G_1$, $G_2$, $G_3$ and $G_4$ through the condition circuits 325, 329, 332, and 335 in the address register 33, respectively, while the input gate circuit 377 for setting the output line $N_5$ delivers the output $G_5$.

Therefore, when a main operation start signal BRSS from the instruction branch start circuit 21Y is delivered to the $N_1$ output holding circuit 33A in the output circuit 33I, the address register 33 delivers an address through the output line $N_1$, which is applied as a $Y_o$ address signal to the ROM counter 34B through the input circuit 140. (FIG. 31)

At this moment, the ROM counter 34B is caused to select the $X_3$ address in FIG. 13 by means of the instruction signal TMF from the instruction branch start circuit 21Y and, at the same time, selects the $Y_o$ address by means of the selection output from the output line $N_1$, thus reading out the cash main branch corresponding to the address $(X_3, Y_0)$ from the ROM 34C, thereby causing the branch and step control 34E to deliver the corresponding execution step instruction and the sub-branch selection instruction.

At this moment, the data in the cash receipt main memory $M_1$ is read out through the operation and decision circuit 36D, and the symbols a and receipt (representing the content of the cash receipt main memory $M_1$) are printed in the journal by the printer 52.

When this printing is completed, in accordance with the paper feed signal PF delivered by the printer 52, an address routine completion signal ACS is applied to the address register 33, whereby the $N_1$ output holding circuit 33A and the $N_1$ input gate control circuit 359 are reset, and the $N_2$ output holding circuit 33B is now set. Consequently, an address output is sent through the output line $N_2$, and this output is now applied as a $Y_1$ address signal to the ROM counter 34B through its input circuit 141. (FIG. 32)

In this manner, the our main branch corresponding to the address $(X_3, Y_1)$ is read from the ROM 34C, whereupon, similarly as in the above described case, the data in the our note receipt main memory $M_2$ are read through the operation and decision circuit 36D, and the printer 52 prints together the symbol b and receipt (representing the content of the our note receipt) in the journal.

In a like manner, the data in the another note 1 receipt main memory $M_3$ and the another note 2 receipt main memory $M_4$, and thereafter the main data in the automatic payment main memory $M_5$ are printed out in the journal by the printer 52.

Therefore, according to the following address routine completion signal ACS, when the $N_5$ output holding circuit 33E and the $N_5$ input gate control circuit 375 are reset, an output $G_7$ is obtained instead in the $N_6$ setting input gate cicuit 379, whereby the $N_6$ output holding circuit 35F is set. Consequently, similarly as in the above described case, the data in the cash payment main memory $M_6$ is printed put in the journal by the printer 52.

On the other hand, in the case wherein there are no data in connection with the reading-out of the data in each main memory, there is no execution of that main branch, and such a branch is jumped over to another having the required data.

As shown in FIG. 20, the data stored in the main memories $M_1$ through $M_6$ are printed out in the journal, and with the result of this printing the grand total of the daily transaction can be readily seen.

11. Protection of the memories in the case of line break

When the power supply stops owing to, e.g., a failure of the power source, an instantaneous service interruption, an improper operation of the power key, or pulling out of the power supply plug from its receptacle through carelessness (hereinafter referred to as a line break), an incorporated power battery circuit 63 instantaneously connects the battery 65 to the memory device 31 and the related operation blocks, and should such a power supply failure occur during the execution of the operation branch, the power battery circuit affords continuation of the execution of that operation branch.

In an instance of a line break, the line break detection circuit 61 operates to detect this situation and deliver a line break signal to the timer circuit 62. (FIG. 5) In the timer circuit 62, there are incorporated the timers A and B adapted to start functioning at the same time upon receipt of the line break signal. In a line break, when the power supply is not restored even when a predetermined time, for instance 15 seconds, has passed, the timer A delivers a signal to the memory protection circuit 64.

The reason for selecting a set time of 15 seconds for the timer A to produce a signal is that the set time should be sufficient for the condition that when a line break is due to careless operation or some similar cause, and it is possible to correct the situation within a short period of time, it is not necessary to perform a printing out of the main memory section MM, and that when such a line break occurs during the execution of any operation branch, it is necessary to refrain from printing out of the main memory section until such operation branch is executed.

Upon delivery of the output signal of the timer A, the memory protection circuit 64 delivers an LB start signal, thereby setting the LB instruction memory 21V. This set output causes the main operation branch selection address register 33 to specify the LB branch.

At this moment, the address register 33 performs the selection step-by-step operation of the output lines $N_1$ through $N_6$, thereafter further performing the selection of the output line $N_7$ upon completion of the selection of $N_1$ through $N_6$, wherein the operation is made conditional upon the main branch selection of the output LBF in the LB instruction memory 21V similarly as in the steps of the grand total summation processing as described hereinbefore, wherein, in contrast, the operation is made conditional upon the main branch selection of the operation instruction TMF.

Referring to FIGS. 22 through 27, when the $N_6$ output holding circuit 33F is reset by the address routine completion signal ACS in accordance with the paper feed signal PF, the LB instruction memory 21V is reset through the reset circuit 396, whereby an output $F(N_7)$ is delivered in the $N_7$ setting output gate circuit 381, thus delivering an address output in the output line $N_7$.

Consequently, at this moment, the address $(X_3, Y_6)$ shown in FIG. 13 is selected in the ROM counter 34B, and the date, serial number main branch corresponding to this address is read out from the ROM 34C.

In a manner as described above, the data in the date, serial number main memory $M_7$ is read out through the operation and decision circuit 36D, and printed in the journal by the printer 52.

As shown in FIG. 21, in the case of a line break, the data stored in the main memory section MM are positively printed out in the journal.

Upon the elapse of the predetermined time of the timer B after the line break, for instance, 30 seconds, the signal produced when the set time is over is applied to the battery circuit 63, thereby completing the LB mode.

In this manner, there starts the printing of the data in the main memory section MM in 15 seconds after the line break, and the battery power supply is cut out in 30 seconds after the line break. By this arrangement, the power discharge from the battery 65 is maintained at a minimum so that the battery discharge capacity can be maximized.

As is apparent from the above description, in the monetary receipt and payment managing apparatus according to this invention, data on various transaction classification items can be positively classified, totalized, and stored only by operating the keys. Especially, this apparatus can automatically dispense money with monetary denominations specified on the basis of the data classified, totalized, and stored, in the transaction of the payment, whereby the service and efficiency of a teller can be remarkably improved.

Furthermore, according to this invention, the operation processing of data on one instance of business is assigned to the buffer memories. The storage of the grand total of sub-total data on transactions successively transacted is assigned to the main memories, whereby the grand total data which is most important as data to be stored can be positively secured. In addition, the dispensation data to be applied to the money dispensing machine is obtained by the use of the buffer memories, as a result of which the transfer of data with respect to the dispensation operation of the money dispensing machine can be readily and positively carried out on the basis of the instruction signal produced by the payment key-switch which is adapted to instruct the apparatus for the automatic dispensation of money.

For instance, the application of incorrect data may be caused by an operator's careless operation while a number of business are transacted by him. In this case, however, the erroneous operation can be corrected merely by executing the buffer operation again, without affecting the data stored in the main memories, that is, the grand total. Furthermore, the total money amount of transactions transacted can be confirmed, when necessary, merely by reading data stored in the main memory section and printing the data by the use of the data output system.

As was described before, in the monetary receipt and payment managing apparatus according to this invention, data of one transaction is classified and operated on, the data thus operated on is stored in the buffer memories, and according to the data thus stored, the certification operation, the total operation, and the automatic money dispensation are carried out. Especially, according to the invention, the buffer memories are commonly used for the operation modes corresponding to the plural kinds of transactions, so that the number of the buffer memories is reduced. For instance, if the number of the buffer memories is as many as necessary for an operation mode in which the number of denominations transacted in one transaction is the greatest (in the example described above, the number of the buffer memories required for the operation mode with respect to the receipt transaction or the payment transaction in which denominations are specified being five), it is unnecessary to provide more buffer memories than that number for the other operation modes. Thus, according to this invention, the number of the buffer memories can be minimized, whereby the number of the peripheral circuits of the memory device can be also reduced.

According to this invention, the means for instructing the apparatus for carrying out the automatic dispensation operation comprises the payment key-switch and the payment instruction memory which is set by the output of the payment key-switch, and the set state of the payment instruction memory is reset by the dispensation completion signal produced by the money dispensing machine, as a result of which the interruption of instruction signals and accordingly the re-application of the instruction signal will never be caused during the money dispensing operation of the money dispensing machine. It should be noted that these effects are obtained by an apparatus which is simple in construction according to the present invention.

Furthermore, according to the invention, no payment instruction is produced unless the data in one transaction has been printed by the printer. Accordingly, the data on the result of one transaction can be positively recorded in the journal, and therefore the data thus recorded can be utilized for the case where an audit is required for every transaction.

In addition, according to the memory protection circuit of this invention, during the normal operation of the apparatus the battery is charged while the devices to be protected are supplied with a direct current power. Furthermore, in the case of power trouble such as an interruption of power service, the voltage drop due to the power trouble is supplemented by the battery, and when the voltage drop has become a certain value, the printer operates to print after a predetermined time period the data stored, the data stored in the memory device in the devices to be protected, and especially the data stored in the main memory section which is greatly affected by the disappearance of the data stored therein. After the printer has printed the data, the discharge of the battery is suspended so that the battery is not excessively discharged. Thus, according to this invention, the disappearance of the data stored in the device to be protected can be prevented, and the battery for supplementing the voltage drop may be small in size, that is, the apparatus according to the invention is economical. In addition, the amount of discharge of the battery is reduced on the basis of the characteristic of a secondary battery, and therefore it is possible to reduce the time period necessary for the charging of the battery which leads to a long service life of the battery.

According to this invention, in the case of a compound transactions in which money is paid to a customer by the use of the money dispensing machine and is handed to him by a clerk in one transaction, the data on the compound transacted can be processed by a common data processing step. Accordingly, as was described before, in the case when a large amount of money including various denominations is involved, the large denomination notes of the large amount of money is handed to the customer by the clerk, while the remainder is paid to him by the use of the money dispensing machine. Thus, it is possible according to the invention to provide a monetary receipt and payment managing machine which is simple in practical use.

We claim:
1. A monetary receipt and payment managing apparatus comprising:
   a. transaction classification designating means for designating a transaction classification from among the transactions of monetary receipt, payment, exchange and change, for a transaction to be carried out;
   b. transaction item designating means for designating a detailed transaction item for the transaction classification thus designated;
   c. numerical data inputting means for inputting numerical data for the transaction item thus designated;
   d. start commanding means for commanding starting of the apparatus for carrying out transactions based on input information inputted by said transaction classification designating means, transaction item designating means, and numerical data inputting means;
   e. a buffer memory section coupled to said numerical data inputting means, said transaction classification designating means and said transaction item designating means and comprising a plurality of memory circuits which operate to store the numerical data inputted by said numerical data inputting means separately according to the transaction classification and transaction item inputted by said transaction classification designating means and transaction item designating means;
   f. a main memory section coupled to said buffer memory section for storing the sum of transaction contents which have been stored in said buffer memory section;
   g. money dispensing means in which money with a plurality of monetary denominations is stored, and for dispensing when necessary an amount of money according to the contents of said buffer memory section;
   h. a program memory section for storing operation programs provided separately according to the transaction classifications; and
   i. an operation control section to which said aforementioned means and sections are coupled for, when the starting of transaction is commanded by said start commanding means, operating to select a necessary operation program according to the contents of said transaction classification designating means, transaction item designating means, and buffer memory section, to effect a predetermined operation process according to the program thus selected, and for summing and renewing the contents of said main memory section on the basis of the contents of said buffer memory section, and for causing said money dispensing means to dispense a necessary amount of money when necessary, whereby the apparatus collectively manages a variety of monetary transactions carried out by a teller with respect to cash and other than cash such as checks and bills.

2. An apparatus as claimed in claim 1, in which said operation control section comprises:
   a. a program address signal forming circuit for temporarily storing information on the transaction classification and transaction item inputted by said transaction classification designating means and transaction item designating means;
   b. a decision processing circuit which, based on the contents stored in said main memory section and buffer memory section, when transaction data to be transacted exists in said memory sections, operates to detect the presence of the transaction data;
   c. a selection control section for successively selecting the programs required by said program memory section with the aid of outputs of said program address signal forming circuit and decision processing circuit; and
   d. an operation control section for applying predetermined operating signals to operating circuits by reading program contents outputted by said program memory section.

3. An apparatus as claimed in claim 2, in which the number of buffer memory circuits correspond to the number of transaction item designating means and said transaction classification designating means is coupled to said buffer memory section and said operation control section for causing, with respect to transactions which cannot be handled simultaneously in one operation by a teller, different operation programs to be selected by signals from the same buffer memory circuits according to a transaction classification specified by said transaction classification designating means, whereby the number of memories can be reduced.

4. An apparatus as claimed in claim 1 which further comprises:
   a. a line break protection system for detecting a line break and connecting a power source to devices in said apparatus to be protected; and
   b. a data output system coupled to said memory sections and said line break detection system for producing the contents stored in said memories, so that upon occurrence of a line break the contents stored in said main memory are printed out.

* * * * *